US012735144B2

(12) United States Patent
Fujii et al.

(10) Patent No.: US 12,735,144 B2
(45) **Date of Patent: *Sep. 15, 2026**

(54) BICYCLE MOTOR UNIT AND BICYCLE DERAILLEUR

(71) Applicant: SHIMANO INC., Sakai City (JP)

(72) Inventors: Satoshi Fujii, Sakai City (JP); Shota Suyama, Sakai City (JP); Takeshi Ueda, Sakai City (JP); Atsuhiro Emura, Sakai City (JP); Mitsuo Hashimoto, Saitama (JP); Ken Kamiishi, Saitama (JP)

(73) Assignee: SHIMANO INC., Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/075,791

(22) Filed: Mar. 11, 2025

(65) Prior Publication Data

US 2025/0206413 A1 Jun. 26, 2025

Related U.S. Application Data

(63) Continuation of application No. 18/457,305, filed on Aug. 28, 2023, now Pat. No. 12,275,491.

(51) Int. Cl.
*B62M 25/08* (2006.01)
*B62M 9/12* (2006.01)

(52) U.S. Cl.
CPC .............. *B62M 25/08* (2013.01); *B62M 9/12* (2013.01)

(58) Field of Classification Search
CPC ...... B62M 9/122; B62M 25/08; B62M 9/132; B62M 9/12; B62M 9/124; B62M 9/134
See application file for complete search history.

(56) References Cited

U.S. PATENT DOCUMENTS 5,359,884 A * 11/1994 Fey ........................ B62M 25/08 73/115.01
6,162,140 A * 12/2000 Fukuda .................. B62M 25/08 474/81

(Continued)

FOREIGN PATENT DOCUMENTS

CN 213442939 U 6/2021
JP 2000-177674 6/2000

OTHER PUBLICATIONS

Office Action with Form PTO-892 Notice of References Cited issued by the U.S. Patent and Trademark Office for the U.S. Appl. No. 18/457,305, May 7, 2024.

(Continued)

*Primary Examiner* — Henry Y Liu
(74) *Attorney, Agent, or Firm* — MORI & WARD, LLP

(57) ABSTRACT

A bicycle motor unit includes an electric motor and a transmitting structure. The electric motor is configured to generate a driving force. The transmitting structure is coupled to the electric motor to transmit the driving force from the electric motor to an actuated device of a bicycle. The transmitting structure includes a first rotatable member, a second rotatable member, and a resisting structure. The first rotatable member is rotatable about a rotational axis. The second rotatable member is rotatable relative to the first rotatable member about the rotational axis. The resisting structure is at least partially provided between the first rotatable member and the second rotatable member so as to resist relative rotation between the first rotatable member and the second rotatable member.

23 Claims, 30 Drawing Sheets

(56) References Cited

U.S. PATENT DOCUMENTS 6,659,895 B2 * 12/2003 Fukuda .................. B62M 9/128 324/168
6,676,549 B1 * 1/2004 Fukuda .................. B62J 45/412 474/82
6,726,586 B2 * 4/2004 Fukuda .................. B62M 9/122 474/70
6,761,655 B2 * 7/2004 Fukuda .................. B62M 25/08 474/70
7,001,294 B2 * 2/2006 Fukuda .................. B62M 9/128 474/82
7,004,862 B2 * 2/2006 Fukuda .................. B62J 45/423 474/82
7,442,136 B2 * 10/2008 Ichida .................... B62M 9/132 474/82
7,467,567 B2 * 12/2008 Fukuda ................ B62M 9/1244 474/82
7,942,768 B2 * 5/2011 Takamoto .............. B62M 9/122 474/82
8,979,683 B2 * 3/2015 Katsura .................. B62M 25/08 474/82
11,230,349 B2 * 1/2022 Liao ....................... B62M 9/132
11,312,449 B2 * 4/2022 Dueweling ............ B62M 9/122
11,440,622 B2 * 9/2022 De Poli ................ B62M 9/1242
11,472,509 B2 * 10/2022 Sala ....................... B62M 9/125
11,536,326 B2 * 12/2022 Tsuzuki .................. F16D 25/12
11,554,832 B2 * 1/2023 Fujimoto ............... B62M 9/122
11,565,772 B2 * 1/2023 Fujimoto ............... B62J 45/413
11,697,474 B2 * 7/2023 Fujimoto ............... B62M 9/132 474/82
11,713,095 B2 * 8/2023 Shipman .............. B62M 9/1242 474/80
11,731,733 B2 * 8/2023 Dueweling ............ B62M 9/122 474/80
11,745,828 B2 * 9/2023 Fujimoto ............... B62M 9/132 474/80
11,787,504 B2 * 10/2023 Hamed .................. B62M 9/122 474/80
2003/0092519 A1 * 5/2003 Fukuda .................. B62M 9/122 474/70
2003/0207732 A1 * 11/2003 Fukuda .................. B62M 9/122 474/82
2004/0092347 A1 * 5/2004 Fukuda .................. B62M 9/128 474/70
2004/0102269 A1 * 5/2004 Fukuda .................. B62M 25/08 474/70
2004/0102270 A1 * 5/2004 Fukuda .................. B62M 9/122 474/70
2005/0187048 A1 * 8/2005 Fukuda ................ B62M 9/1244 474/70
2005/0187050 A1 * 8/2005 Fukuda .................. B62M 25/08 474/82
2005/0192139 A1 * 9/2005 Ichida .................... B62M 25/08 474/70
2006/0183584 A1 * 8/2006 Fukuda .................. B62M 25/08 474/70
2006/0189421 A1 * 8/2006 Ichida .................... B62M 9/132 474/82
2008/0227572 A1 * 9/2008 Sakaue .................. B62M 9/122 474/82
2009/0191994 A1 * 7/2009 Takamoto ............. B62M 9/122 474/70
2009/0215561 A1 * 8/2009 Fukuda .................. B62M 9/122 474/82
2013/0192405 A1 * 8/2013 Katsura .................. B62M 9/105 74/473.12
2014/0087901 A1 * 3/2014 Shipman ................ B62M 9/122 429/100
2014/0114538 A1 * 4/2014 Shipman ................ B62M 9/132 474/80
2014/0121047 A1 * 5/2014 Katsura .................. B62M 9/132 74/405
2014/0243127 A1 * 8/2014 Pasqua ................... B62M 9/122 474/80
2015/0111675 A1 * 4/2015 Shipman ................ B62M 9/122 474/82
2019/0023351 A1 * 1/2019 Tsai ....................... B62M 9/122
2019/0100279 A1 * 4/2019 Brown ................... B62M 9/127
2019/0351971 A1 * 11/2019 Dueweling ............ B62M 9/122
2020/0377175 A1 * 12/2020 Fujimoto ............... B62M 9/136
2021/0129938 A1 * 5/2021 Sala ..................... B62M 9/1242
2021/0129940 A1 * 5/2021 Sala ....................... B62J 45/413
2021/0171156 A1 * 6/2021 Kitano ....................... B62J 6/24
2021/0324924 A1 * 10/2021 Tsuzuki .................. F15B 15/20
2021/0387696 A1 * 12/2021 Sala ....................... B62M 9/122
2021/0403124 A1 * 12/2021 Fujimoto ............... B62M 9/132
2021/0403125 A1 * 12/2021 Fujimoto ............... B62M 9/135
2021/0403126 A1 * 12/2021 Fujimoto ............... B62M 9/132
2022/0081064 A1 * 3/2022 Hasegawa ................ B62M 9/06
2022/0081065 A1 * 3/2022 Yamamoto ............. B62M 9/122
2022/0081066 A1 * 3/2022 Fujimoto ............ B62M 9/1242
2022/0194521 A1 * 6/2022 De Poli ................ B62M 9/1242
2022/0212753 A1 * 7/2022 Dueweling ............ B62M 9/123
2022/0355899 A1 * 11/2022 Shipman .................. B62J 43/30
2022/0355900 A1 * 11/2022 Shipman ............. B62M 9/1242
2022/0411017 A1 * 12/2022 Braedt ................... B62M 9/122
2023/0002006 A1 * 1/2023 Kok ..................... B62M 9/1248
2023/0086185 A1 * 3/2023 Fujimoto ................. B62J 43/30 474/70
2023/0094161 A1 * 3/2023 Sala .......................... H02J 7/02 474/80
2023/0182860 A1 * 6/2023 Chen ........................ B62J 43/20
2023/0192235 A1 * 6/2023 Hamed .................. B62M 25/08 474/80
2023/0278666 A1 * 9/2023 Hamed .................... B62J 45/00 474/80
2023/0312054 A1 * 10/2023 Shipman ................ B62M 9/124 474/80
2023/0348019 A1 * 11/2023 Dueweling ............ B62M 9/123
2023/0365225 A1 * 11/2023 Hamed .................. H02K 11/21
2023/0365226 A1 * 11/2023 Minto ...................... G01B 7/30
2024/0017792 A1 * 1/2024 Fujimoto ............... B62M 9/132

OTHER PUBLICATIONS

Office Action issued by the U.S. Patent and Trademark Office for the U.S. Appl. No. 18/457,305, Aug. 14, 2024.

Office Action issued by the U.S. Patent and Trademark Office for the U.S. Appl. No. 18/457,305, Oct. 29, 2024.

* cited by examiner

BICYCLE MOTOR UNIT AND BICYCLE DERAILLEUR

CROSS-REFERENCE TO RELATED APPLICATIONS

The present application is a continuation application of the U.S. patent application Ser. No. 18/457,305 filed Aug. 28, 2023. The contents of the U.S. patent application Ser. No. 18/457,305 are incorporated herein by reference in their entirety.

BACKGROUND

Technical Field

The present invention relates to a bicycle motor unit and a bicycle derailleur.

Background Information

A human-powered vehicle includes a motor device coupled to a movable part to move the movable part. An external rotational force is input to the motor device in a case where the movable part receives an external force caused by a physical contact between an obstacle and the movable part. It is preferable to reduce an impact of the external rotational force on the motor device.

SUMMARY

In accordance with a first aspect of the present invention, a bicycle motor unit includes an electric motor and a transmitting structure. The electric motor is configured to generate a driving force. The transmitting structure is coupled to the electric motor to transmit the driving force from the electric motor to an actuated device of a bicycle. The transmitting structure includes a first rotatable member, a second rotatable member, and a resisting structure. The first rotatable member is rotatable about a rotational axis. The second rotatable member is rotatable relative to the first rotatable member about the rotational axis. The resisting structure is at least partially provided between the first rotatable member and the second rotatable member so as to resist relative rotation between the first rotatable member and the second rotatable member.

In accordance with a second aspect of the present invention, a bicycle derailleur includes a base member, a chain guide, and the bicycle motor unit according to the first aspect. The chain guide is movably coupled to the base member. The bicycle motor unit is provided to the base member to apply the driving force to the chain guide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
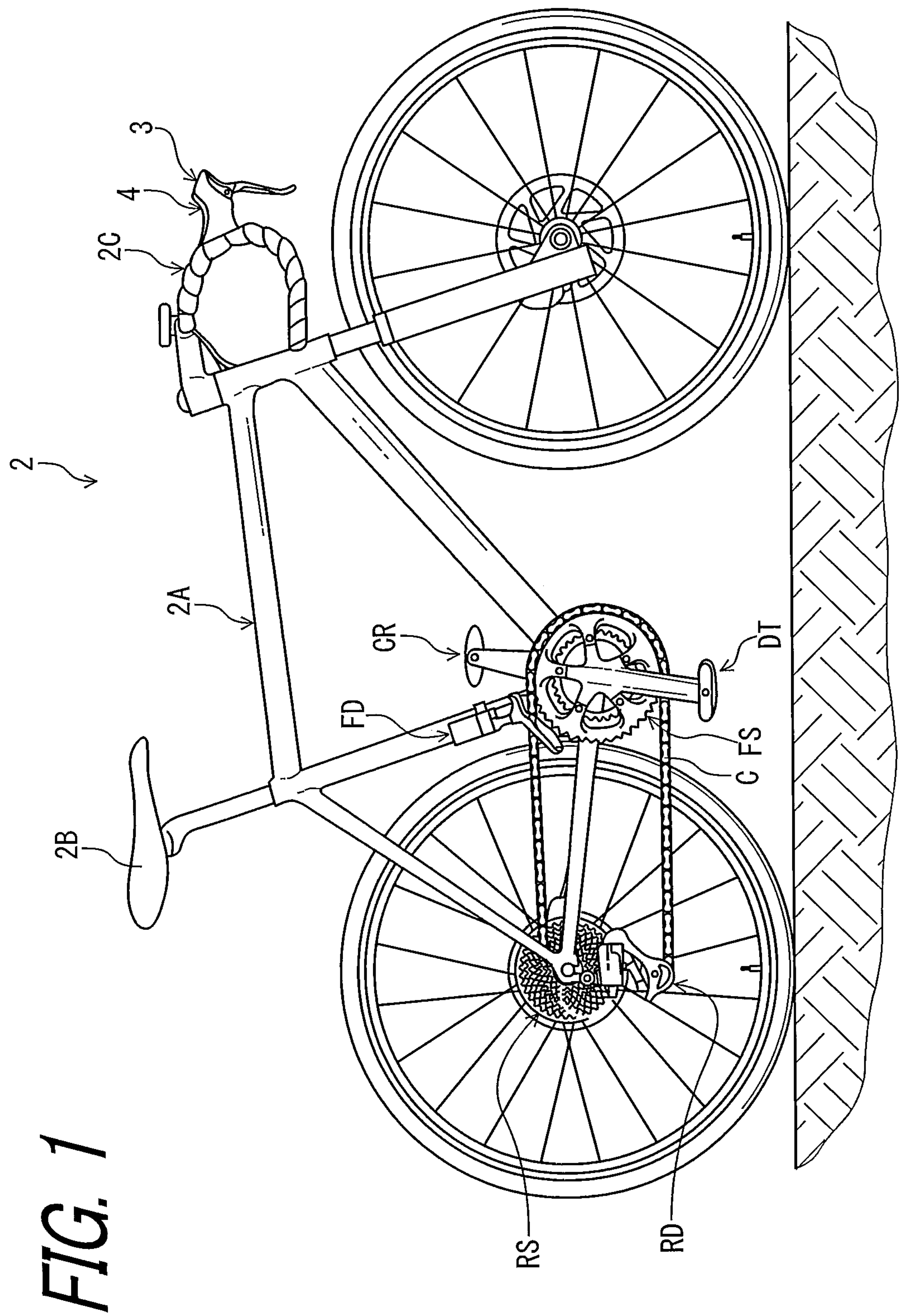
FIG. 1 is a side elevational view of a bicycle including a bicycle derailleur in accordance with a first embodiment.

The embodiments will now be described with reference to the accompanying drawings, wherein like reference numerals designate corresponding or identical elements throughout the various drawings.

First Embodiment

As seen in FIG. 1, a bicycle 2 includes a bicycle derailleur RD in accordance with a first embodiment. The bicycle 2 further includes a vehicle body 2A, a saddle 2B, a handlebar 2C, an operating device 3, an operating device 4, and a drive train DT. The operating devices 3 and 4 are configured to be mounted to the handlebar 2C. The drive train DT includes a crank CR, a front sprocket assembly FS, a rear sprocket assembly RS, a chain C, a bicycle derailleur FD, and the bicycle derailleur RD. The front sprocket assembly FS is secured to the crank CR. The rear sprocket assembly RS is rotatably mounted to the vehicle body 2A. The chain C is engaged with the front sprocket assembly FS and the rear sprocket assembly RS. The bicycle derailleur RD is mounted to the vehicle body 2A and is configured to shift the chain C relative to a plurality of sprockets of the rear sprocket assembly RS to change a gear position. The bicycle derailleur FD is configured to shift the chain C relative to a plurality of sprockets of the front sprocket assembly FS.

In the illustrated embodiment, the bicycle derailleur RD is applied to a road bike. However, the bicycle derailleur RD can be applied to an any kind of bicycles such as a mountain bike, a road bike, a city bike, a cargo bike, a hand bike, and a recumbent bike if needed and/or desired. Furthermore, the bicycle derailleur RD or modifications thereof can be applied to an electric bike (E-bike). The electric bike includes an electrically assisted bicycle configured to assist propulsion of a vehicle with an electric motor 33. The structure of the bicycle derailleur RD can be applied to the structure of the bicycle derailleur FD.

The bicycle derailleur RD is configured to be operated using the operating device 3. The bicycle derailleur FD is configured to be operated using the operating device 4. The bicycle derailleur RD is configured to be electrically connected to the operating devices 3 and 4. The bicycle derailleur RD is configured to be electrically connected to the bicycle derailleur FD.

In the first embodiment, the bicycle derailleur RD is configured to be wirelessly connected to the operating devices 3 and 4. The bicycle derailleur RD is configured to be wirelessly connected to the bicycle derailleur FD. The bicycle derailleur RD can be configured to be wirelessly communicate with the bicycle derailleur FD via at least one of a cycle computer, smart phone, a tablet, and a personal computer. The bicycle derailleur RD is configured to change the gear position in response to a control signal transmitted from the operating device 3. The bicycle derailleur RD is configured to transmit, to the bicycle derailleur FD, a control signal transmitted from the operating device 4. The bicycle derailleur FD is configured to change the gear position in response to the control signal transmitted from the operating device 4 via the bicycle derailleur RD. Each of the bicycle components RD and FD includes an electric power source such as a battery. However, at least one of the bicycle components RD and FD can be electrically connected to another electric power source such as a battery via an electric cable if needed and/or desired. Both the bicycle derailleur RD and the bicycle derailleur FD can be electrically connected to another electric power source such as a battery via an electric cable if needed and/or desired.

In the first embodiment, the bicycle derailleur RD includes a rear derailleur, and the bicycle derailleur FD includes a front derailleur. Namely, the bicycle derailleur RD can also be referred to as a bicycle rear derailleur RD. The bicycle derailleur FD can also be referred to as a bicycle front derailleur FD. Structures of the bicycle derailleur RD can be applied to other bicycle components such as the bicycle derailleur FD if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the bicycle 2 with facing the handlebar 2C. Accordingly, these terms, as utilized to describe the bicycle derailleur RD or other components, should be interpreted relative to the bicycle 2 equipped with the bicycle derailleur RD as used in an upright riding position on a horizontal surface.

Figure 2:
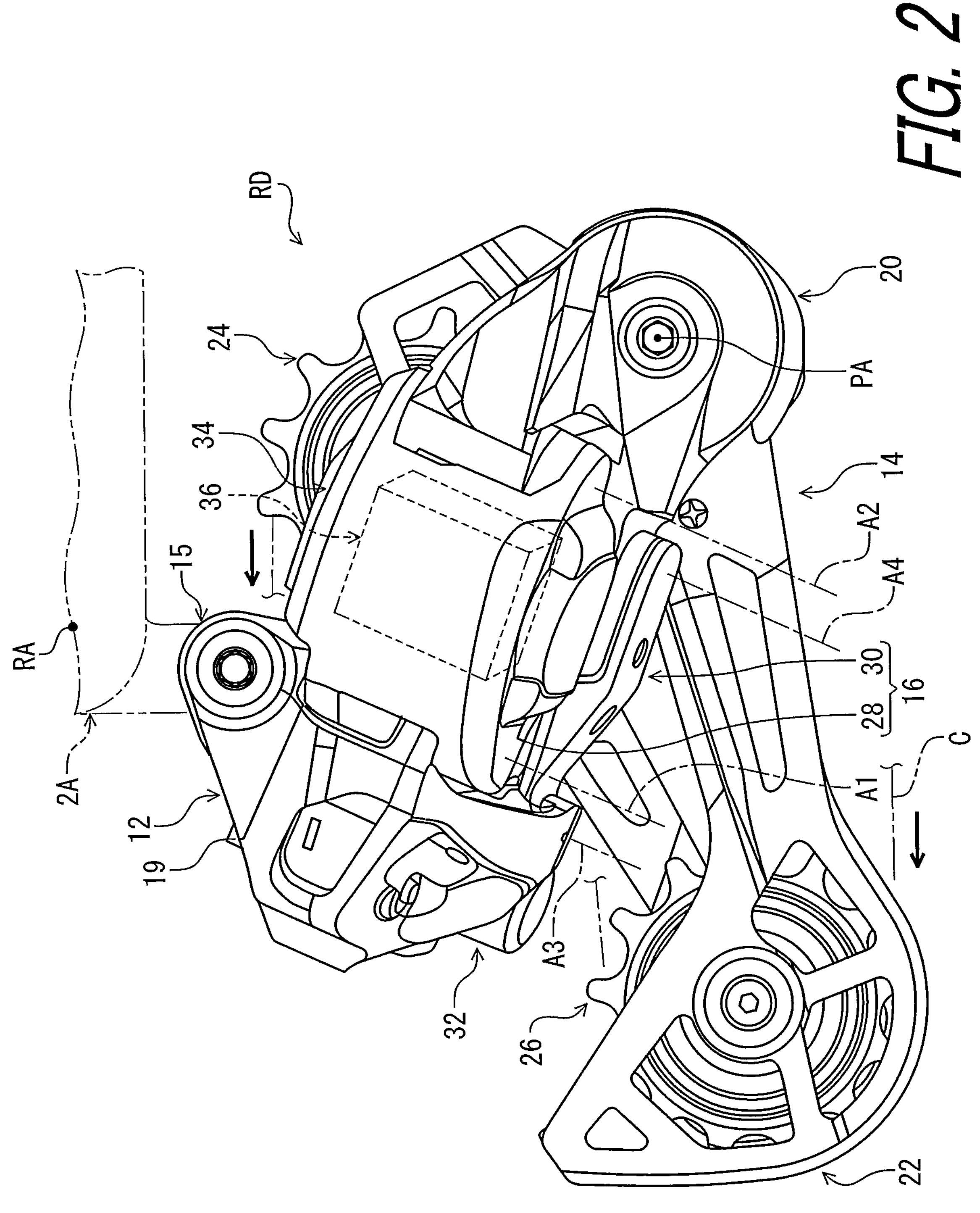
FIG. 2 is a side elevational view of the bicycle derailleur of the bicycle illustrated in FIG. 1.

As seen in FIG. 2, the bicycle derailleur RD comprises a base member 12 and a chain guide 14. The base member 12 is configured to be coupled to the vehicle body 2A. The base member 12 is configured to be coupled to the vehicle body 2A with a derailleur fastener 15. The chain guide 14 is movably coupled to the base member 12. The bicycle derailleur RD comprises a linkage 16. The chain guide 14 is movably coupled to the base member 12 via the linkage 16.

The base member 12 is pivotally coupled to the vehicle body 2A about the derailleur fastener 15. The bicycle derailleur RD includes an adjustment member 19. The adjustment member 19 is configured to change an orientation of the base member 12 relative to the vehicle body 2A about the derailleur fastener 15 in a state where the derailleur fastener 15 is loosened. Examples of the adjustment member 19 include a screw. The derailleur fastener 15 is tightened to secure the base member 12 to the vehicle body 2A in a state where the base member 12 is in a position adjusted using the adjustment member 19.

Figure 3:
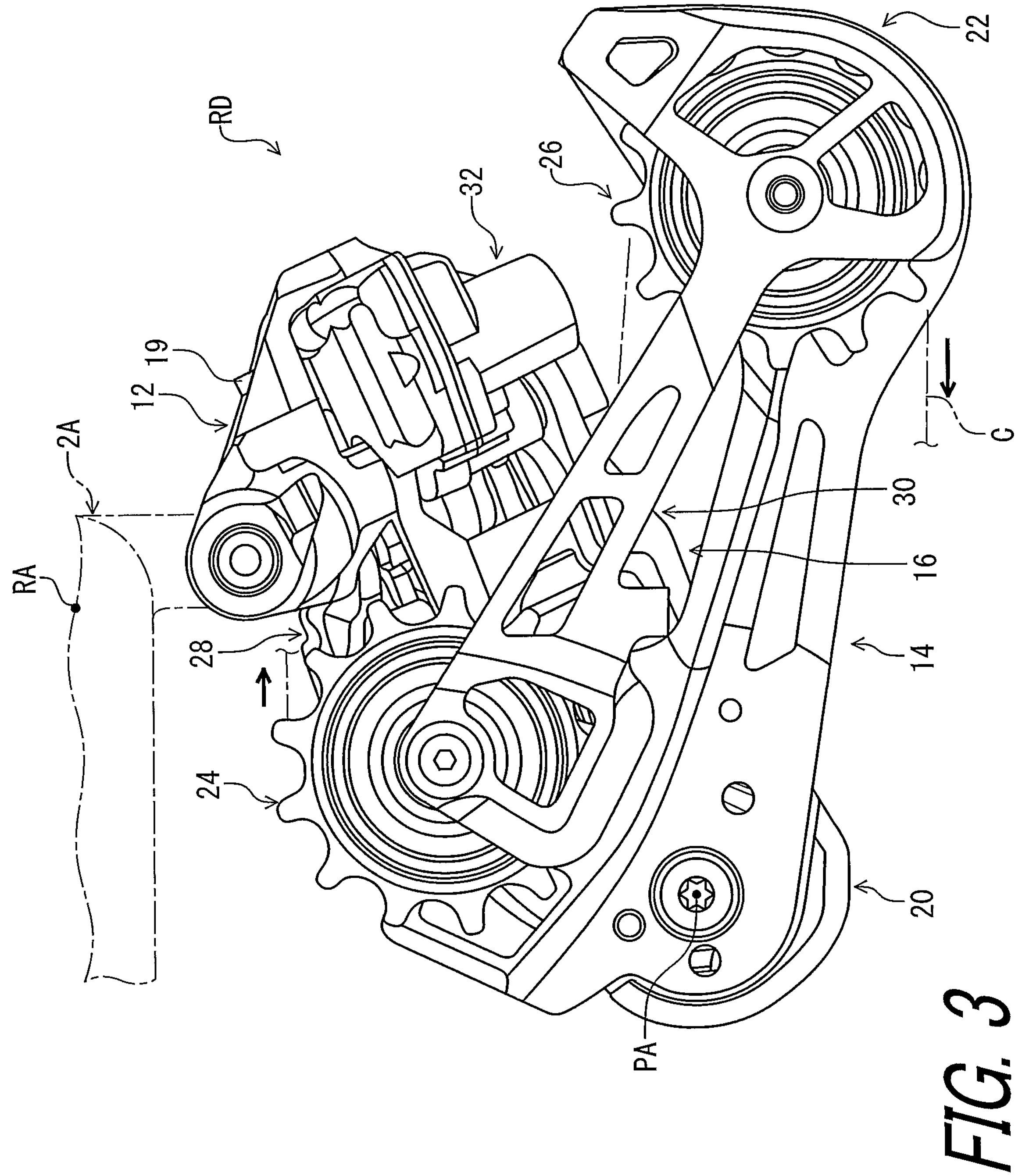
FIG. 3 is a side elevational view of the bicycle derailleur illustrated in FIG. 2.

As seen in FIG. 3, the chain guide 14 includes a coupling member 20, a guide plate 22, a guide pulley 24, and a tension pulley 26. The coupling member 20 is movably coupled to the base member 12 via the linkage 16. The guide plate 22 is pivotally coupled to the coupling member 20 about a pivot axis PA. The guide pulley 24 is rotatably coupled to the guide plate 22. The tension pulley 26 is rotatably coupled to the guide plate 22. The guide pulley 24 is configured to be engaged with the chain C. The tension pulley 26 is configured to be engaged with the chain C. The structure of the chain guide 14 is not limited to the above structure. For example, the coupling member 20 can be omitted from the chain guide 14 if needed and/or desired. The chain guide 14 can also be referred to as a movable member 14.

As seen in FIG. 2, the linkage 16 movably couples the base member 12 and the chain guide 14. The linkage 16 movably couples the base member 12 and the coupling member 20. In the present embodiment, the linkage 16 includes an outer link 28 and an inner link 30. The outer link 28 is pivotally coupled to the base member 12 about a first pivot axis A1. The outer link 28 is pivotally coupled to the chain guide 14 (e.g., the coupling member 20) about a second pivot axis A2. The inner link 30 is pivotally coupled to the base member 12 about a third pivot axis A3. The inner link 30 is pivotally coupled to the chain guide 14 (e.g., the coupling member 20) about a fourth pivot axis A4. The first to fourth pivot axes A1 to A4 are parallel to each other. However, one of the outer link 28 and the inner link 30 can be omitted from the linkage 16 if needed and/or desired. The structure of the linkage 16 is not limited to the above structure. At least one of the first to fourth pivot axes A1 to A4 can be non-parallel to another of the first to fourth pivot axes A1 to A4.

Figure 4:
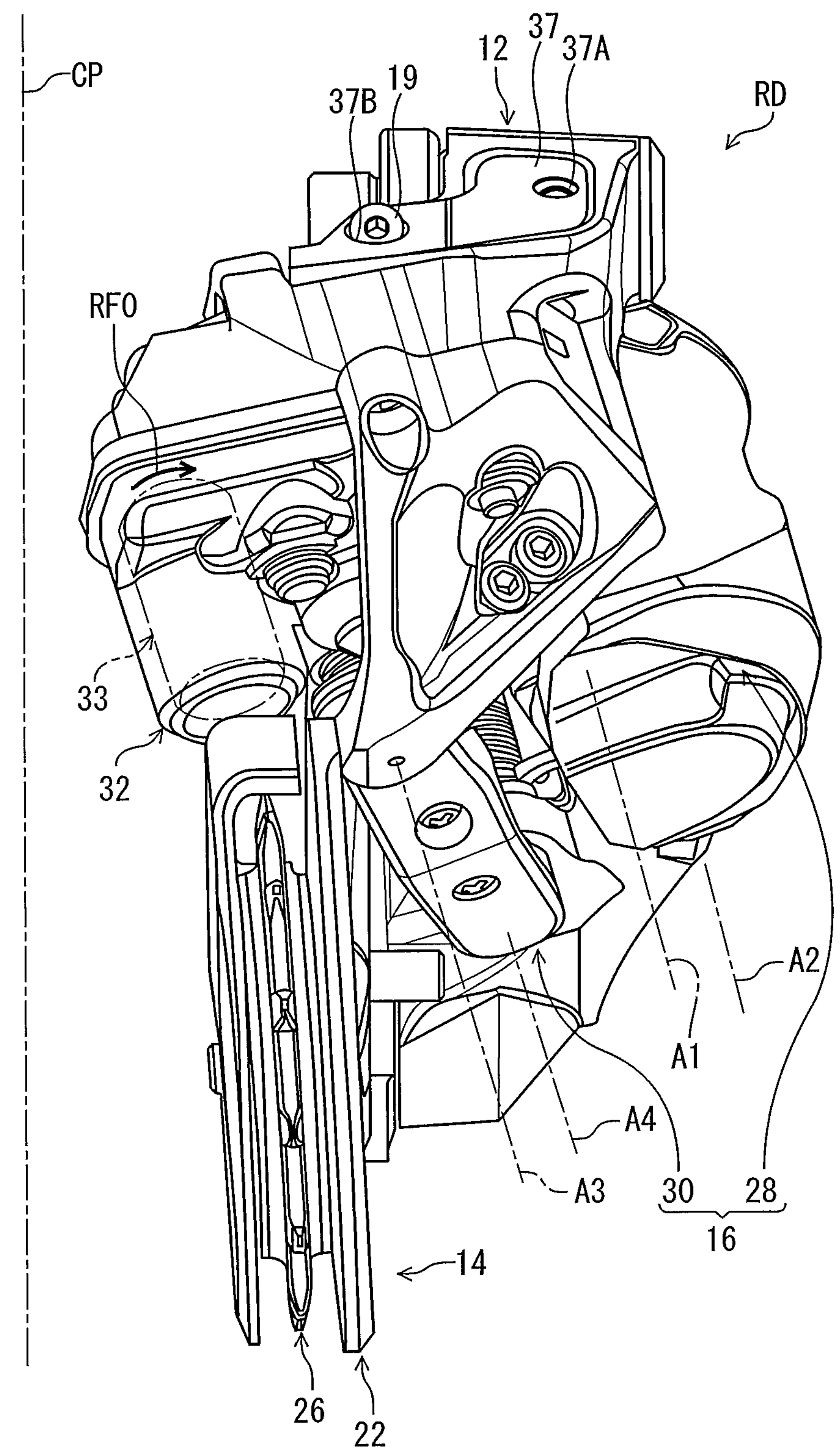
FIG. 4 is a rear view of the bicycle derailleur illustrated in FIG. 2.

As seen in FIG. 4, the inner link 30 is at least partially provided between the outer link 28 and a transverse center plane CP of the bicycle 2. The transverse center plane CP is defined to be perpendicular to a sprocket rotational axis RA (see e.g., FIG. 2) of the rear sprocket assembly RS (see e.g., FIG. 1).

The bicycle derailleur RD comprises a bicycle motor unit 32. The bicycle motor unit 32 comprises an electric motor 33. The electric motor 33 is configured to generate a driving force. The driving force includes a driving rotational force RF0. In the present application, the term "rotational force" can also be referred to as "torque" or "moment." The electric motor 33 is configured to generate the driving rotational force RF0. The electric motor 33 is configured to generate the driving rotational force RF0 to actuate an actuated device of the bicycle 2. In the present embodiment, the electric motor 33 is configured to generate the driving rotational force RF0 to move the chain guide 14 relative to the base member 12. However, the electric motor 33 can be configured to actuate another device other than the bicycle derailleur RD if needed and/or desired.

The bicycle motor unit 32 is provided to one of the base member 12, the chain guide 14, and the linkage 16. The electric motor 33 is provided to one of the base member 12, the chain guide 14, and the linkage 16. In the present embodiment, the bicycle motor unit 32 is provided to the base member 12. The electric motor 33 is provided to the base member 12. However, the bicycle motor unit 32 can be provided to one of the chain guide 14 and the linkage 16 if needed and/or desired. The electric motor 33 can be provided to one of the chain guide 14 and the linkage 16 if needed and/or desired.

The bicycle motor unit 32 is provided to the base member 12 to apply the driving force (e.g., the driving rotational force RF0) to the chain guide 14. The bicycle motor unit 32 is configured to move at least one of the chain guide 14 and the linkage 16 relative to the base member 12. In the present embodiment, the bicycle motor unit 32 is coupled to the linkage 16 to move the chain guide 14 via the linkage 16. However, the bicycle motor unit 32 can be directly coupled to the chain guide 14 to move the chain guide 14 relative to the base member 12 if needed and/or desired.

As seen in FIG. 2, the bicycle derailleur RD further comprises a power-supply attachment structure 34 to which an electric power source 36 is to be attached. The power-supply attachment structure 34 is configured to detachably hold the electric power source 36. The power-supply attachment structure 34 is electrically connected to the bicycle motor unit 32 to supply electricity from the electric power source 36 to the bicycle motor unit 32. Examples of the electric power source 36 include a battery such as a primary battery and a secondary battery. However, the power-supply attachment structure 34 can be omitted from the bicycle derailleur RD if needed and/or desired. In such embodiments, the bicycle derailleur RD can be configured to be electrically connected to another electric power source if needed and/or desired.

Figure 5:
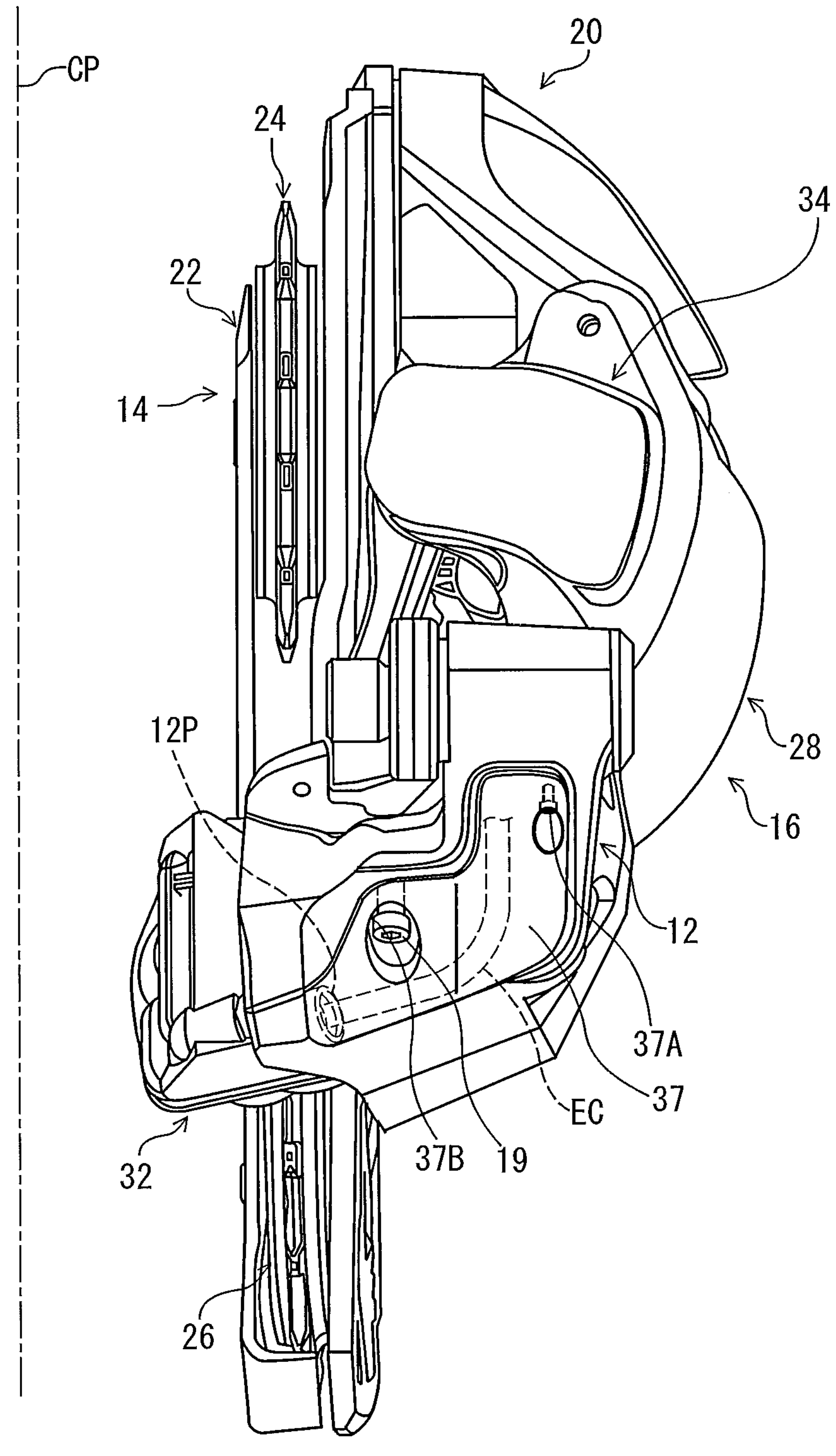
FIG. 5 is a top view of the bicycle derailleur illustrated in FIG. 2.

As seen in FIG. 5, the power-supply attachment structure 34 is provided to one of the base member 12, the chain guide 14, and the linkage 16. The bicycle motor unit 32 is provided to one of the base member 12, the chain guide 14, and the linkage 16. The power-supply attachment structure 34 is provided to another of the base member 12, the chain guide 14, and the linkage 16. The bicycle motor unit 32 is provided to one of the base member 12 and the linkage 16. The power-supply attachment structure 34 is provided to the other of the base member 12 and the linkage 16.

In the present embodiment, the bicycle motor unit 32 is provided to the base member 12. The power-supply attachment structure 34 is provided to the linkage 16. The power-supply attachment structure 34 is provided to the outer link 28. However, the bicycle motor unit 32 can be provided to one of the chain guide 14 and the linkage 16 if needed and/or desired. The bicycle motor unit 32 can be provided to one of the outer link 28 and the inner link 30 if needed and/or desired. The power-supply attachment structure 34 can be provided to one of the base member 12 and the chain guide 14 if needed and/or desired. The power-supply attachment structure 34 can be provided to the inner link 30 if needed and/or desired. The power-supply attachment structure 34 can be omitted from the bicycle motor unit 32 if needed and/or desired.

The bicycle derailleur RD includes a cover 37. The cover 37 is attached to the base member 12. The cover 37 is secured to the base member 12 with a fastener 37A such as a screw. The adjustment member 19 is provided at least partially outside the cover 37 in a cover attachment state where the cover 37 is attached to the base member 12. The cover 37 includes a hole 37B. The adjustment member 19 extends through the hole 37B of the cover 37 in the cover attachment state.

The base member 12 includes a connection port 12P to which an electric cable EC is electrically connected. The cover 37 at least partially covers the connection port 12P in the cover attachment state. The cover 37 at least partially covers the electric cable EC in the cover attachment state. The bicycle motor unit 32 is configured to be powered by electricity supplied from the electric power source 36 or electricity supplied from an external power source via the electric cable EC. The cover 37 can be omitted from the bicycle derailleur RD if needed and/or desired.

Figure 6:
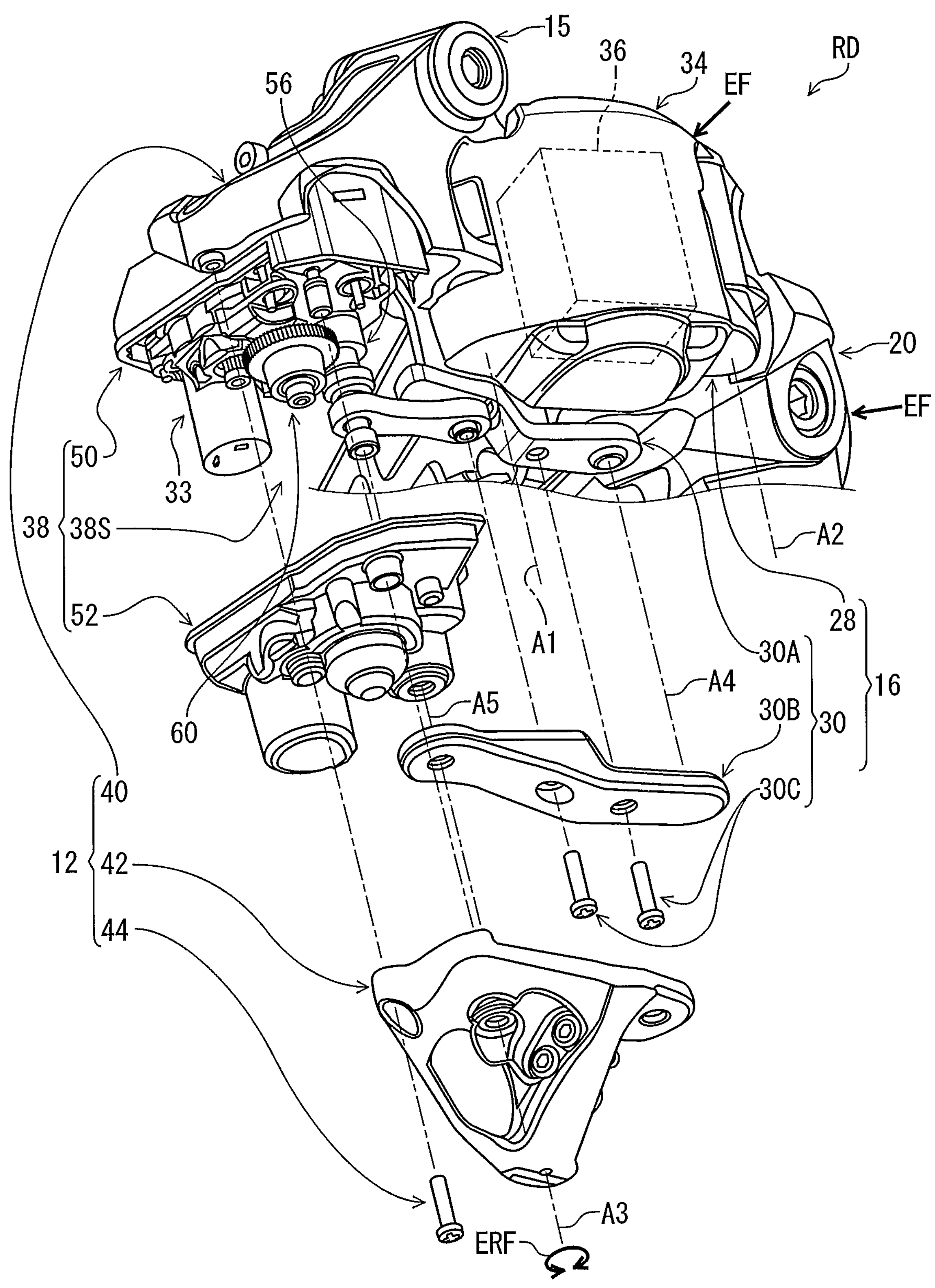
FIG. 6 is an exploded perspective view of the bicycle derailleur illustrated in FIG. 2.

As seen in FIG. 6, the bicycle motor unit 32 further comprises a housing 38 including an internal space 38S. The transmitting structure 60 is at least partially provided in the internal space 38S. In the present embodiment, the housing 38 is a separate member from the base member 12. However, the housing 38 can be at least partially provided integrally with the base member 12 as a one-piece unitary member.

The base member 12 includes a first base body 40, a second base body 42, and a fastener 44. The first base body 40 is configured to be coupled to the vehicle body 2A (see e.g., FIG. 2) with the derailleur fastener 15. The second base body 42 is a separate member from the first base body 40. The second base body 42 is fastened to the first base body 40 with the fastener 44 such as a screw. The bicycle motor unit 32 is provided between the first base body 40 and the second base body 42. The housing 38 is held between the first base body 40 and the second base body 42.

As seen in FIG. 6, the housing 38 includes a first housing 50 and a second housing 52. The first housing 50 and the second housing 52 define the internal space 38S between the first housing 50 and the second housing 52. In the present embodiment, the second housing 52 is a separate member from the first housing 50. However, the second housing 52 can be integrally provided with the first housing 50 as a one-piece unitary member if needed and/or desired.

The electric motor 33 is configured to generate the driving rotational force RF0 (see e.g., FIG. 7) using electricity supplied from the electric power source 36 via the power-supply attachment structure 34. The electric motor 33 is electrically connected to the power-supply attachment structure 34. The electric motor 33 is provided in the internal space 38S of the housing 38. The electric motor 33 is provided between the first housing 50 and the second housing 52.

The bicycle motor unit 32 comprises an output member 56. The electric motor 33 is coupled to the output member 56 to rotate the output member 56 relative to the housing 38 about an output rotational axis A5. The output member 56 extends along the output rotational axis A5. In the present embodiment, the output rotational axis A5 is coincident with the third pivot axis A3. The output member 56 is rotatable relative to the housing 38 about the third pivot axis A3. The inner link 30 is rotatable relative to the base member 12 about the output rotational axis A5. However, the output rotational axis A5 can be offset from the third pivot axis A3 if needed and/or desired.

The inner link 30 is coupled to the output member 56 to receive, from the output member 56, the driving rotational force RF0 transmitted from the electric motor 33 to the output member 56. The inner link 30 is coupled to the output member 56 to rotate along with the output member 56 relative to the housing 38 and the base member 12 about the third pivot axis A3. The inner link 30 includes an inner link body 30A, an inner link lever 30B, and fasteners 30C. The inner link body 30A is pivotally coupled to the base member 12 about the third pivot axis A3. The inner link body 30A is pivotally coupled to the chain guide 14 about the fourth pivot axis A4. The inner link lever 30B is fastened to the inner link body 30A with the fasteners 30C. The inner link lever 30B is coupled to the output member 56 to receive, from the output member 56, the driving rotational force RF0 transmitted from the electric motor 33. The inner link lever 30B is coupled to the output member 56 to rotate along with the output member 56 relative to the housing 38 and the base member 12 about the third pivot axis A3.

An external force EF is applied to at least one of the chain guide 14 and the linkage 16 in response to a physical contact between an obstacle and the at least one of the chain guide 14 and the linkage 16. Thus, external rotational force ERF is applied to the output member 56 via the linkage 16 in response to the external force EF. It is preferable to restrict the external rotational force ERF from being transmitted from at least one of the chain guide 14 and the linkage 16 to the electric motor 33.

Figure 7:
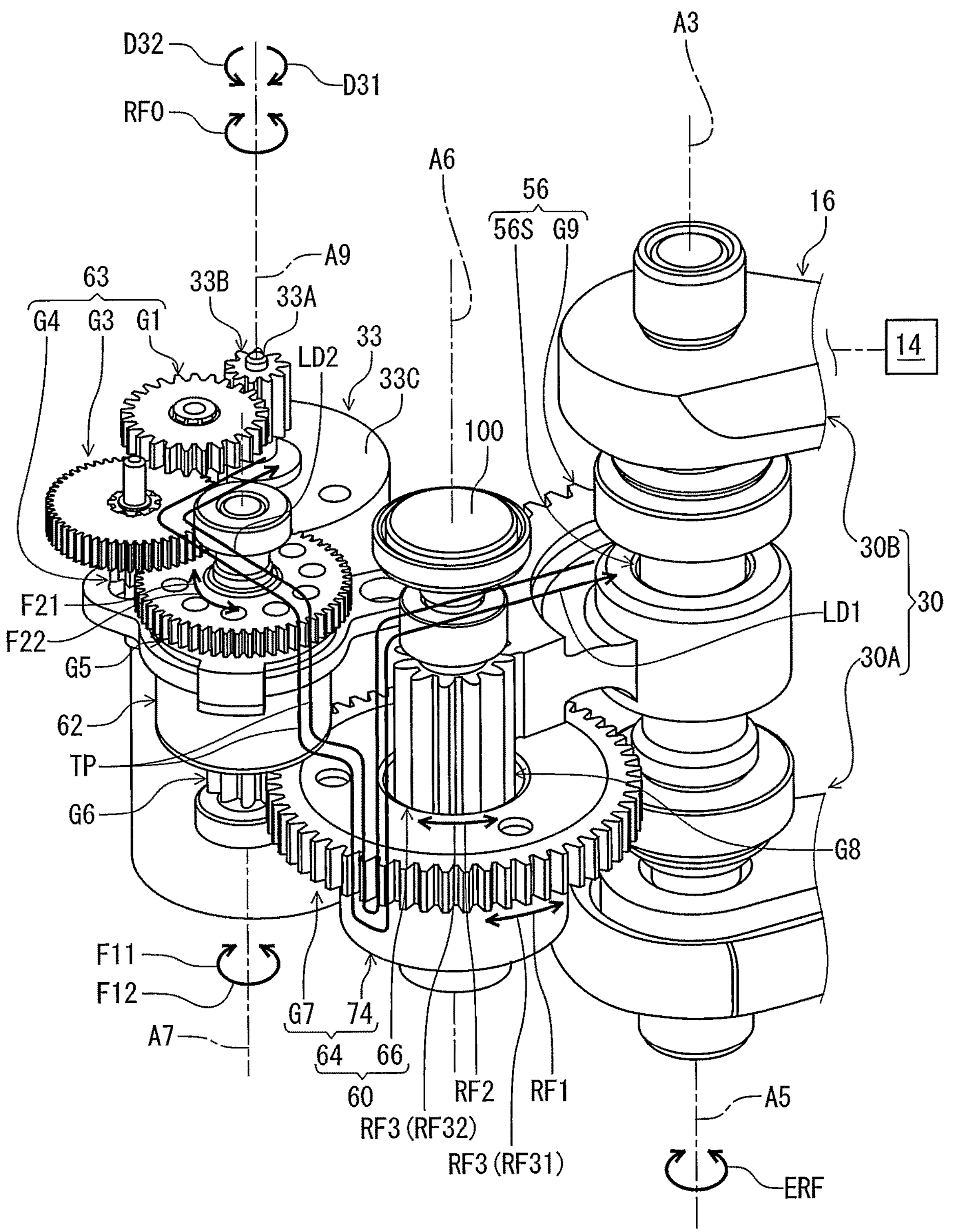
FIG. 7 is a perspective view of an internal structure of a bicycle motor unit of the bicycle derailleur illustrated in FIG. 2.

As seen in FIG. 7, the bicycle motor unit 32 comprises a transmitting structure 60. The transmitting structure 60 is coupled to the electric motor 33 to transmit the driving force (e.g., the driving rotational force RF0) from the electric motor 33 to the actuated device of the bicycle 2. The transmitting structure 60 is coupled to the electric motor 33 to transmit the driving force (e.g., the driving rotational force RF0) from the electric motor 33 to the chain guide 14.

The transmitting structure 60 is coupled to the electric motor 33 to transmit the driving rotational force RF0 from the electric motor 33 to at least one of the chain guide 14 and the linkage 16. In the present embodiment, the transmitting structure 60 is coupled to the electric motor 33 to transmit the driving rotational force RF0 from the electric motor 33 to the chain guide 14 via the linkage 16. However, the transmitting structure 60 can be configured to transmit the driving rotational force RF0 from the electric motor 33 to the chain guide 14 via the coupling member 20 or directly to the chain guide 14 if needed and/or desired.

The bicycle motor unit 32 comprises an additional transmitting structure 62. The transmitting structure 60 has a structure different from a structure of the additional transmitting structure 62. The additional transmitting structure 62 is coupled to the electric motor 33 to transmit the driving rotational force RF0 from the electric motor 33 to the actuated device of the bicycle 2. The additional transmitting structure 62 is coupled to the electric motor 33 to transmit the driving rotational force RF0 from the electric motor 33 to the chain guide 14. The additional transmitting structure 62 is coupled to the electric motor 33 to transmit the driving rotational force RF0 from the electric motor 33 to the chain guide 14.

The additional transmitting structure 62 is coupled to the electric motor 33 to transmit the driving rotational force RF0 from the electric motor 33 to at least one of the chain guide 14 and the linkage 16. In the present embodiment, the additional transmitting structure 62 is coupled to the electric motor 33 to transmit the driving rotational force RF0 from the electric motor 33 to the chain guide 14 via the linkage 16. However, the additional transmitting structure 62 can be configured to transmit the driving rotational force RF0 from the electric motor 33 to the chain guide 14 via the coupling member 20 or directly to the chain guide 14 if needed and/or desired.

The transmitting structure 60 is provided on a downstream side of the additional transmitting structure 62 on the power transmission path TP in a first power-transmission direction LD1 defined from the electric motor 33 to the output member 56. The transmitting structure 60 is provided on an upstream side of the additional transmitting structure 62 on the power transmission path TP in a second power-transmission direction LD2 defined from the output member 56 to the electric motor 33.

The bicycle motor unit 32 further comprises a speed reducer 63. The speed reducer 63 couples the electric motor 33 and the output member 56 to transmit the driving rotational force RF0 of the electric motor 33 to the output member 56. In the present embodiment, the speed reducer 63 includes the transmitting structure 60 and the additional transmitting structure 62. However, one of the transmitting structure 60 and the additional transmitting structure 62 can be omitted from the speed reducer 63 if needed and/or desired. The speed reducer 63 can include structures other than the transmitting structure 60 and the additional transmitting structure 62 in additional to the transmitting structure 60 and the additional transmitting structure 62 if needed and/or desired.

The electric motor 33 includes an output shaft 33A. The electric motor 33 includes a motor gear 33B and a motor housing 33C. The motor gear 33B is fastened to the output shaft 33A. The electric motor 33 is configured to rotate the output shaft 33A relative to the motor housing 33C about a motor rotational axis A9. The electric motor 33 is configured to generate the driving rotational force RF0.

Figure 8:
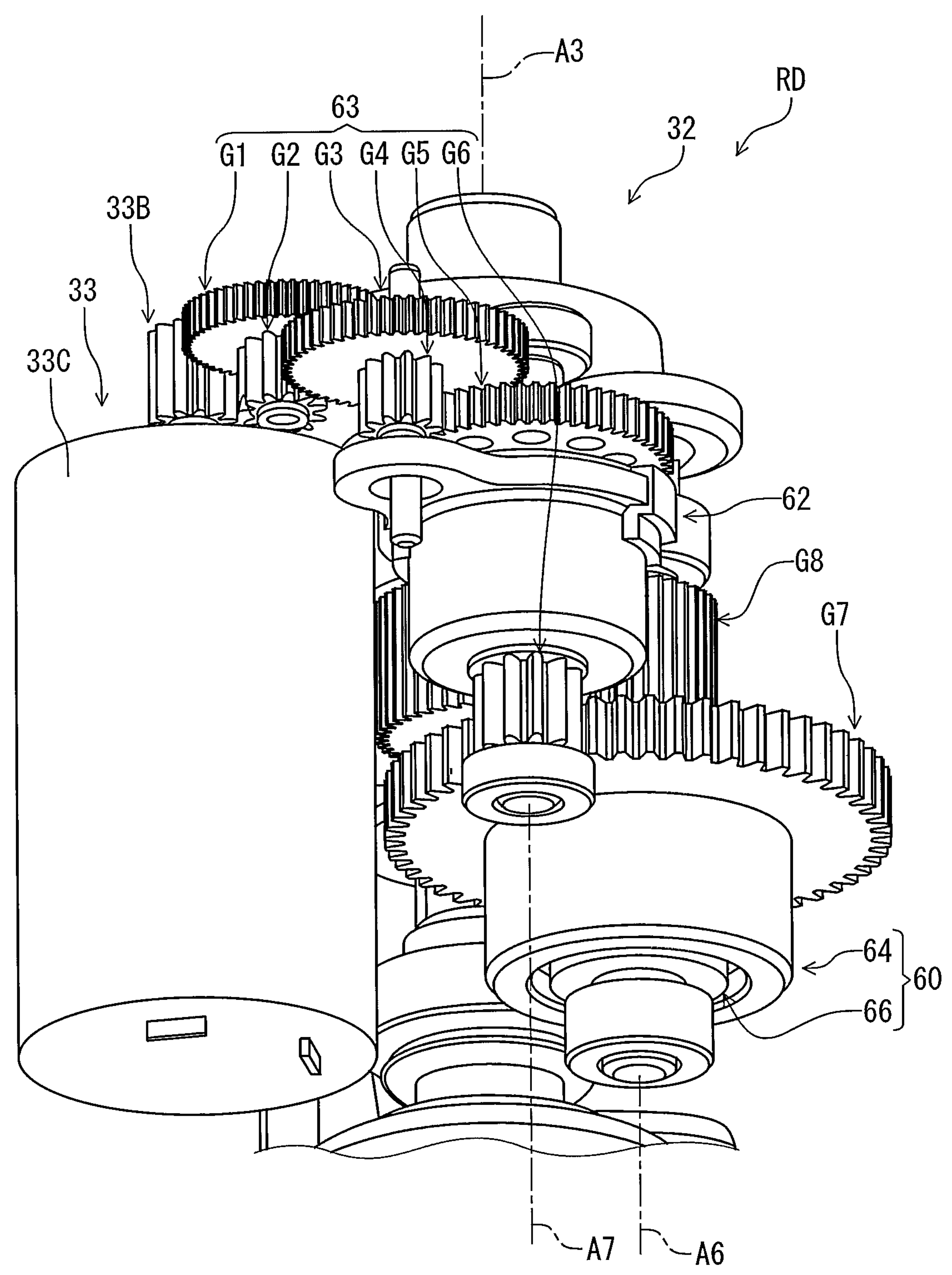
FIG. 8 is a perspective view of the internal structure of the bicycle motor unit of the bicycle derailleur illustrated in FIG. 2.

As seen in FIG. 8, the electric motor 33 is coupled to the additional transmitting structure 62. The electric motor 33 is coupled to the additional transmitting structure 62 via at least one gear. The speed reducer 63 includes gears G1, G2, G3, G4, and G5. Namely, the bicycle motor unit 32 includes the gears G1 to G5. The electric motor 33 is coupled to the additional transmitting structure 62 via the gears G1 to G5. The gear G1 meshes with the motor gear 33B of the electric motor 33. The gear G2 is rotatable along with the gear G1 relative to the housing 38 (see e.g., FIG. 16). The gear G2 meshes with the gear G3. The gear G4 is rotatable along with the gear G3 relative to the housing 38 (see e.g., FIG. 16). The gear G4 meshes with the gear G5. The additional transmitting structure 62 is coupled to the gear G5 to receive the driving rotational force RF0 generate by the electric motor 33 via the gears G1 to G5.

The additional transmitting structure 62 is coupled to the transmitting structure 60. The additional transmitting structure 62 is coupled to the transmitting structure 60 via at least one gear. The speed reducer 63 includes a gear G6. The gear G6 is coupled to the additional transmitting structure 62 to receive a rotational force from the additional transmitting structure 62. The transmitting structure 60 includes a gear G7. The gear G7 meshes with the gear G6. The additional transmitting structure 62 is coupled to the transmitting structure 60 via the gears G6 and G7. The gear G7 can also be referred to as a first gear G7. The gear G6 can also be referred to as a first additional gear G6.

As seen in FIG. 7, the transmitting structure 60 includes a gear G8. The output member 56 includes a shaft 56S and an output gear G9. The shaft 56S extends along the output rotational axis A5. The output gear G9 is coupled to the shaft 56S to rotate along with the shaft 56S about the output rotational axis A5. The gear G8 meshes with the output gear G9. The gear G8 can also be referred to as a second gear G8. The output gear G9 can also be referred to as a second additional gear G9.

The transmitting structure 60 is configured to protect the electric motor 33 from damage caused by the external force EF while allowing the driving rotational force RF0 to be transmitted from the electric motor 33 to at least one of the chain guide 14 and the linkage 16. The transmitting structure 60 is configured to restrict transmission of force from one of the chain guide 14 and the linkage 16 to the electric motor 33. The transmitting structure 60 is configured to reduce transmission of the force from one of the chain guide 14 and the linkage 16 to the electric motor 33.

The additional transmitting structure 62 is configured to protect the electric motor 33 from damage caused by the external force EF while allowing the driving rotational force RF0 to be transmitted from the electric motor 33 to at least one of the chain guide 14 and the linkage 16. The additional transmitting structure 62 is configured to restrict transmission of the force from one of the chain guide 14 and the linkage 16 to the electric motor 33. The additional transmitting structure 62 is configured to reduce transmission of the force from one of the chain guide 14 and the linkage 16 to the electric motor 33.

The transmitting structure 60 and the additional transmitting structure 62 are provided between the electric motor 33 and the output member 56 in a power transmission path TP provided from the electric motor 33 to the output member 56. The additional transmitting structure 62 is provided between the electric motor 33 and the transmitting structure 60 on the power transmission path TP provided from the electric motor 33 to the output member 56. The transmitting structure 60 is provided between the additional transmitting structure 62 and the output member 56 on the power transmission path TP. The power transmission path TP is defined from the electric motor 33 to the output member 56 through the additional transmitting structure 62 and the transmitting structure 60.

The transmitting structure 60 is configured to restrict transmission of the force from one of the chain guide 14 and the linkage 16 to the additional transmitting structure 62. The transmitting structure 60 is configured to reduce transmission of force from one of the chain guide 14 and the linkage 16 to the additional transmitting structure 62. The additional transmitting structure 62 is configured to restrict transmission of force from the transmitting structure 60 to the electric motor 33. The additional transmitting structure 62 is configured to reduce transmission of force from the transmitting structure 60 to the electric motor 33.

Figure 9:
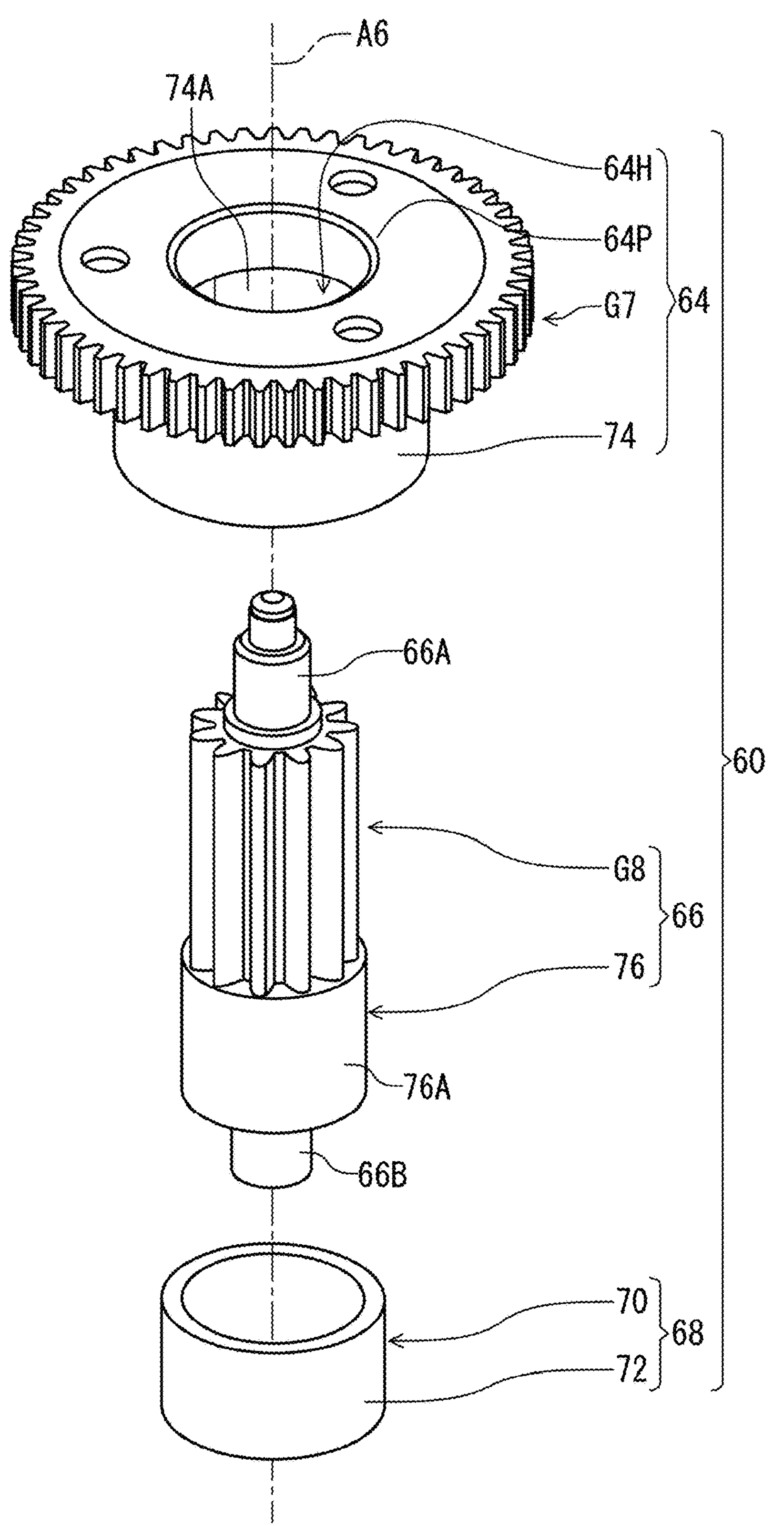
FIG. 9 is an exploded perspective view of a transmitting structure of the bicycle motor unit of the bicycle derailleur illustrated in FIG. 2.

As seen in FIG. 9, the transmitting structure 60 includes a first rotatable member 64, a second rotatable member 66, and a resisting structure 68. The first rotatable member 64 is rotatable about a rotational axis A6. The second rotatable member 66 is rotatable relative to the first rotatable member 64 about the rotational axis A6. In FIG. 9, the shape of the resisting structure 68 is simplified.

Figure 10:
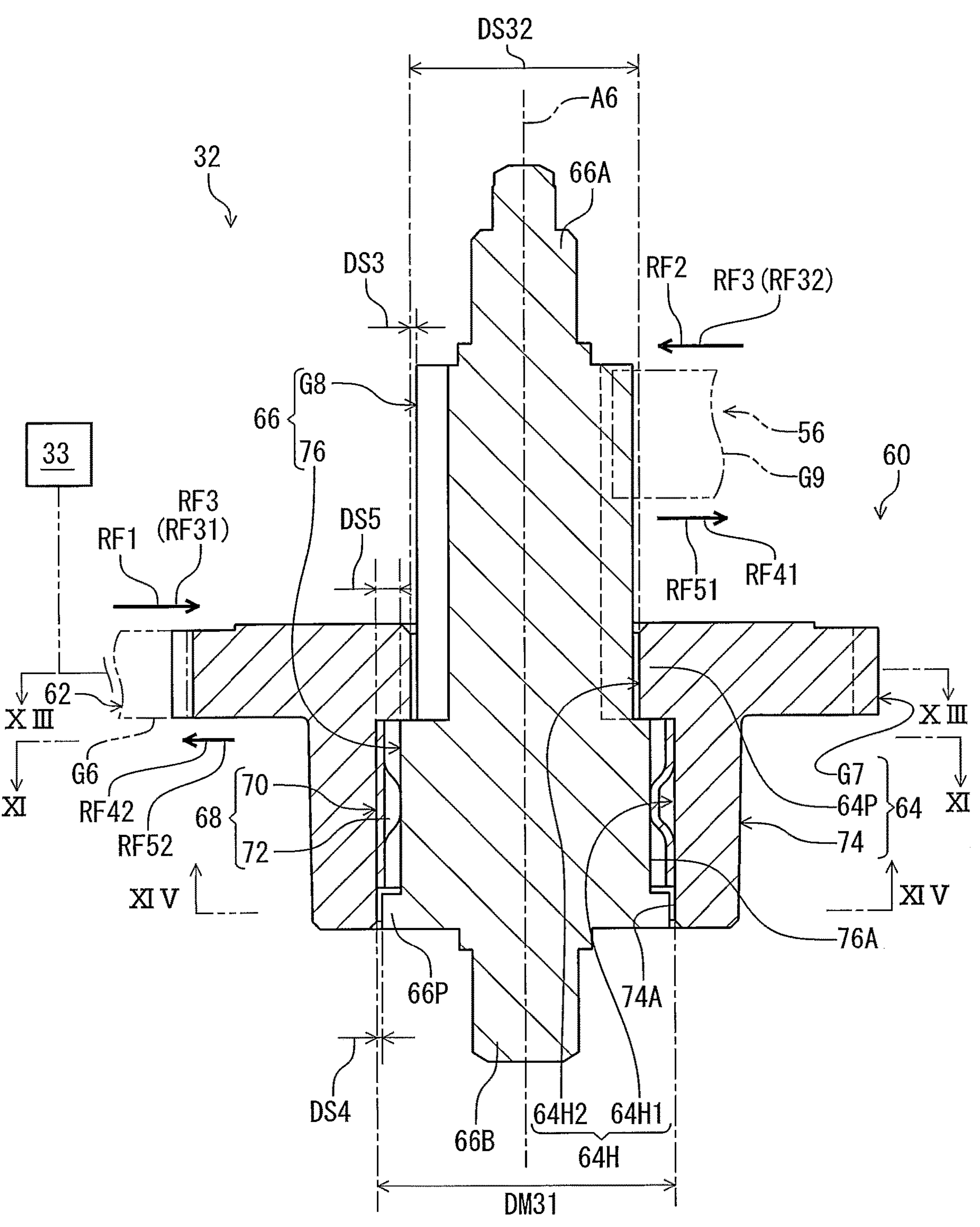
FIG. 10 is a cross-sectional view of the transmitting structure taken along line X-X of FIG. 13.

As seen in FIG. 10, the resisting structure 68 is at least partially provided radially between the first rotatable member 64 and the second rotatable member 66 with respect to the rotational axis A6 so as to resist relative rotation between the first rotatable member 64 and the second rotatable member 66. In the present embodiment, the resisting structure 68 is entirely provided radially between the first rotatable member 64 and the second rotatable member 66 with respect to the rotational axis A6 so as to resist the relative rotation between the first rotatable member 64 and the second rotatable member 66. However, the resisting structure 68 can be partially provided radially between the first rotatable member 64 and the second rotatable member 66 with respect to the rotational axis A6 so as to resist the relative rotation between the first rotatable member 64 and the second rotatable member 66 if needed and/or desired.

The first rotatable member 64 is radially spaced apart from the second rotatable member 66 with respect to the rotational axis A6. The second rotatable member 66 is at least partially provided radially inwardly of the first rotatable member 64 with respect to the rotational axis A6. In the present embodiment, the second rotatable member 66 is partially provided radially inwardly of the first rotatable member 64 with respect to the rotational axis A6. However, the second rotatable member 66 can be entirely provided radially inwardly of the first rotatable member 64 with respect to the rotational axis A6 if needed and/or desired. The first rotatable member 64 can be at least partially provided radially inwardly of the second rotatable member 66 with respect to the rotational axis A6 if needed and/or desired.

The resisting structure 68 includes a resisting member 70. The resisting member 70 is a separate member from at least one of the first rotatable member 64 and the second rotatable member 66. In the present embodiment, the resisting member 70 is a separate member from the first rotatable member 64 and the second rotatable member 66. However, the resisting member 70 can be integrally provided with at least one of the first rotatable member 64 and the second rotatable member 66 as a one-piece unitary member if needed and/or desired. The resisting structure 68 can be integrally provided with at least one of the first rotatable member 64 and the second rotatable member 66 as a one-piece unitary member if needed and/or desired.

The resisting member 70 includes a slidable member 72. The slidable member 72 is configured to slidably contact at least one of the first rotatable member 64 and the second rotatable member 66. The slidable member 72 is radially deformable with respect to the rotational axis A6. The slidable member 72 is radially deformed between the first rotatable member 64 and the second rotatable member 66. The slidable member 72 can be integrally provided with one of the first rotatable member 64 and the second rotatable member 66 as a one-piece unitary member if needed and/or desired.

Figure 11:
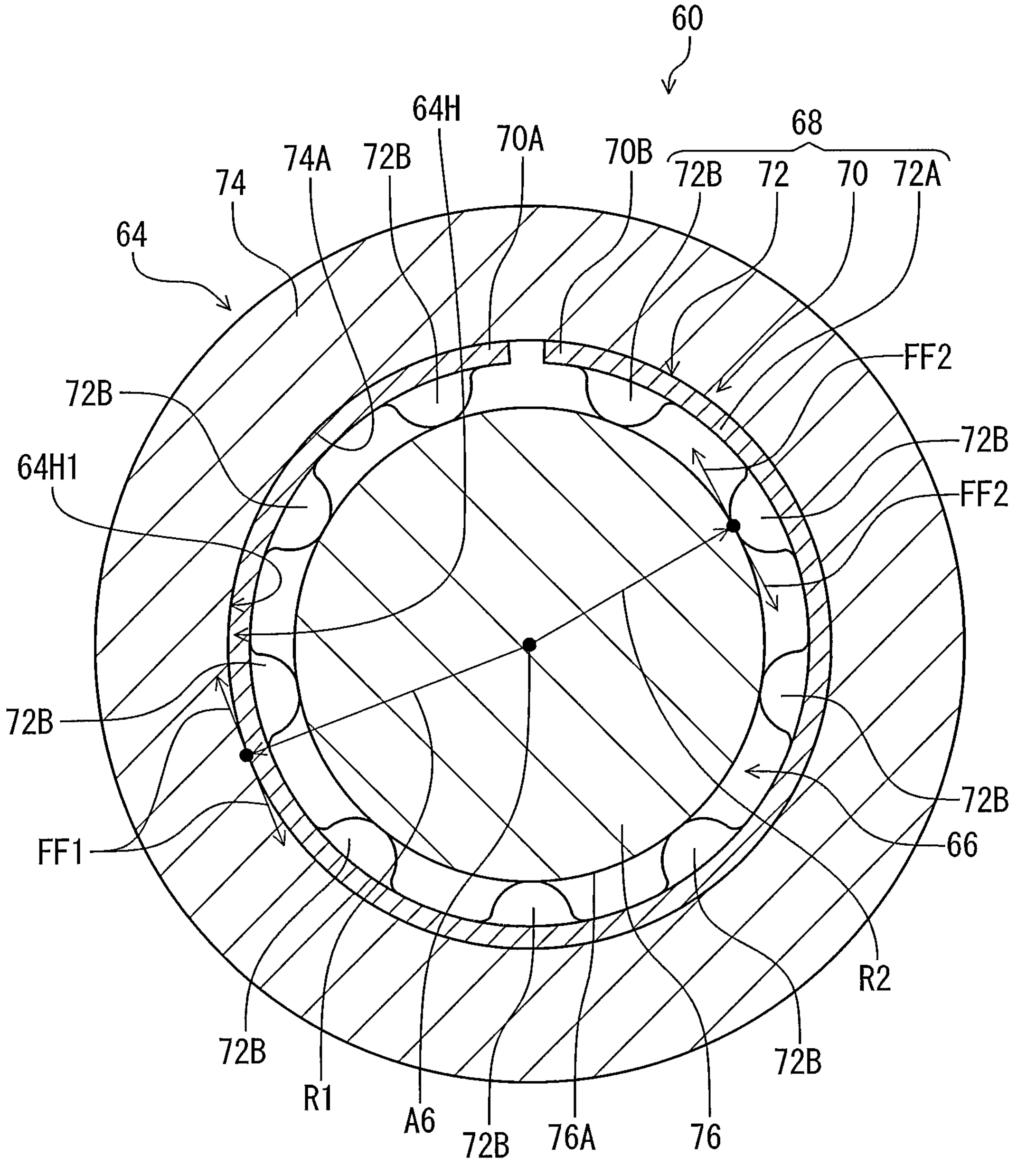
FIG. 11 is a cross-sectional view of the transmitting structure taken along line XI-XI of FIG. 10.

As seen in FIG. 11, the slidable member 72 circumferentially extends about the rotational axis A6. The slidable member 72 is configured to slidably contact both the first rotatable member 64 and the second rotatable member 66.

The slidable member 72 includes a base part 72A and at least two slidable parts 72B. The base part 72A slidably contacts the first rotatable member 64. The at least two slidable parts 72B slidably contacts the second rotatable member 66. The base part 72A circumferentially extends about the rotational axis A6. For example, the base part 72A has an arc shape. The at least two slidable parts 72B protrude radially from the base part 72A toward one of the first rotatable member 64 and the second rotatable member 66. The at least two slidable parts 72B protrude radially inwardly from the base part 72A toward the second rotatable member 66. The at least two slidable parts 72B are elastically deformable in a radial direction with respect to the rotational axis A6.

However, the at least two slidable parts 72B can be arranged to protrude radially outwardly from the base part 72A toward the first rotatable member 64 if needed and/or desired. The base part 72A can be configured to slidably contact the second rotatable member 66 if needed and/or desired. The at least two slidable parts 72B can be configured to slidably contact the first rotatable member 64 if needed and/or desired. The total number of the at least two slidable parts 72B is not limited to nine. The resisting member 70 can include members other than the slidable member 72 instead of or in addition to the slidable member 72 if needed and/or desired. The base part 72A can have other shapes such as an annular shape if needed and/or desired.

The resisting member 70 includes a first circumferential end 70A and a second circumferential end 70B and extends between the first circumferential end 70A and the second circumferential end 70B. The slidable member 72 includes the first circumferential end 70A and the second circumferential end 70B. The base part 72A includes the first circumferential end 70A and the second circumferential end 70B. In the present embodiment, the first circumferential end 70A is circumferentially spaced apart from the second circumferential end 70B about the rotational axis A6. However, the first circumferential end 70A can be integrally coupled to the second circumferential end 70B to form a closed loop if needed and/or desired.

The at least two slidable parts 72B are integrally provided with the base part 72A as a one-piece unitary member. The slidable member 72 is formed with press working. However, at least one of the at least two slidable parts 72B can be a separate part from the base part 72A if needed and/or desired.

As seen in FIG. 10, the first rotatable member 64 includes a first coupling portion 74 coupled to the resisting structure 68. The second rotatable member 66 includes a second coupling portion 76 coupled to the resisting structure 68. The second coupling portion 76 is at least partially provided radially inwardly of the first coupling portion 74. The first coupling portion 74 has a tubular shape. The first rotatable member 64 includes a hole 64H. The hole 64H extends along the rotational axis A6. The first coupling portion 74 includes the hole 264H. The second coupling portion 76 is at least partially provided in the hole 64H.

In the present embodiment, the second coupling portion 76 is entirely provided radially inwardly of the first coupling portion 74. The second coupling portion 76 is entirely provided in the hole 64H. However, the second coupling portion 76 can be partially provided radially inwardly of the first coupling portion 74 if needed and/or desired. The second coupling portion 76 can be partially provided in the hole 64H if needed and/or desired. The first coupling portion 74 can be at least partially provided radially inwardly of the second coupling portion 76 if needed and/or desired.

The first coupling portion 74 can also be referred to as a first adjacent portion 74 or a first contact portion 74. The second coupling portion 76 can also be referred to as a second adjacent portion 76 or a second contact portion 76.

Figure 12:
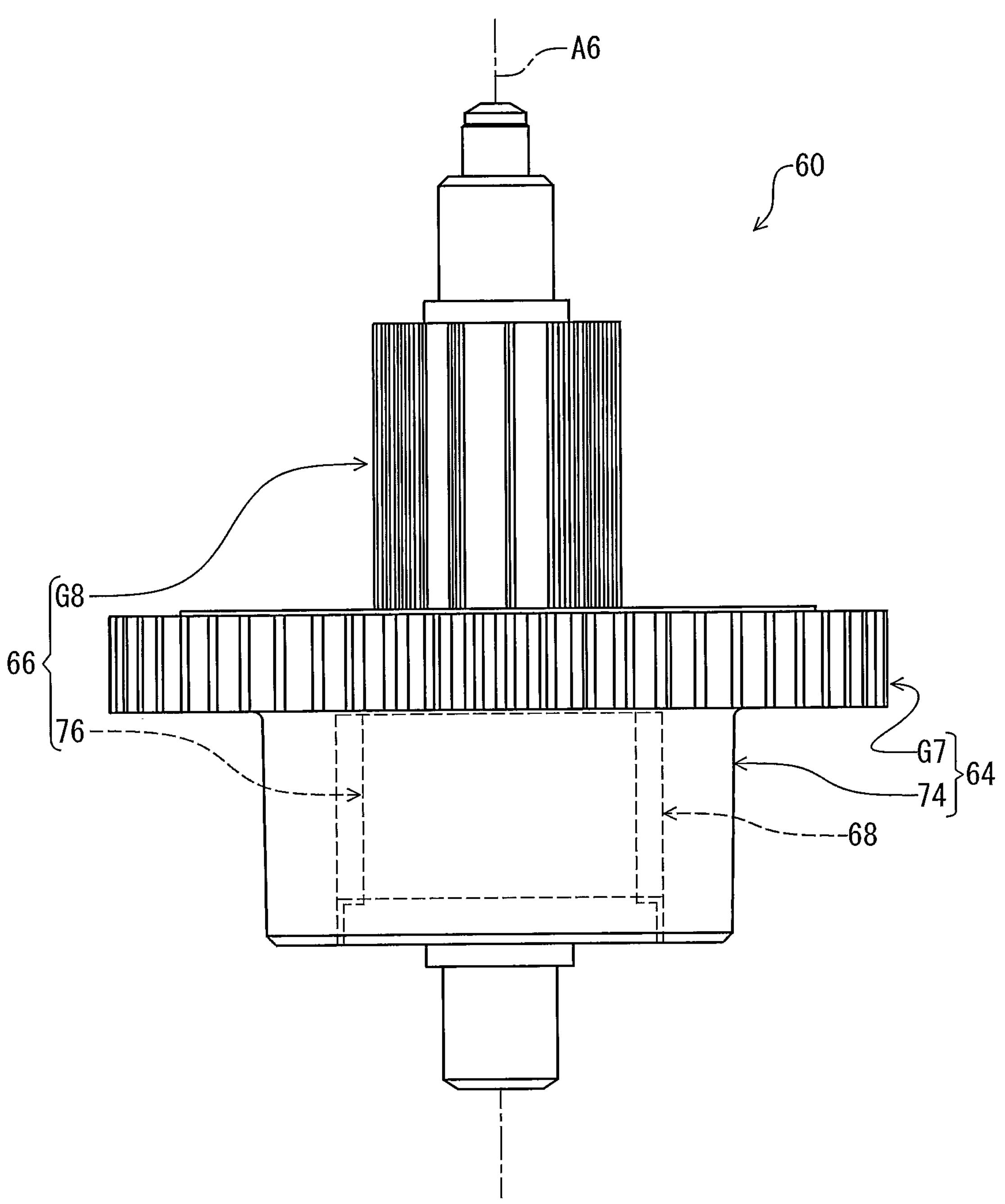
FIG. 12 is a side elevational view of the transmitting structure illustrated in FIG. 10.

As seen in FIG. 12, the resisting structure 68 at least partially overlaps at least one of the first coupling portion 74 and the second coupling portion 76 as viewed in a radial direction with respect to the rotational axis A6. In the present embodiment, the resisting structure 68 entirely overlaps the first coupling portion 74 as viewed in the radial direction with respect to the rotational axis A6. The resisting structure 68 partially overlaps the second coupling portion 76 as viewed in the radial direction with respect to the rotational axis A6. However, the resisting structure 68 can be arranged to partially overlap the first coupling portion 74 as viewed in the radial direction with respect to the rotational axis A6 if needed and/or desired. The resisting structure 68 can be arranged to partially overlap the second coupling portion 76 as viewed in the radial direction with respect to the rotational axis A6 if needed and/or desired.

As seen in FIG. 10, the first rotatable member 64 is operatively coupled to the electric motor 33 to receive the driving force (e.g., the driving rotational force RF0) from the electric motor 33. The second rotatable member 66 is configured to receive the driving force (e.g., the driving rotational force RF0) from the electric motor 33 via the resisting structure 68 and the first rotatable member 64. However, the second rotatable member 66 can be operatively coupled to the electric motor 33 to receive the driving force (e.g., the driving rotational force RF0) from the electric motor 33 if needed and/or desired. The first rotatable member 64 is configured to receive the driving force (e.g., the driving rotational force RF0) from the electric motor 33 via the resisting structure 68 and the second rotatable member 66 if needed and/or desired.

As seen in FIG. 7, the first rotatable member 64 includes the first gear G7. The second rotatable member 66 includes the second gear G8. The first gear G7 is configured to mesh with the first additional gear G6 to receive the driving force (e.g., the driving rotational force RF0) from the electric motor 33 via the first additional gear G6. The second gear G8 is configured to mesh with the second additional gear G9 to transmit the driving force (e.g., the driving rotational force RF0) to the second additional gear G9. The first gear G7 is configured to mesh with the first additional gear G6 to receive the driving rotational force RF0 from the electric motor 33 via the first additional gear G6. The second gear G8 is configured to mesh with the second additional gear G9 to transmit the driving rotational force RF0 to the second additional gear G9.

As seen in FIG. 10, the first gear G7 is coupled to the first coupling portion 74. The first coupling portion 74 extends from the first gear G7 along the rotational axis A6. The first gear G7 protrudes radially from the first coupling portion 74 with respect to the rotational axis A6. The first gear G7 protrudes radially outwardly from the first coupling portion 74 with respect to the rotational axis A6. In the present embodiment, the first gear G7 is integrally provided with the first coupling portion 74 as a one-piece unitary member.

However, the first gear G7 can be a separate member from the first coupling portion 74 if needed and/or desired.

The second gear G8 is coupled to the second coupling portion 76. The second coupling portion 76 extends from the second gear G8 along the rotational axis A6. The second gear G8 extends from the second coupling portion 76 along the rotational axis A6. In the present embodiment, the second gear G8 is integrally provided with the second coupling portion 76 as a one-piece unitary member. However, the second gear G8 can be a separate member from the second coupling portion 76 if needed and/or desired.

As seen in FIG. 10, the first rotatable member 64 includes a first protruding portion 64P. The first protruding portion 64P is provided radially closer to the second rotatable member 66 than the first coupling portion 74 with respect to the rotational axis A6. The first protruding portion 64P protrudes radially from the first coupling portion 74 towards the second rotatable member 66 with respect to the rotational axis A6. Grease can be provided between the first protruding portion 64P and the second rotatable member 66. Grease can be provided between the first protruding portion 64P and the second gear G8.

In the present embodiment, the first protruding portion 64P is provided radially inwardly closer to the second rotatable member 66 than the first coupling portion 74 with respect to the rotational axis A6. The first protruding portion 64P is provided radially inwardly closer to the second gear G8 than the first coupling portion 74 with respect to the rotational axis A6. The first protruding portion 64P protrudes radially inwardly from the first coupling portion 74 towards the second rotatable member 66 with respect to the rotational axis A6. The first protruding portion 64P protrudes radially inwardly from the first coupling portion 74 towards the second gear G8 with respect to the rotational axis A6. The first protruding portion 64P has an annular shape.

However, the first protruding portion 64P can be provided radially outwardly closer to the second rotatable member 66 than the first coupling portion 74 with respect to the rotational axis A6 if needed and/or desired. The first protruding portion 64P can be arranged to protrude radially outwardly from the first coupling portion 74 towards the second rotatable member 66 with respect to the rotational axis A6 if needed and/or desired. The first protruding portion 64P can be provided radially outwardly of the first contact surface 74A if needed and/or desired. The first protruding portion 64P can have a shape other than the annular shape if needed and/or desired.

In the present embodiment, the first protruding portion 64P is integrally provided with the first coupling portion 74 and the first gear G7. However, the first protruding portion 64P can be a separate member from at least one of the first coupling portion 74 and the first gear G7 if needed and/or desired.

The hole 64H includes a first hole 64H1 and a second hole 64H2. The first coupling portion 74 defines the first hole 64H1. The first protruding portion 64P defines the second hole 64H2. The first hole 64H1 has a first inner diameter DM31. The second hole 64H2 has a second inner diameter DM32. The second inner diameter DM32 is smaller than the first inner diameter DM31. However, the second inner diameter DM32 can be larger than or equal to the first inner diameter DM31 if needed and/or desired.

The second gear G8 is at least partially provided in the hole 64H. The second gear G8 is at least partially provided in the second hole 64H2. In the present embodiment, the second gear G8 is partially provided in the hole 64H. The second gear G8 is partially provided in the second hole 64H2. However, the second gear G8 can be entirely provided in the hole 64H if needed and/or desired. The second gear G8 can be entirely provided in at least one of the first hole 64H1 and the second hole 64H2 if needed and/or desired.

As seen in FIG. 11, the first coupling portion 74 includes a first contact surface 74A contactable with the resisting structure 68. The second coupling portion 76 includes a second contact surface 76A contactable with the resisting structure 68. The first contact surface 74A at least partially defines the hole 64H. The first contact surface 74A at least partially defines the first hole 64H1. The first contact surface 74A circumferentially extends about the rotational axis A6. The second contact surface 76A circumferentially extends about the rotational axis A6. The first contact surface 74A radially faces toward the second contact surface 76A. The second contact surface 76A radially faces toward the first contact surface 74A.

The first contact surface 74A is radially spaced apart from the second contact surface 76A with respect to the rotational axis A6. In the present embodiment, the first contact surface 74A is provided radially outwardly of the second contact surface 76A with respect to the rotational axis A6. However, the first contact surface 74A can be provided radially inwardly of the second contact surface 76A with respect to the rotational axis A6 if needed and/or desired.

As seen in FIG. 10, the second rotatable member 66 includes a second protruding portion 66P. The second protruding portion 66P is provided radially closer to the first rotatable member 64 than the second coupling portion 76 with respect to the rotational axis A6. The second protruding portion 66P protrudes radially from the second coupling portion 76 towards the first rotatable member 64 with respect to the rotational axis A6.

In the present embodiment, the second protruding portion 66P is provided radially inwardly closer to the first rotatable member 64 than the second coupling portion 76 with respect to the rotational axis A6. The second protruding portion 66P is provided radially inwardly closer to the first coupling portion 74 than the second coupling portion 76 with respect to the rotational axis A6. The second protruding portion 66P protrudes radially inwardly from the second coupling portion 76 towards the first rotatable member 64 with respect to the rotational axis A6. The second protruding portion 66P protrudes radially inwardly from the second coupling portion 76 towards the first coupling portion 74 with respect to the rotational axis A6. The second protruding portion 66P is provided radially inwardly of the second contact surface 76A. The second protruding portion 66P has an annular shape.

However, the second protruding portion 66P is provided radially outwardly closer to the first rotatable member 64 than the second coupling portion 76 with respect to the rotational axis A6 if needed and/or desired. The second protruding portion 66P can be arranged to protrude radially outwardly from the second coupling portion 76 towards the first rotatable member 64 with respect to the rotational axis A6 if needed and/or desired. The second protruding portion 66P can be provided radially outwardly of the second contact surface 76A if needed and/or desired. The second protruding portion 66P can have any shape other than the annular shape if needed and/or desired.

A first distance DS3 is defined radially between the first protruding portion 64P and the second gear G8. A second distance DS4 is defined radially between the second protruding portion 66P and the first coupling portion 74. A third distance DS5 is defined radially between the first coupling portion 74 and the second coupling portion 76. In the present embodiment, each of the first distance DS3 and the second distance DS4 is shorter than the third distance DS5. However, at least one of the first distance DS3 and the second distance DS4 can be longer than or equal to the third distance DS5 if needed and/or desired. The first protruding portion 64P can be omitted from the first rotatable member 64 if needed and/or desired. The second protruding portion 66P can be omitted from the second rotatable member 66 if needed and/or desired. At least one of the first distance DS3 and the second distance DS4 can be zero.

Figure 13:
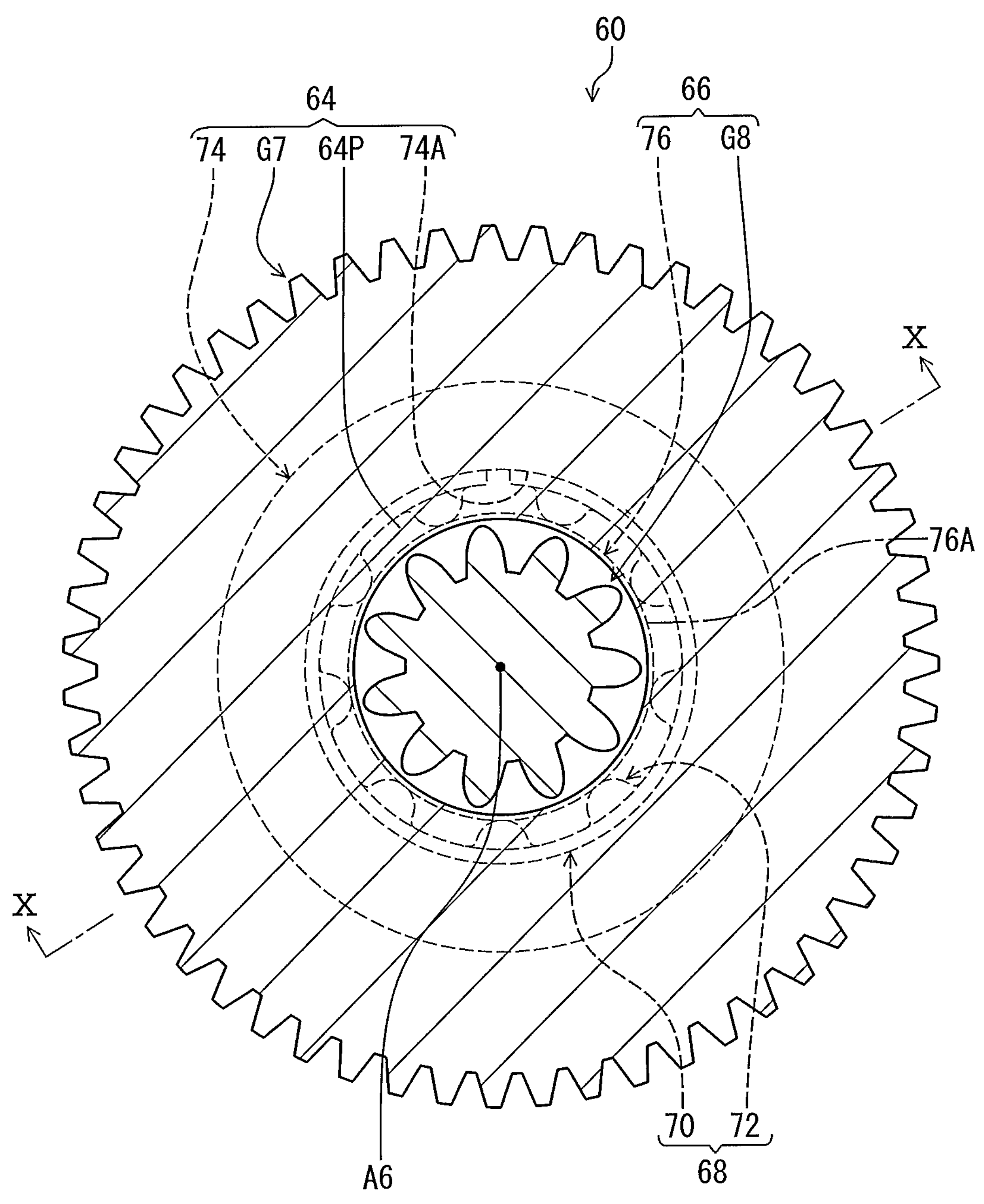
FIG. 13 is a cross-sectional view of the transmitting structure taken along line XIII-XIII of FIG. 10.

As seen in FIG. 13, the first protruding portion 64P at least partially overlaps the resisting structure 68 as viewed along the rotational axis A6. In the present embodiment, the first protruding portion 64P entirely overlaps the resisting structure 68 as viewed along the rotational axis A6. However, the first protruding portion 64P can be arranged to partially overlap the resisting structure 68 as viewed along the rotational axis A6 if needed and/or desired.

Figure 14:
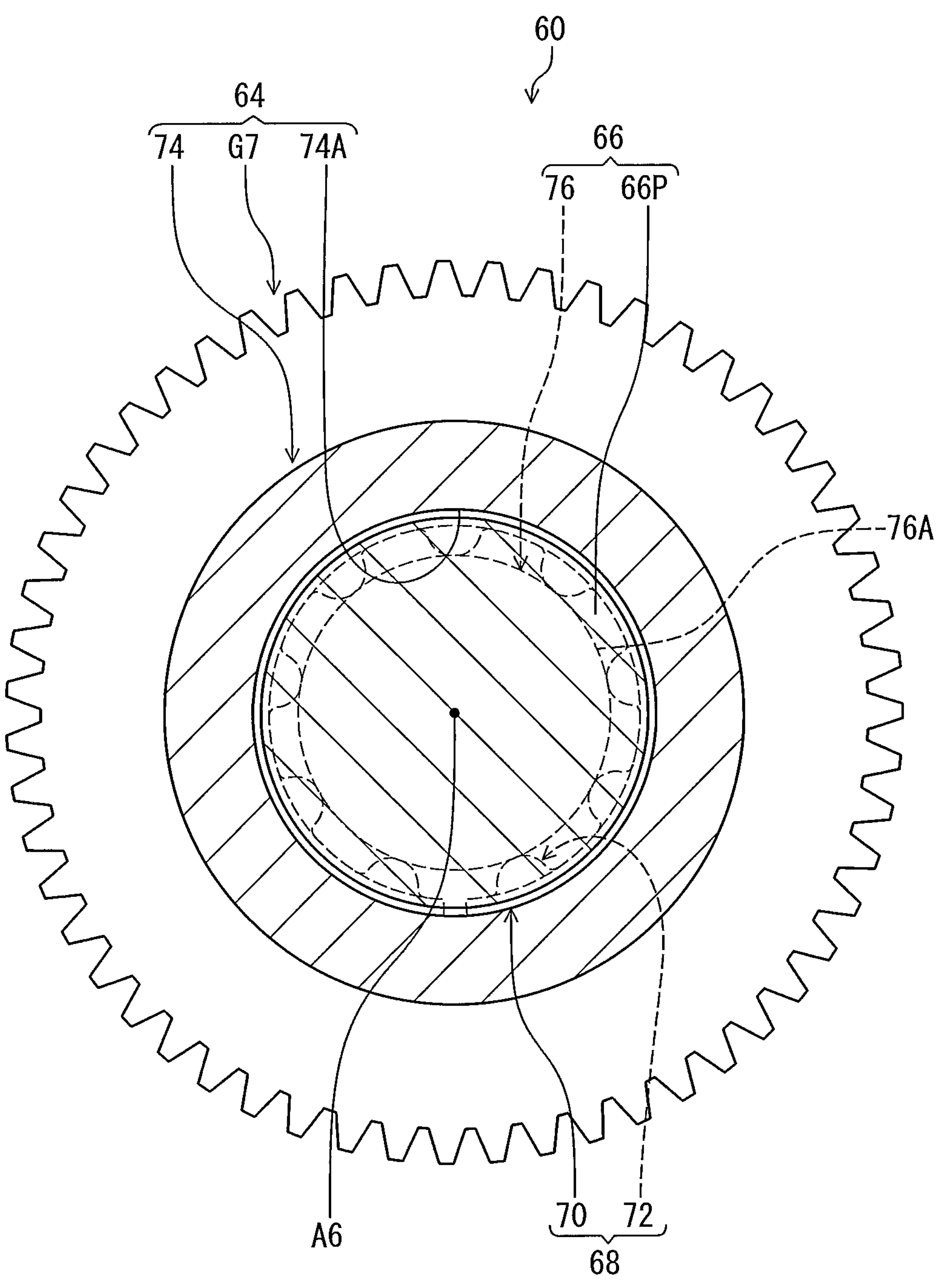
FIG. 14 is a cross-sectional view of the transmitting structure taken along line XIV-XIV of FIG. 10.

As seen in FIG. 14, the second protruding portion 66P at least partially overlaps the resisting structure 68 as viewed along the rotational axis A6. In the present embodiment, the second protruding portion 66P partially overlaps the resisting structure 68 as viewed along the rotational axis A6. However, the second protruding portion 66P can be arranged to entirely overlap the resisting structure 68 as viewed along the rotational axis A6 if needed and/or desired.

Figure 15:
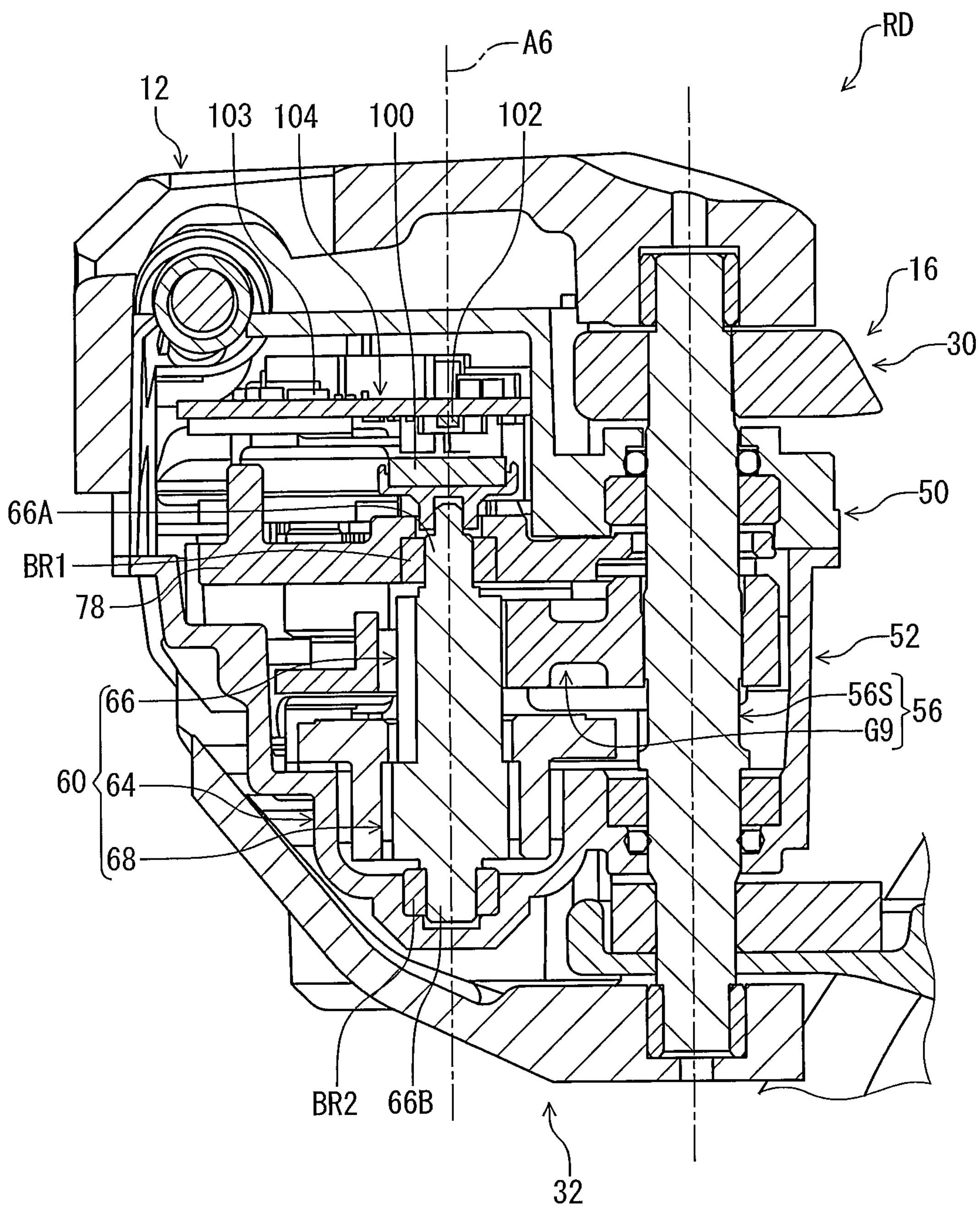
FIG. 15 is a cross-sectional view of the bicycle motor unit illustrated in FIG. 6.

As seen in FIG. 15, the second rotatable member 66 includes a first axial end 66A and a second axial end 66B. The second rotatable member 66 extends between the first axial end 66A and the second axial end 66B along the rotational axis A6. The second gear G8 and the second coupling portion 76 are provided between the first axial end 66A and the second axial end 66B.

At least one of the first axial end 66A and the second axial end 66B is rotatably supported by the housing 38 about the rotational axis A6. Each of the first axial end 66A and the second axial end 66B is rotatably supported by the housing 38 about the rotational axis A6.

The bicycle motor unit 32 includes a first bearing BR1 and a second bearing BR2. The housing 38 includes a third housing 78. The third housing 78 is provided in the internal space 38S. The third housing 78 is secured to the first housing 50 and the second housing 52. The first bearing BR1 is attached to the third housing 78. The second bearing BR2 is attached to the second housing 52. The first bearing BR1 rotatably supports the first axial end 66A about the rotational axis A6. The second bearing BR2 rotatably supports the second axial end 66B about the rotational axis A6.

In the present embodiment, the first bearing BR1 includes a sleeve. The second bearing BR2 includes a sleeve. However, the structure of each of the first bearing BR1 and the second bearing BR2 is not limited to the illustrated embodiment.

As seen in FIG. 10, the resisting structure 68 allows relative rotation between the first rotatable member 64 and the second rotatable member 66 in response to input of a predetermined rotational force RF1 and/or RF2 transmitted from at least one of the first rotatable member 64 and the second rotatable member 66. In the present embodiment, the resisting structure 68 allows relative rotation between the first rotatable member 64 and the second rotatable member 66 in response to the input of the predetermined rotational force RF1 transmitted from the first rotatable member 64. The resisting structure 68 allows relative rotation between the first rotatable member 64 and the second rotatable member 66 in response to the input of the predetermined rotational force RF2 transmitted from the first rotatable member 64. The resisting structure 68 allows relative rotation between the first rotatable member 64 and the second rotatable member 66 in response to the input of the predetermined rotational force RF1 transmitted from the first rotatable member 64 and/or the input of the predetermined rotational force RF2 transmitted from the first rotatable member 64.

The predetermined rotational force RF1 is a rotational force greater than a rotational force threshold TR. The predetermined rotational force RF2 is a rotational force greater than the rotational force threshold TR. Thus, the resisting structure 68 allows the relative rotation between the first rotatable member 64 and the second rotatable member 66 in a case where an input rotational force RF3 applied to at least one of the first rotatable member 64 and the second rotatable member 66 is greater than the rotational force threshold TR.

As seen in FIG. 11, a first frictional force FF1 is applied between the first rotatable member 64 and the resisting structure 68. The first frictional force FF1 is applied to the first contact surface 74A. The first contact surface 74A has a first radius R1 defined from the rotational axis A6. The rotational force threshold TR can be defined as the product obtained by multiplying the first frictional force FF1 by the first radius R1.

A second frictional force FF2 is applied between the second rotatable member 66 and the resisting structure 68. The second frictional force FF2 is applied to the second contact surface 76A. The second contact surface 76A has a second radius R2 defined from the rotational axis A6. The rotational force threshold TR can be defined as the product obtained by multiplying the second frictional force FF2 by the second radius R2.

As seen in FIG. 10, the resisting structure 68 allows the relative rotation between the first rotatable member 64 and the second rotatable member 66 in response to the input of the predetermined rotational force RF1 transmitted from the first rotatable member 64. The resisting structure 68 allows the relative rotation between the first rotatable member 64 and the second rotatable member 66 in a case where an input rotational force RF31 applied to the first rotatable member 64 is greater than the rotational force threshold TR. In the present embodiment, the slidable member 72 slides with at least one of the first contact surface 74A and the second contact surface 76A in response to the input of the predetermined rotational force RF1 transmitted from the first rotatable member 64. Thus, the first rotatable member 64 rotates relative to the second rotatable member 66 in a case where the input rotational force RF31 applied to the first rotatable member 64 is greater than the rotational force threshold TR.

The second rotatable member 66 transmits an output rotational force RF41 to the gear G9 while the slidable member 72 is sliding with at least one of the first contact surface 74A and the second contact surface 76A in response to the input of the predetermined rotational force RF1 transmitted from the first rotatable member 64. The output rotational force RF41 is less than or equal to the predetermined rotational force RF1. Namely, the output rotational force RF41 is less than or equal to the rotational force threshold TR. Thus, the resisting structure 68 reduces the predetermined rotational force RF1 to the output rotational force RF41 when the predetermined rotational force RF1 is applied to the first rotatable member 64.

The resisting structure 68 restricts the relative rotation between the first rotatable member 64 and the second rotatable member 66 in a case where the input rotational force RF31 applied to the first rotatable member 64 is less than or equal to the rotational force threshold TR. In the present embodiment, the slidable member 72 does not slide with at least one of the first contact surface 74A and the second contact surface 76A in a case where the input rotational force RF31 applied to the first rotatable member 64 is less than or equal to the rotational force threshold TR. Thus, the second rotatable member 66 transmits an output rotational force RF51, which is equal to the input rotational force RF31, to the gear G9 in a case where the input rotational force RF31 is less than or equal to the rotational force threshold TR.

As seen in FIG. 11, the resisting structure 68 allows the relative rotation between the first rotatable member 64 and the second rotatable member 66 in response to the input of the predetermined rotational force RF2 transmitted from the first rotatable member 64. The resisting structure 68 allows the relative rotation between the first rotatable member 64 and the second rotatable member 66 in a case where an input rotational force RF32 applied to the first rotatable member 64 is greater than the rotational force threshold TR. In the present embodiment, the slidable member 72 slides with at least one of the first contact surface 74A and the second contact surface 76A in response to the input of the predetermined rotational force RF2 transmitted from the first rotatable member 64. Thus, the first rotatable member 64 rotates relative to the second rotatable member 66 in a case where the input rotational force RF32 applied to the first rotatable member 64 is greater than the rotational force threshold TR.

The first rotatable member 64 transmits an output rotational force RF42 to the gear G6 while the slidable member 72 is sliding with at least one of the first contact surface 74A and the second contact surface 76A in response to the input of the predetermined rotational force RF2 transmitted from the second rotatable member 66. The output rotational force RF42 is less than or equal to the predetermined rotational force RF2. Namely, the output rotational force RF42 is less than or equal to the rotational force threshold TR. Thus, the resisting structure 68 reduces the predetermined rotational force RF2 to the output rotational force RF42 when the predetermined rotational force RF2 is applied to the first rotatable member 64.

The resisting structure 68 restricts the relative rotation between the first rotatable member 64 and the second rotatable member 66 in a case where the input rotational force RF32 applied to the second rotatable member 66 is less than or equal to the rotational force threshold TR. In the present embodiment, the slidable member 72 does not slide with at least one of the first contact surface 74A and the second contact surface 76A in a case where the input rotational force RF32 applied to the first rotatable member 64 is less than or equal to the rotational force threshold TR. Thus, the second rotatable member 66 transmits an output rotational force RF52, which is equal to the input rotational force RF32, to the gear G6 in a case where the input rotational force RF32 is less than or equal to the rotational force threshold TR.

As seen in FIG. 7, the additional transmitting structure 62 has a transmitting-structure rotational axis A7. In the present embodiment, the rotational axis A6 is not coincident with the transmitting-structure rotational axis A7. The rotational axis A6 is offset from the transmitting-structure rotational axis A7. The rotational axis A6 is parallel to the transmitting-structure rotational axis A7. However, the rotational axis A6 can be non-parallel to the transmitting-structure rotational axis A7 if needed and/or desired. The rotational axis A6 can be coincide with the transmitting-structure rotational axis A7 if needed and/or desired.

Figure 16:
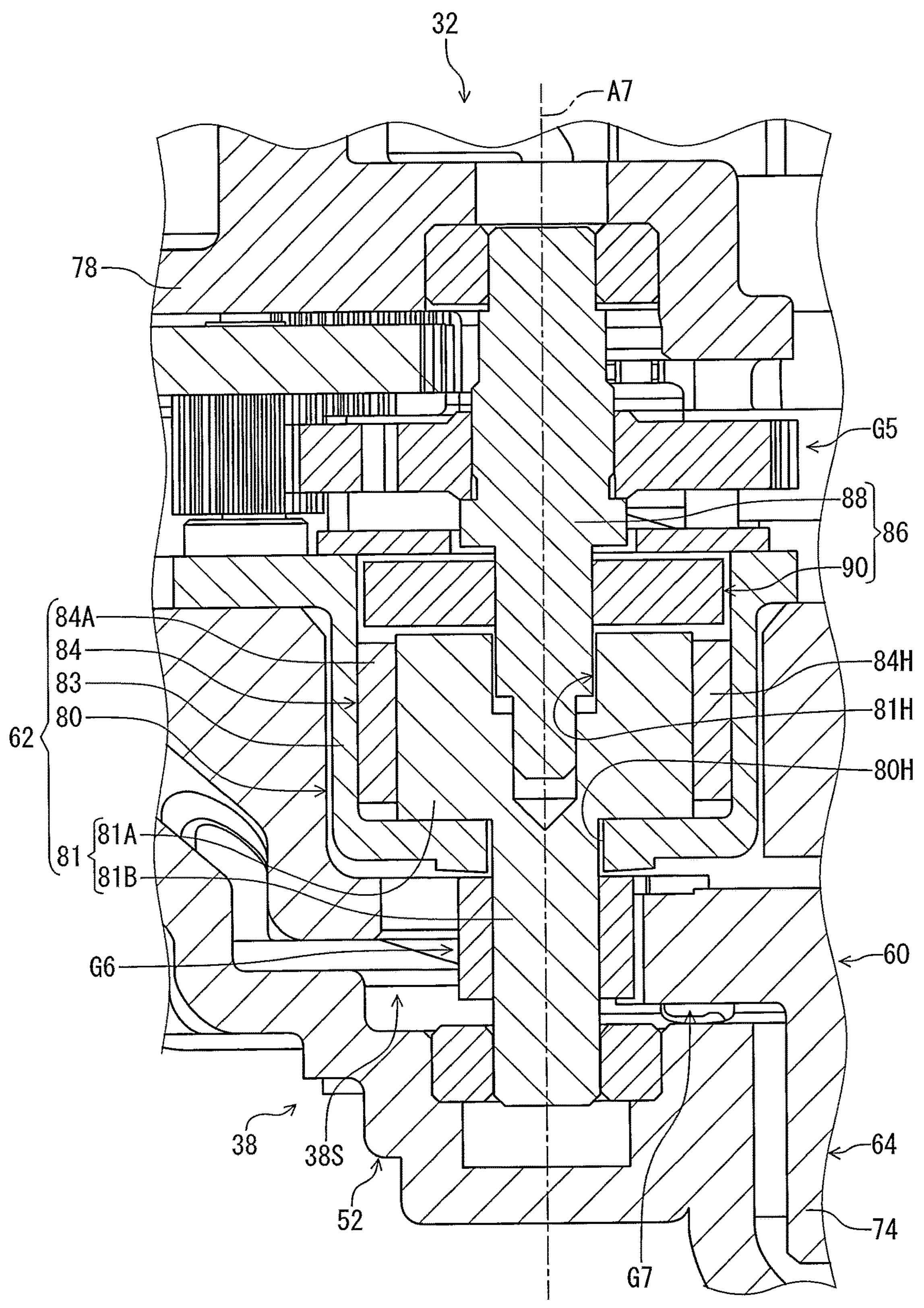
FIG. 16 is a cross-sectional view of the bicycle motor unit illustrated in FIG. 6.

As seen in FIG. 16, the additional transmitting structure 62 includes a first race 80 and a second race 81. The first race 80 is secured to the housing 38. The second race 81 extends along the transmitting-structure rotational axis A7. The second race 81 is rotatable relative to the first race 80 about the transmitting-structure rotational axis A7. The first race 80 is at least partially provided radially outwardly of the second race 81. The second race 81 is at least partially provided radially inwardly of the first race 80.

The first race 80 includes an outer race 83 having an annular shape. The second race 81 includes an inner race 81A. The inner race 81A is at least partially provided radially inwardly of the outer race 83. The first race 80 includes a hole 80H. The second race 81 extends through the hole 80H along the transmitting-structure rotational axis A7. The second race 81 includes a rod part 81B. The rod part 81B extends from the inner race 81A along the transmitting-structure rotational axis A7. The rod part 81B extends through the hole 80H of the first race 80 along the transmitting-structure rotational axis A7.

The additional transmitting structure 62 includes a first intermediate element 84. The first intermediate element 84 is at least partially provided between the first race 80 and the second race 81. In the present embodiment, the first intermediate element 84 is entirely provided between the first race 80 and the second race 81. However, the first intermediate element 84 can be partially provided between the first race 80 and the second race 81 if needed and/or desired.

Figure 17:
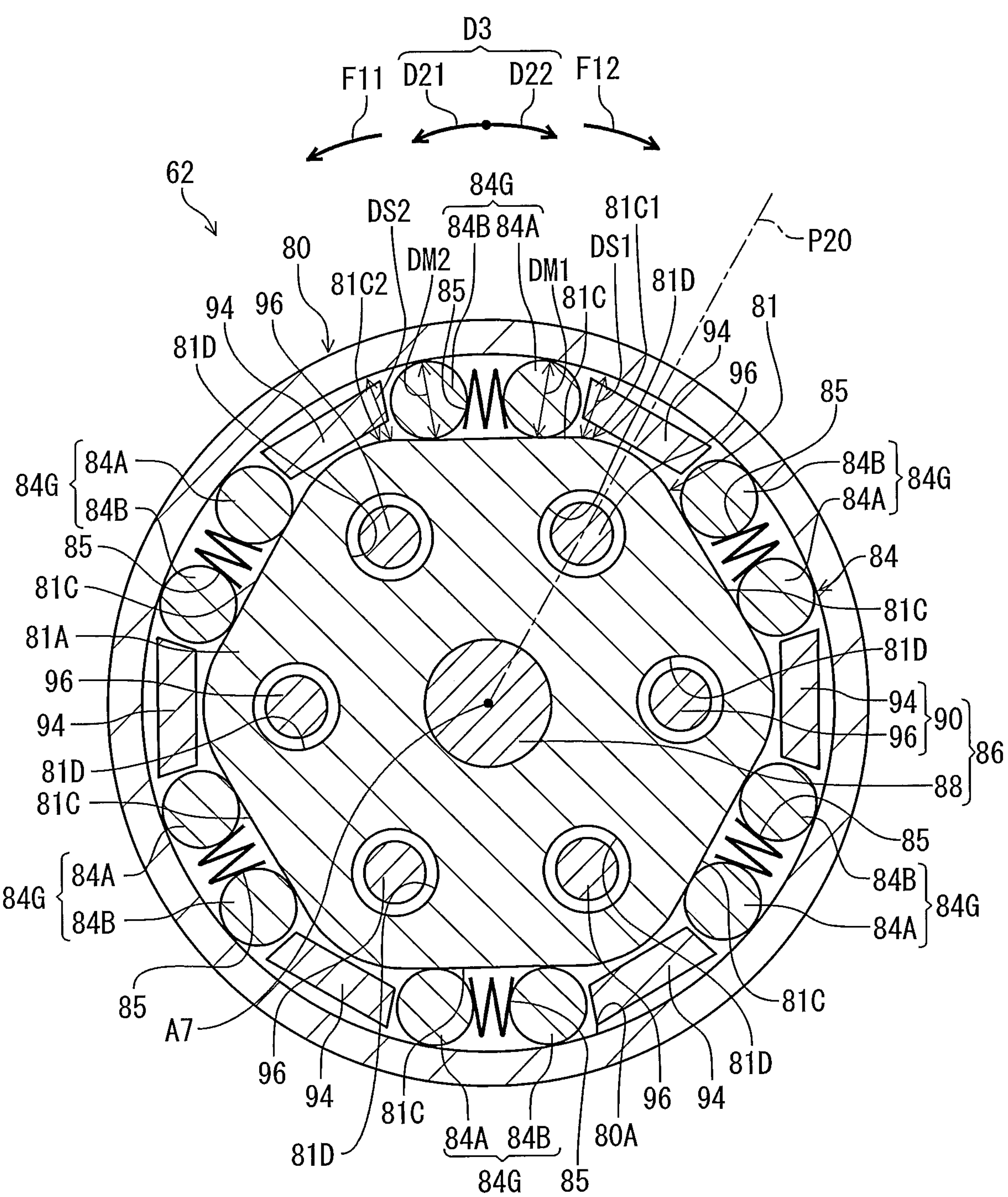
FIG. 17 is a cross-sectional view of an additional transmitting structure of the bicycle motor unit illustrated in FIG. 6 (neutral position).

As seen in FIG. 17, the first intermediate element 84 includes a first rotatable part 84A and a second rotatable part 84B. In the present embodiment, the first intermediate element 84 includes at least two first rotatable parts 84A and at least two second rotatable parts 84B. A total number of the first rotatable parts 84A is six. A total number of the second rotatable parts 84B is six. The first rotatable part 84A has a columnar shape. The second rotatable part 84B has a columnar shape.

However, the total number of the first rotatable parts 84A is not limited to six. The total number of the second rotatable parts 84B is not limited to six. The structure of the first intermediate element 84 is not limited to the first rotatable part 84A and the second rotatable part 84B. One of the first rotatable part 84A and the second rotatable part 84B can be omitted from the first intermediate element 84 if needed and/or desired. The first rotatable part 84A can have shapes other than the columnar shape if needed and/or desired. The second rotatable part 84B can have shapes other than the columnar shape if needed and/or desired.

The first rotatable part 84A is at least partially provided between the first race 80 and the second race 81. The second rotatable part 84B is at least partially provided between the first race 80 and the second race 81. In the present embodiment, the first rotatable part 84A is entirely provided between the first race 80 and the second race 81. The second rotatable part 84B is entirely provided between the first race 80 and the second race 81. However, the first rotatable part 84A can be partially provided between the first race 80 and the second race 81 if needed and/or desired. The second rotatable part 84B can be partially provided between the first race 80 and the second race 81 if needed and/or desired.

The first rotatable parts 84A and the second rotatable parts 84B are alternatingly arranged in a circumferential direction D3 about the transmitting-structure rotational axis A7. The first rotatable parts 84A and the second rotatable parts 84B are spaced apart from each other in the circumferential direction D3.

The first race 80 includes an inner peripheral surface 80A. The second race 81 includes at least two contact surfaces 81C. A total number of the contact surfaces 81C is six. The contact surface 81C includes a flat surface. However, the total number of contact surfaces 81C is not limited to six. The contact surface 81C can have shapes other than the flat surface if needed and/or desired.

The first rotatable part 84A and the second rotatable part 84B are provided between the inner peripheral surface 80A of the first race 80 and the contact surface 81C of the second race 81. The first rotatable part 84A and the second rotatable part 84B are contactable with the inner peripheral surface 80A of the first race 80 and the contact surface 81C of the second race 81.

The first intermediate element 84 includes at least one intermediate-member group 84G consisting of the first rotatable part 84A and the second rotatable part 84B. In the present embodiment, the first intermediate element 84 includes six intermediate-member groups 84G each consisting of the first rotatable part 84A and the second rotatable part 84B. The intermediate-member group 84G is at least partially provided between the inner peripheral surface 80A of the first race 80 and the contact surface 81C of the second race 81. The intermediate-member group 84G is spaced apart from each other in the circumferential direction D3. The intermediate-member groups 84G respectively correspond to the contact surfaces 81C of the second race 81. However, a total number of the intermediate-member groups 84G consisting of the first rotatable part 84A and the second rotatable part 84B is not limited to six.

The additional transmitting structure 62 includes at least one biasing element 85. The biasing element 85 is configured to bias the first rotatable part 84A and the second rotatable part 84B to move away from each other. In the present embodiment, the additional transmitting structure 62 includes at least two biasing elements 85. The biasing element 85 is provided between the first rotatable part 84A and the second rotatable part 84B of the intermediate-member group 84G to bias the first rotatable part 84A and the second rotatable part 84B to move away from each other. A total number of the biasing elements 85 is six. The biasing element 85 includes a spring such as a coiled spring and a leaf spring. However, the biasing element 85 can include members other than the spring (e.g., an elastic member such as rubber) if needed and/or desired. The total number of the biasing elements 85 is not limited to six.

The contact surface 81C of the second race 81 includes a first circumferential end 81C1 and a second circumferential end 81C2. The contact surface 81C extends between the first circumferential end 81C1 and the second circumferential end 81C2. The first circumferential end 81C1 is closer to the first rotatable part 84A than the second circumferential end 81C2. The second circumferential end 81C2 is closer to the second rotatable part 84B than the first circumferential end 81C1.

A first radial distance DS1 is radially defined between the inner peripheral surface 80A of the first race 80 and the first circumferential end 81C1 of the contact surface 81C of the second race 81. A second radial distance DS2 is radially defined between the inner peripheral surface 80A of the first race 80 and the second circumferential end 81C2 of the contact surface 81C of the second race 81. The first rotatable part 84A has a first diameter DM1. The second rotatable part 84B has a second diameter DM2. The first radial distance DS1 is shorter than the first diameter DM1. The second radial distance DS2 is shorter than the second diameter DM2.

The biasing element 85 biases the first rotatable part 84A to keep the first rotatable part 84A in contact with the inner peripheral surface 80A of the first race 80 and the contact surface 81C of the second race 81 because of the biasing force of the biasing element 85. The biasing element 85 biases the second rotatable part 84B to keep the second rotatable part 84B in contact with the inner peripheral surface 80A of the first race 80 and the contact surface 81C of the second race 81 because of the biasing force of the biasing element 85.

Figure 18:
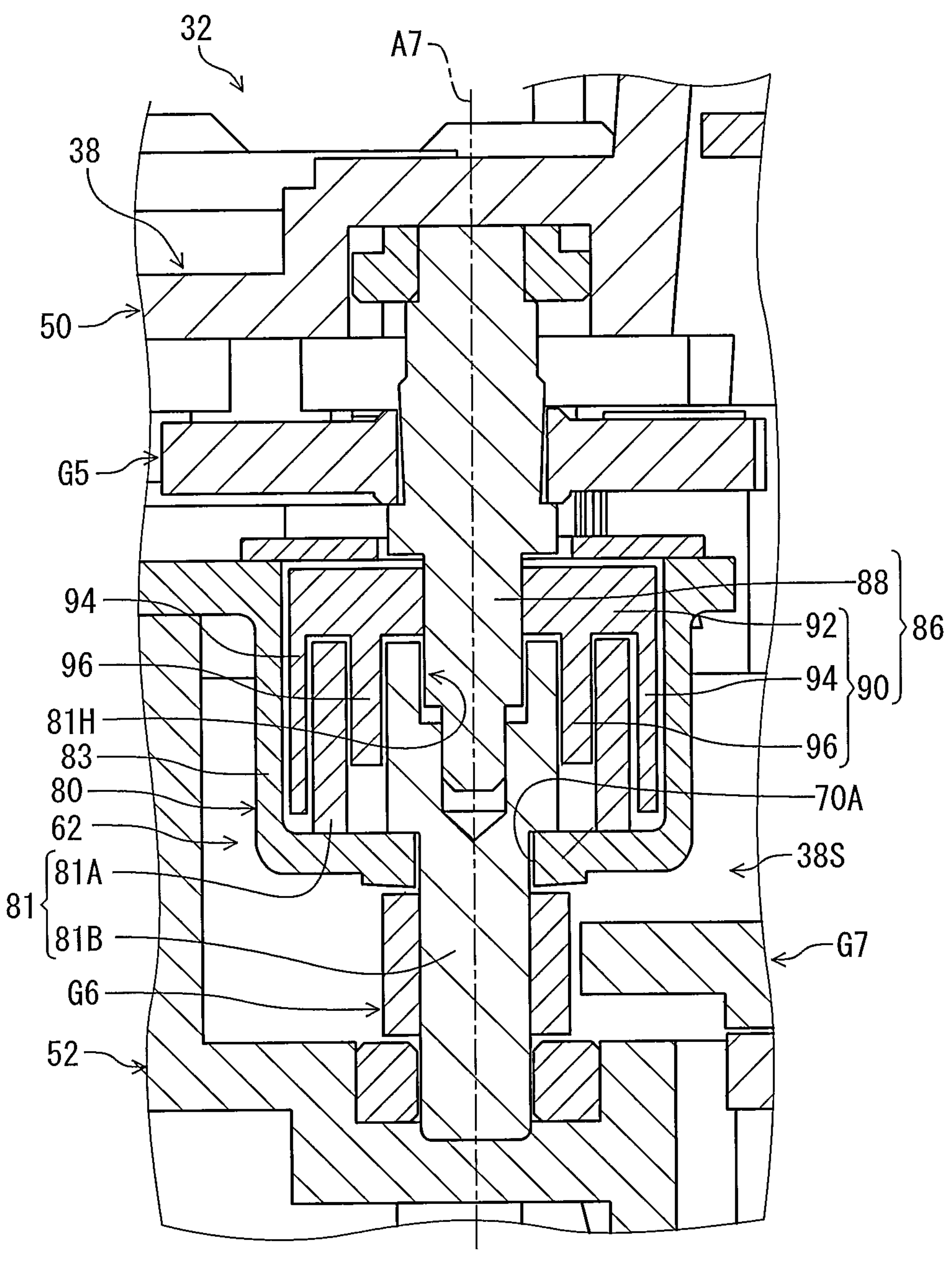
FIG. 18 is a cross-sectional view of the bicycle derailleur illustrated in FIG. 2. illustrated in FIG. 6.

As seen in FIG. 18, the additional transmitting structure 62 includes a second intermediate element 86. The second intermediate element 86 is at least partially provided between the first race 80 and the second race 81. In the present embodiment, the second intermediate element 86 is partially provided between the first race 80 and the second race 81. However, the second intermediate element 86 can be entirely provided between the first race 80 and the second race 81.

The second intermediate element 86 is rotatable relative to the first race 80 about the transmitting-structure rotational axis A7. The second intermediate element 86 includes a shaft 88. The shaft 88 extends along the transmitting-structure rotational axis A7. The second race 81 includes a support hole 81H. The shaft 88 is rotatably provided in the support hole 81H.

The second intermediate element 86 includes a coupling member 90. The coupling member 90 is secured to the shaft 88. The coupling member 90 is a separate member from the shaft 88. However, the coupling member 90 can be integrally provided with the shaft 88 as a one-piece unitary member if needed and/or desired.

The coupling member 90 includes a base part 92, at least two intermediate parts 94, and at least two transmitting parts 96. The base part 92 is secured to the shaft 88. The base part 92 extends radially outwardly from the shaft 88. The intermediate part 94 extends from the base part 92 along the transmitting-structure rotational axis A7. The intermediate part 94 is at least partially provided between the first race 80 and the second race 81. The second race 81 includes at least two transmitting holes 81D. The transmitting part 96 is provided in the transmitting hole 81D of the second race 81. The transmitting part 96 is contactable with the second race 81 to transmit rotation between the second race 81 and the second intermediate element 86 about the transmitting-structure rotational axis A7.

As seen in FIG. 17, a total number of the intermediate parts 94 is six. A total number of the transmitting parts 96 is six. A total number of the transmitting hole 81D is six. However, the total number of the intermediate parts 94 is not limited to six. The total number of the transmitting parts 96 is not limited to six. The total number of the transmitting hole 81D is not limited to six.

The intermediate part 94 is at least partially provided between two adjacent groups of the intermediate-member groups 84G in the circumferential direction D3. The intermediate part 94 is at least partially provided between the first rotatable part 84A of one of the intermediate-member groups 84G and the second rotatable part 84B of another of the intermediate-member groups 84G in the circumferential direction D3.

In the present embodiment, the base part 92, the at least two intermediate parts 94, and the at least two transmitting parts 96 are integrally provided with each other as a one-piece unitary member. However, at least one of the base part 92, the at least two intermediate parts 94, and the at least two transmitting parts 96 can be a separate member from another of the base part 92, the at least two intermediate parts 94, and the at least two transmitting parts 96 if needed and/or desired.

Figure 19:
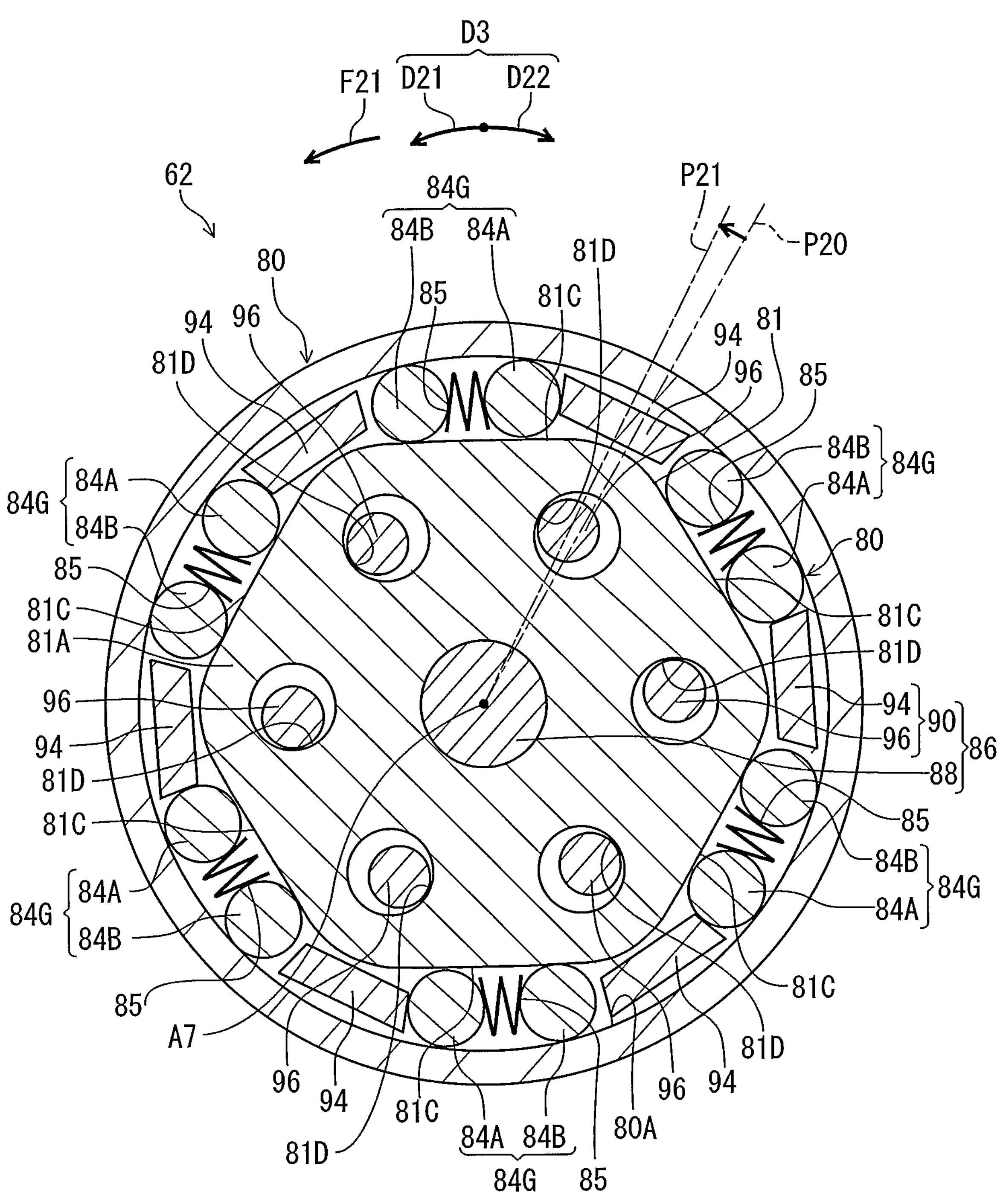
FIG. 19 is a cross-sectional view of the additional transmitting structure of the bicycle motor unit illustrated in FIG. 6 (first rotational position).
Figure 20:
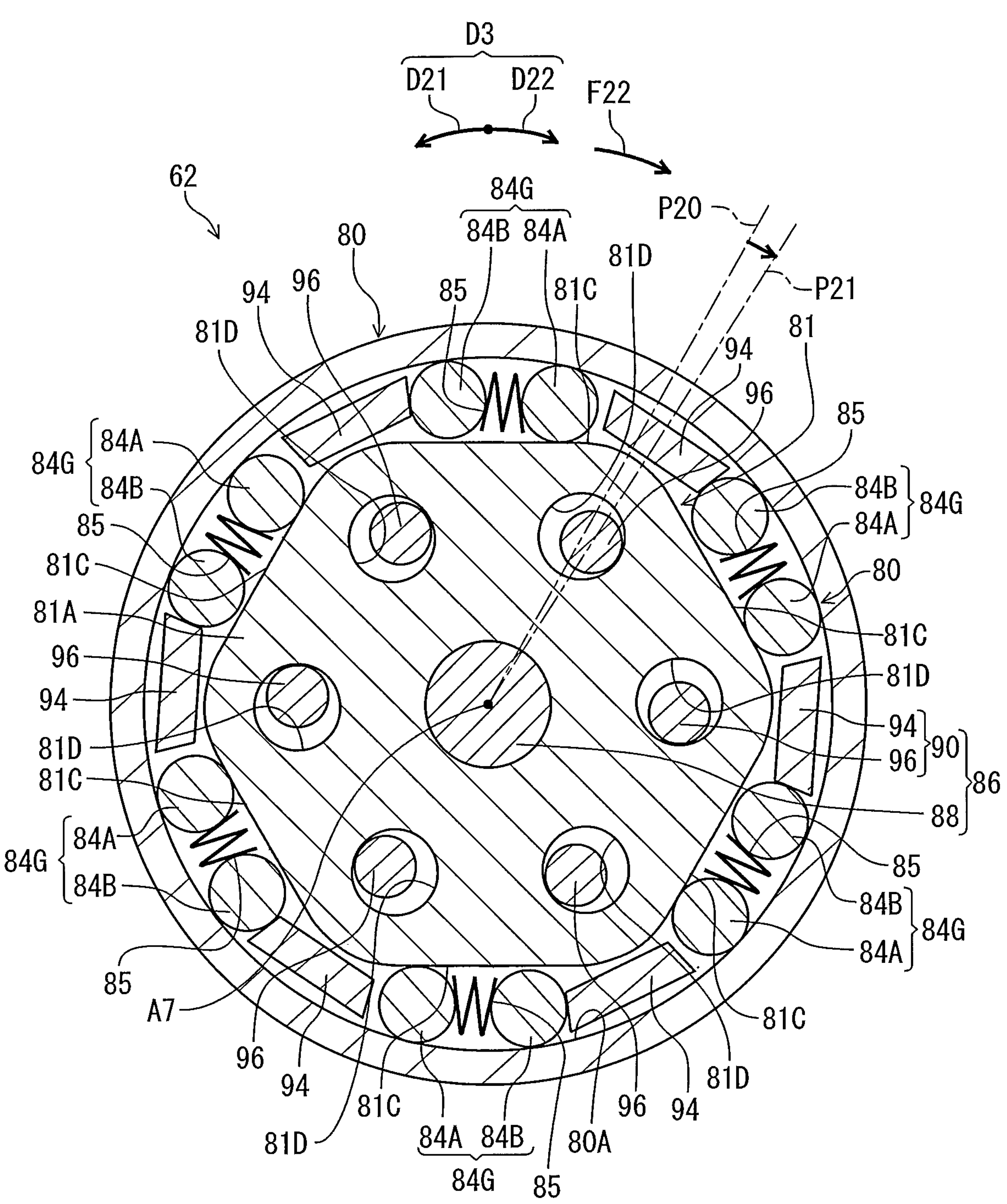
FIG. 20 is a cross-sectional view of the additional transmitting structure of the bicycle motor unit illustrated in FIG. 6 (second rotational position).

As seen in FIG. 19, the second intermediate element 86 is rotatable relative to the second race 81 about the transmitting-structure rotational axis A7 from a neutral position P20 to a first rotational position P21 in a first circumferential direction D21. As seen in FIG. 20, the second intermediate element 86 is rotatable relative to the second race 81 about the transmitting-structure rotational axis A7 from the neutral position P20 to a second rotational position P22 in a second circumferential direction D22 different from the first circumferential direction D21. In the present embodiment, the second circumferential direction D22 is an opposite direction of the first circumferential direction D21. However, the second circumferential direction D22 can be a direction different from the opposite direction of the first circumferential direction D21.

As seen in FIGS. 17, 19, and 20, the transmitting part 96 is contactable with an inner peripheral surface of the transmitting hole 81D. As seen in FIG. 17, the transmitting part 96 is spaced apart from the inner peripheral surface of the transmitting hole 81D in an initial state where the second intermediate element 86 is in the neutral position P20. As seen in FIG. 19, the transmitting part 96 is in contact with the inner peripheral surface of the transmitting hole 81D in a first rotation state where the second intermediate element 86 is in the first rotational position P21. As seen in FIG. 20, the transmitting part 96 is in contact with the inner peripheral surface of the transmitting hole 81D in a second rotation state where the second intermediate element 86 is in the second rotational position P22.

As seen in FIGS. 17, 19, and 20, the intermediate part 94 is contactable with each of the first rotatable part 84A and the second rotatable part 84B. As seen in FIG. 17, the intermediate part 94 is spaced apart from each of the first rotatable part 84A and the second rotatable part 84B in the initial state where the second intermediate element 86 is in the neutral position P20. As seen in FIG. 19, the intermediate part 94 is in contact with the first rotatable part 84A in the first rotation state where the second intermediate element 86 is in the first rotational position P21. As seen in FIG. 20, the intermediate part 94 is in contact with the second rotatable part 84B in the second rotation state where the second intermediate element 86 is in the second rotational position P22.

As seen in FIG. 17, the first intermediate element 84 is configured to restrict the second race 81 from rotating relative to the first race 80 in the first circumferential direction D21 with respect to the transmitting-structure rotational axis A7 when the second race 81 receives a first rotational force F11 in the first circumferential direction D21. The first intermediate element 84 is configured to restrict the second race 81 from rotating relative to the first race 80 in the second circumferential direction D22 with respect to the transmitting-structure rotational axis A7 when the second race 81 receives a second rotational force F12 in the second circumferential direction D22.

The first intermediate element 84 is configured to move toward the first race 80 in response to the first intermediate element 84 pushed by the second race 81 in the first circumferential direction D21 with respect to the transmitting-structure rotational axis A7. The first intermediate element 84 is configured to move toward the first race 80 in response to the first intermediate element 84 pushed by the second race 81 in the second circumferential direction D22 different from the first circumferential direction D21. The first intermediate element 84 is configured to rotate together with the first race 80 in a state where the second race 81 pushes the first intermediate element 84 without the second intermediate element 86 pushing the first intermediate element 84. Since the first race 80 is secured to the housing 38 of the bicycle motor unit 32, the first race 80 and the first intermediate element 84 are stationary relative to the housing 38 (see e.g., FIG. 17) in the state where the second race 81 pushes the first intermediate element 84 without the second intermediate element 86 pushing the first intermediate element 84.

The first rotatable part 84A is configured to restrict the second race 81 from rotating relative to the first race 80 in the first circumferential direction D21 with respect to the transmitting-structure rotational axis A7 when the second race 81 receives the first rotational force F11 in the first circumferential direction D21. The second rotatable part 84B is configured to restrict the second race 81 from rotating relative to the first race 80 in the second circumferential direction D22 with respect to the transmitting-structure rotational axis A7 when the second race 81 receives the second rotational force F12 in the second circumferential direction D22.

As seen in FIG. 17, the contact surface 81C of the second race 81 is configured to press the first rotatable part 84A against the inner peripheral surface 80A of the first race 80 when the second race 81 receives the first rotational force F11 in the first circumferential direction D21. The first race 80 and the second race 81 are locked by the first rotatable parts 84A when the second race 81 receives the first rotational force F11 in the first circumferential direction D21. The first rotatable parts 84A is configured to restrict the second race 81 from rotating relative to the first race 80 in the first circumferential direction D21 about the transmitting-structure rotational axis A7 when the second race 81 receives the first rotational force F11 in the first circumferential direction D21. Thus, the first race 80 secured to the housing 38 (see e.g., FIG. 16) receives the first rotational force F11 transmitted to the second race 81.

The contact surface 81C of the second race 81 is configured to press the second rotatable part 84B against the inner peripheral surface 80A of the first race 80 when the second race 81 receives the second rotational force F12 in the second circumferential direction D22. The first race 80 and the second race 81 are locked by the second rotatable parts 84B when the second race 81 receives the second rotational force F12 in the second circumferential direction D22. The second rotatable parts 84B is configured to restrict the second race 81 from rotating relative to the first race 80 in the second circumferential direction D22 about the transmitting-structure rotational axis A7 when the second race 81 receives the second rotational force F12 in the second circumferential direction D22. Thus, the first race 80 secured to the housing 38 (see e.g., FIG. 16) receives the second rotational force F12 transmitted to the second race 81.

The contact surface 81C of the second race 81 is configured not to press the first rotatable part 84A against the inner peripheral surface 80A of the first race 80 when the second race 81 receives the second rotational force F12 in the second circumferential direction D22. The first rotatable parts 84A is configured not to restrict the second race 81 from rotating relative to the first race 80 in the second circumferential direction D22 about the transmitting-structure rotational axis A7 when the second race 81 receives the second rotational force F12 in the second circumferential direction D22.

The contact surface 81C of the second race 81 is configured not to press the second rotatable part 84B against the inner peripheral surface 80A of the first race 80 when the second race 81 receives the first rotational force F11 in the first circumferential direction D21. The second rotatable parts 84B is configured to restrict the second race 81 from rotating relative to the first race 80 in the first circumferential direction D21 about the transmitting-structure rotational axis A7 when the second race 81 receives the first rotational force F11 in the first circumferential direction D21.

As seen in FIG. 19, the first intermediate element 84 is configured to move away from the first race 80 in response to the first intermediate element 84 pushed by the second intermediate element 86 in the first circumferential direction D21. The first intermediate element 84 is configured to rotate relative to the first race 80 in a state where the second intermediate element 86 pushes the first intermediate element 84 without the second race 81 pushing the first intermediate element 84. The first intermediate element 84 is configured to move radially inwardly with respect to the transmitting-structure rotational axis A7 in response to the first intermediate element 84 pushed by the second intermediate element 86 in the first circumferential direction D21.

The second intermediate element 86 is configured to move the first intermediate element 84 relative to the second race 81 in the first circumferential direction D21 to allow the second race 81 to rotate relative to the first race 80 in the first circumferential direction D21 along with the second intermediate element 86 when the second intermediate element 86 receives a first rotational force F21 in the first circumferential direction D21. The first intermediate element 84 is configured to rotate relative to the first race 80 together with the second race 81 and the second intermediate element 86 about the transmitting-structure rotational axis A7 in the first circumferential direction D21 when the second intermediate element 86 receives the first rotational force F21 in the first circumferential direction D21.

The intermediate part 94 of the second intermediate element 86 is configured to move the first rotatable part 84A relative to the second race 81 in the first circumferential direction D21 in response to a first rotation of the second intermediate element 86 from the neutral position P20 to the first rotational position P21 in the first circumferential direction D21. The transmitting part 96 of the second intermediate element 86 is configured to rotate the second race 81 relative to the first race 80 in the first circumferential direction D21 in response to the first rotation of the second intermediate element 86 from the first rotational position P21 in the first circumferential direction D21. The second race 81, the first intermediate element 84, and the second intermediate element 86 rotate relative to the first race 80 in the first circumferential direction D21 when the second intermediate element 86 receives the first rotational force F21 in the first circumferential direction D21.

As seen in FIG. 20, the first intermediate element 84 is configured to move away from the first race 80 in response to the first intermediate element 84 pushed by the second intermediate element 86 in the second circumferential direction D22 different from the first circumferential direction D21. The first intermediate element 84 is configured to rotate relative to the first race 80 in a state where the second intermediate element 86 pushes the first intermediate element 84 without the second race 81 pushing the first intermediate element 84. The first intermediate element 84 is configured to move radially inwardly with respect to the transmitting-structure rotational axis A7 in response to the first intermediate element 84 pushed by the second intermediate element 86 in the second circumferential direction D22.

The second intermediate element 86 is configured to move the first intermediate element 84 relative to the second race 81 in the second circumferential direction D22 to allow the second race 81 to rotate relative to the first race 80 in the second circumferential direction D22 along with the second intermediate element 86 when the second intermediate element 86 receives a second rotational force F22 in the second circumferential direction D22. The first intermediate element 84 is configured to rotate relative to the first race 80 together with the second race 81 and the second intermediate element 86 about the transmitting-structure rotational axis A7 in the second circumferential direction D22 when the second intermediate element 86 receives the second rotational force F22 in the second circumferential direction D22.

The intermediate part 94 of the second intermediate element 86 is configured to move the second rotatable part 84B relative to the second race 81 in the second circumferential direction D22 in response to a second rotation of the second intermediate element 86 from the neutral position P20 to the second rotational position P22 in the second circumferential direction D22. The transmitting part 96 of the second intermediate element 86 is configured to rotate the second race 81 relative to the first race 80 in the second circumferential direction D22 in response to the second rotation of the second intermediate element 86 from the second rotational position P22 in the second circumferential direction D22. The second race 81, the first intermediate element 84, and the second intermediate element 86 rotate relative to the first race 80 in the second circumferential direction D22 when the second intermediate element 86 receives the second rotational force F22 in the second circumferential direction D22.

As seen in FIGS. 7, 19, and 20, the additional transmitting structure 62 is configured to transmit a rotational force in multiple rotational directions based on a rotational direction of the output shaft 33A in a state where the additional transmitting structure 62 transmits the rotational force. The multiple rotational directions are defined about the transmitting-structure rotational axis A7. The multiple rotational directions include the first circumferential direction D21 and the second circumferential direction D22. The additional transmitting structure 62 is configured to transmit the first rotational force F21 in the first circumferential direction D21 based on a first rotational direction D31 of the output shaft 33A in the state where the additional transmitting structure 62 transmits the first rotational force F21. The additional transmitting structure 62 is configured to transmit the first rotational force F21 in the second circumferential direction D22 based on a second rotational direction D32 of the output shaft 33A in the state where the additional transmitting structure 62 transmits the first rotational force F21. The second rotational direction D32 is an opposite direction of the first rotational direction D31.

Figure 21:
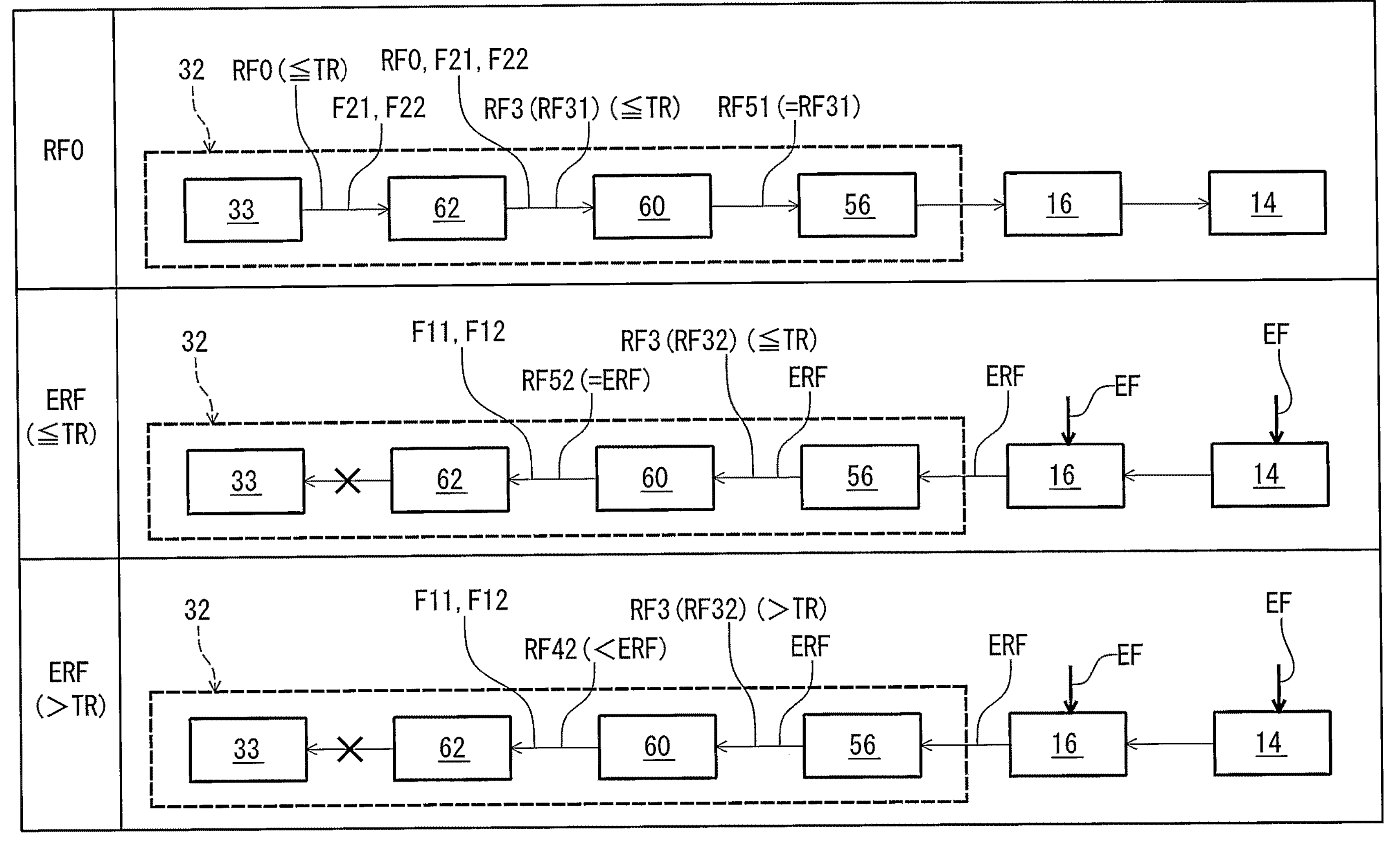
FIG. 21 is a schematic block diagram showing transmission of a rotational force in the bicycle derailleur illustrated in FIG. 2.

As seen in FIG. 21, the driving rotational force RF0 is transmitted from the electric motor 33 to the additional transmitting structure 62. The driving rotational force RF0 is transmitted from the electric motor 33 to the transmitting structure 60 via the additional transmitting structure 62 since the driving rotational force RF0 integrally rotates the second intermediate element 86 and the second race 81 (see e.g., FIGS. 19 and 20).

The driving rotational force RF0 is set to be less than or equal to the rotational force threshold TR. Thus, the driving rotational force RF0 is transmitted, as the output rotational force RF51, from the electric motor 33 to the output member 56 via the additional transmitting structure 62 and the transmitting structure 60 without being reduced by the transmitting structure 60. Accordingly, the chain guide 14 is moved in response to the driving rotational force RF0 transmitted from the bicycle motor unit 32.

The external rotational force ERF is applied to the output member 56 when the external force EF is applied to at least one of the chain guide 14 and the linkage 16. The external rotational force ERF is transmitted from the output member 56 to the second rotatable member 66 of the transmitting structure 60 as the input rotational force RF32.

The external rotational force ERF is transmitted, as the output rotational force RF52, from the transmitting structure 60 to the additional transmitting structure 62 without being reduced by the transmitting structure 60 in a case where the external rotational force ERF is less than or equal to the rotational force threshold TR.

The external rotational force ERF is transmitted, as the output rotational force RF42, from the transmitting structure 60 to the additional transmitting structure 62 in a case where the external rotational force ERF is greater than the rotational force threshold TR. The external rotational force ERF is reduced to the output rotational force RF42 by the relative rotation between the first rotatable member 64 and the second rotatable member 66 (see e.g., FIG. 10) of the transmitting structure 60.

However, neither the output rotational force RF52 nor RF42 is transmitted from the additional transmitting structure 62 to the electric motor 33 since the first intermediate element 84 (see e.g., FIG. 17) restricts the second race 81 from rotating relative to the first race 80. Since the first race 80 (see e.g., FIG. 17) is secured to the housing 38, the first race 80 and the second race 81 are not rotated relative to the housing 38 by the output rotational force RF52 or RF42. Thus, the external rotational force ERF is blocked by the additional transmitting structure 62 and is not transmitted to the electric motor 33.

As seen in FIG. 15, the bicycle motor unit 32 further comprises a detection object 100. The bicycle motor unit 32 comprises a detector 102 configured to detect the detection object 100. The detection object 100 is configured to be detected by the detector 102. The detector 102 is configured to detect a position of the detection object 100. The detection object 100 is coupled to the second rotatable member 66 to rotate along with the second rotatable member 66 about the rotational axis A6. The detector 102 is configured to detect a rotational position of the detection object 100. Thus, the detector 102 is configured to detect a rotational position of the second rotatable member 66 of the transmitting structure 60. The rotational position of the second rotatable member 66 corresponds to a position of the chain guide 14 and a gear position of the bicycle derailleur RD. Thus, the detector 102 is configured to detect the position of the chain guide 14 and the gear position of the bicycle derailleur RD.

In the present embodiment, the detector 102 includes a non-contact detector such as an angle sensor and an encoder. Examples of the angle sensor include a magneto-resistive sensor. Examples of the encoder include a magnetic sensor (e.g., a hall sensor) and an optical sensor (e.g., a photo sensor). The detection object 100 includes a magnetic body (e.g., magnet) and a light emitter (e.g., a light emitting diode (LED)). However, the detector 102 can include a contact detector if needed and/or desired. The detection object 100 can include parts other than the magnetic body or the light emitter.

The bicycle motor unit 32 includes a calculation circuit 103. The calculation circuit 103 is electrically connected to the detector 102 to calculate a rotational angle of the detection object 100 based on a detection result of the detector 100. For example, the calculation circuit 103 is configured to calculate an absolute rotational angle of the detection object 100 based on the detection result of the detector 100.

As seen in FIG. 7, the detection object 100 is provided on a downstream side with respect to the additional transmitting structure 62 on the power transmission path TP. The detection object 100 is provided on a downstream side with respect to the transmitting structure 60 on the power transmission path TP. The detection object 100 is provided on the downstream side with respect to the transmitting structure 60 on the power transmission path TP in the first power-transmission direction LD1. The detection object 100 is provided on the downstream side with respect to the additional transmitting structure 62 on the power transmission path TP in the first power-transmission direction LD1.

Figure 22:
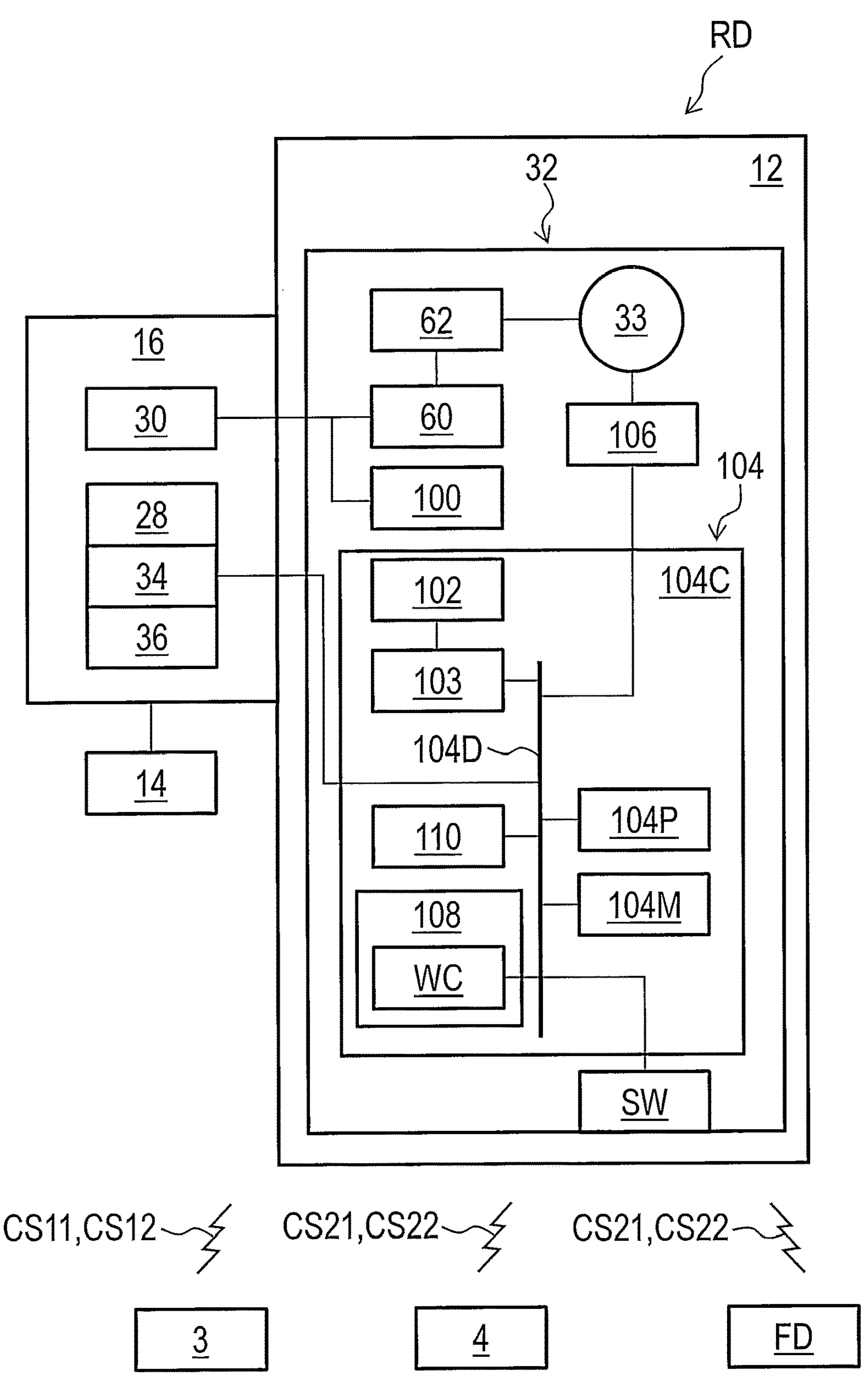
FIG. 22 is a schematic block diagram of the bicycle derailleur illustrated in FIG. 2.

As seen in FIG. 22, the bicycle motor unit 32 includes an electronic controller 104, a motor driver 106, a communicator 108, an informing device 110, and an electric switch SW. The electronic controller 104 is electrically connected to the detector 102, the calculation circuit 103, the motor driver 106, the communicator 108, and the informing device 110. The power-supply attachment structure 34 is electrically connected to the detector 102, the calculation circuit 103, the electronic controller 104, the motor driver 106, the communicator 108, and the informing device 110. The electric power source 36 is electrically connected to the detector 102, the calculation circuit 103, the electronic controller 104, the motor driver 106, the communicator 108, and the informing device 110 via the power-supply attachment structure 34 to supply electricity to the detector 102, the calculation circuit 103, the electronic controller 104, the motor driver 106, the communicator 108, and the informing device 110 via the power-supply attachment structure 34.

As seen in FIG. 22, the electronic controller 104 includes a processor 104P, a memory 104M, a circuit board 104C, and a bus 104D. The processor 104P and the memory 104M are electrically mounted on the circuit board 104C. The processor 104P and the memory 104M are electrically connected to the circuit board 104C via the bus 104D. The processor 104P is electrically connected to the memory 104M via the circuit board 104C and the bus 104D.

For example, the processor 104P includes at least one of a central processing unit (CPU), a micro processing unit (MPU), and a memory controller. The memory 104M is electrically connected to the processor 104P. For example, the memory 104M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 104M includes storage areas each having an address. The processor 104P is configured to control the memory 104M to store data in the storage areas of the memory 104M and reads data from the storage areas of the memory 104M. The processor 104P can also be referred to as a hardware processor 104P. The memory 104M can also be referred to as a hardware memory 104M. The memory 104M can also be referred to as a computer-readable storage medium 104M.

The electronic controller 104 is programed to execute at least one control algorithm of the bicycle derailleur RD. The memory 104M (e.g., the ROM) stores at least one program including at least one program instruction. The at least one program is read into the processor 104P, and thereby the at least one control algorithm of the bicycle derailleur RD is executed based on the at least one program. The electronic controller 104 can also be referred to as an electronic controller circuit or circuitry 104. The electronic controller 104 can also be referred to as a hardware electronic controller 104.

The structure of the electronic controller 104 is not limited to the above structure. The structure of the 22 is not limited to the processor 104P, the memory 104M, and the bus 104D. The electronic controller 104 can be realized by hardware alone or a combination of hardware and software. The processor 104P and the memory 104M can be integrated as a one chip such as an application specific integrated circuit (ASIC) or a field programmable gate array (FPGA).

The communicator 108 is configured to communicate with other devices such as the operating devices 3 and 4 and the bicycle derailleur FD. The communicator 108 includes a wireless communicator WC. The electronic controller 104 is electrically connected to the wireless communicator WC to control the wireless communicator WC. The electronic controller 104 is configured to control the wireless communicator WC to execute pairing between the wireless communicator WC and other wireless communicators of the operating devices 3 and 4 and the bicycle derailleur FD.

The wireless communicator WC is electrically connected to the processor 104P and the memory 104M with the circuit board 104C and the bus 104D. The wireless communicator WC includes a signal transmitting circuit or circuitry and a signal receiving circuit or circuitry. Thus, the wireless communicator WC can also be referred to as a wireless communicator circuit or circuitry WC.

The wireless communicator WC is configured to superimpose digital signals on carrier wave using a predetermined wireless communication protocol to wirelessly transmit signals. In the first embodiment, the wireless communicator WC is configured to encrypt signals using a cryptographic key to generate encrypted wireless signals. The wireless communicator WC includes at least one antenna. The wireless communicator WC is configured to transmit wireless signals via the at least one antenna. The wireless communicator WC can include at least two antennas. In a case where the wireless communicator WC includes at least two antennas, the wireless communicator WC can be configured to wirelessly communicate with another device of the bicycle 2 via one of the at least two antennas and to wirelessly communicate with a wireless device such as a smartphone, a tablet computer, and a personal computer via another of the at least two antennas.

The wireless communicator WC is configured to receive wireless signals via the antenna. In the first embodiment, the wireless communicator WC is configured to decode the wireless signals to recognize signals transmitted from other wireless communicators. The wireless communicator WC is configured to decrypt the wireless signals using the cryptographic key.

The operating device 3 is configured to generate a control signal in response to a user input. For example, the operating device 3 includes a first electric switch, a first additional electric switch, and a first communicator. The first electric switch is configured to receive a first user input. The first additional electric switch is configured to receive a first additional user input. The first communicator is configured to wirelessly transmit a control signal CS11 in response to the first user input received by the first electric switch. The first communicator is configured to wirelessly transmit a control signal CS12 in response to the first additional user input received by the first additional electric switch. For example, the control signal CS11 indicates upshifting of the bicycle derailleur RD. The control signal CS12 indicates downshifting of the bicycle derailleur RD. The operating device 3 can be configured to transmit control signals via an electric cable if needed and/or desired.

The operating device 4 is configured to generate a control signal in response to a user input. For example, the operating device 4 includes a second electric switch, a second additional electric switch, and a second communicator. The second electric switch is configured to receive a second user input. The second additional electric switch is configured to receive a second additional user input. The second communicator is configured to wirelessly transmit a control signal CS21 in response to the second user input received by the second electric switch. The second communicator is configured to wirelessly transmit a control signal CS22 in response to the second additional user input received by the second additional electric switch. For example, the control signal CS21 indicates upshifting of the bicycle derailleur FD. The control signal CS22 indicates downshifting of the bicycle derailleur FD. The operating device 4 can be configured to transmit control signals via an electric cable if needed and/or desired.

The wireless communicator WC is configured to wirelessly receive the control signals CS11, CS12, CS21, and CS22 transmitted from the operating devices 3 and 4. The electronic controller 104 is configured to receive the control signals CS11, CS12, CS21, and CS22 wirelessly transmitted from the operating devices 3 and 4 via the wireless communicator WC. The wireless communicator WC is configured to wirelessly communicate with a wireless communicator of the bicycle derailleur FD. The wireless communicator WC is configured to wirelessly transmit, to the bicycle derailleur FD, the control signals CS21 and CS22 transmitted from the operating device 4. The communicator 108 can include a wired communicator configured to communicate with another wired communicator via an electric cable if needed and/or desired.

The motor driver 106 is electrically connected to the electric motor 33 and the electronic controller 104 to control the electric motor 33 based on the control signals transmitted from the electronic controller 104. The motor driver 106 is configured to control electricity supplied from the electric power source 36 based on the control signals CS11 and CS12 transmitted from the electronic controller 104. Namely, the electronic controller 104 is configured to control the electric motor 33 based on the control signals CS11 and CS12 transmitted from the operating devices 3 and 4.

The communicator 108 includes a wired communicator WD. The wired communicator WD is configured to communicate with another wired communicator of another device such as the derailleur FD via a wired communication structure WS including the electric cable EC. The wired communicator WD is electrically connected to the electronic controller 104. The bicycle motor unit 32 is electrically connected to an external power source PS and the derailleur FD via the wired communication structure WS. The derailleurs RD2 and FD are powered by the external power source PS.

Figure 23:
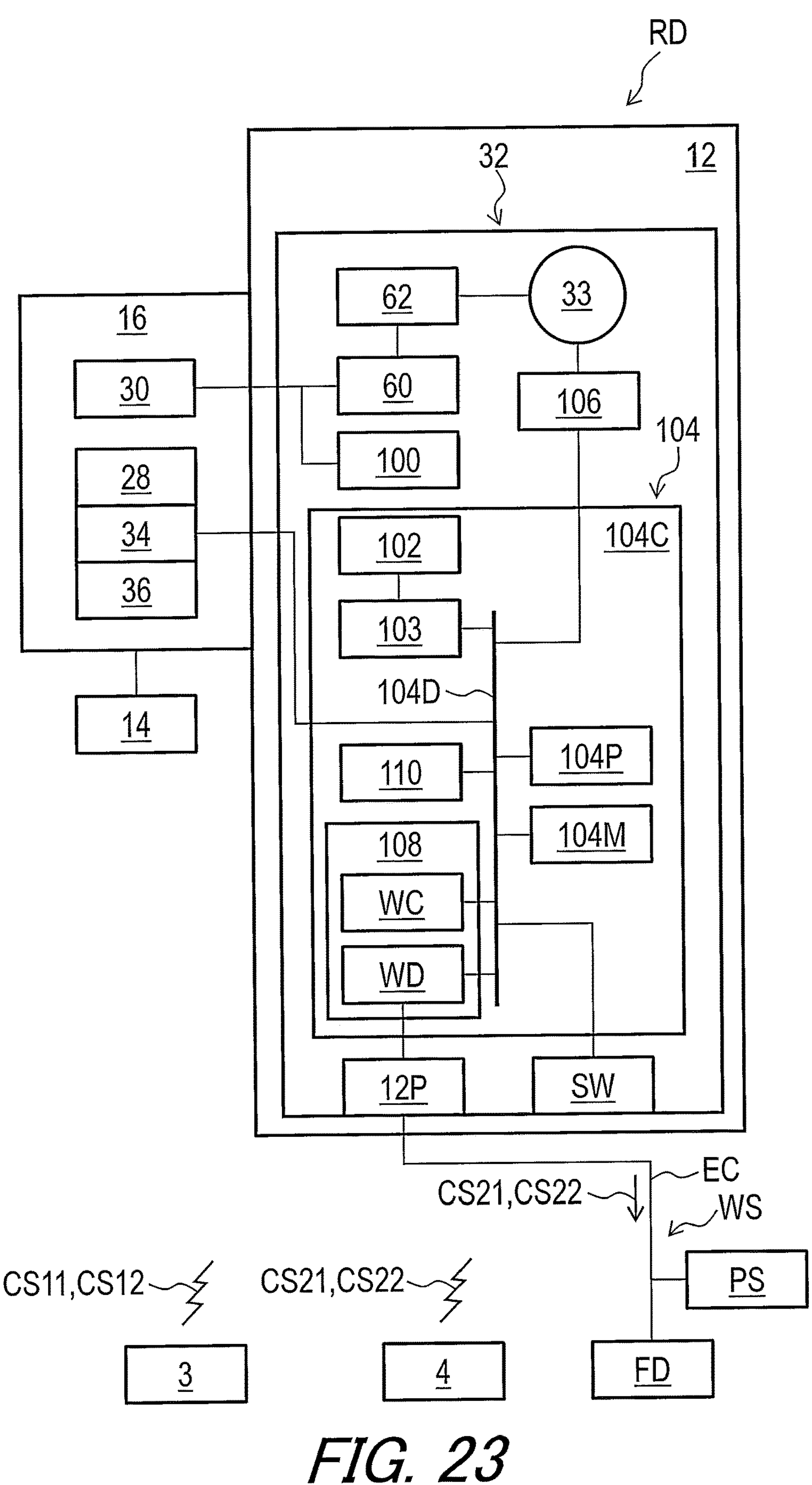
FIG. 23 is a schematic block diagram of the bicycle derailleur illustrated in FIG. 2.

As seen in FIG. 23, the wired communicator WD is configured to communicate with another wired communicator of another device via the wired communication structure WS using power line communication (PLC) technology. For example, the wired communication structure WS includes a ground line and a voltage line that are detachably connected to a serial bus that is formed by communication interfaces. In the present embodiment, the wired communicator WD is configured to communicate with the derailleur FD through the voltage line using the PLC technology. Since the PLC technology has been known, it will not be described in detail here for the sake of brevity.

The electronic controller 104 is configured to control the wired communicator WD to transmit the control signal CS21 to the derailleur FD via the wired communication structure WS in a case where the wireless communicator WC wirelessly receives the control signal CS21 from the operating device 4. The electronic controller 104 is configured to control the wired communicator WD to transmit the control signal CS22 to the derailleur FD via the wired communication structure WS in a case where the wireless communicator WC wirelessly receives the control signal CS22 from the operating device 4.

The connection port 12P is electrically connected to the electronic controller 104 via the wired communicator WD. Electricity can be supplied from the external power source PS to the bicycle motor unit 32 via the connection port 12P and the wired communicator WD in a state where the external power source PS is connected to the connection port 12P via the electric cable EC.

As seen in FIG. 22, the informing device 110 is configured to inform the user of information relating to the bicycle derailleur RD. The informing device 110 includes an indicator configured to indicate the information. For example, the indicator includes a light emitting diode.

The electric switch SW is configured to receive a user input from the user. The electric switch SW is configured to be activated in response to the user input. The electric switch SW is electrically connected to the electronic controller 104. The electronic controller 104 is configured to recognize the activation of the electric switch SW. The user input includes a normal press, a long press, and a double click of the electric switch SW.

The electronic controller 104 is electrically connected to the calculation circuit 103 to receive the rotational position calculated by the calculation circuit 103. The electronic controller 104 is configured to monitor a current gear position of the bicycle derailleur RD based on the rotational position calculated by the calculation circuit 103. The electronic controller 104 is configured to store the current gear position in the memory 104M.

The transmitting structure 60 allows the output member 56 to rotate in the state where the external rotational force ERF is equal to or higher than the external torque threshold. Thus, the chain guide 14 can be unintentionally moved by the external force EF caused by the physical contact between the obstacle and at least one of the chain guide 14 and the linkage 16. The bicycle motor unit 32 is configured to automatically return the chain guide 14 to a previous gear position which is a position before the chain guide 14 is moved by the external force EF.

The electronic controller 104 is configured to periodically monitor the current gear position based on the rotational position calculated by the calculation circuit 103. The electronic controller 104 is configured to periodically determine, based on the rotational position calculated by the calculation circuit 103, whether the chain guide 14 is moved from the current gear position by the external force EF. The electronic controller 104 is configured to conclude that the chain guide 14 is moved from the current gear position by the external force EF if the rotational position calculated by the calculation circuit 103 indicates that the chain guide 14 is moved while the electronic controller 104 does not receive the control signals CS11 and CS12 generated by the operating device 3.

If the electronic controller 104 concludes that the chain guide 14 is moved from the current gear position by the external force EF, the electronic controller 104 controls the electric motor 33 to return the chain guide 14 to the previous gear position. The electronic controller 104 is configured to control the informing device 110 to inform the user that the chain guide 14 is moved by the external force EF.

Second Embodiment

A bicycle motor unit 232 in accordance with a second embodiment will be described below referring to FIGS. 24 and 25. The bicycle motor unit 232 has the same structure and/or configuration as those of the bicycle motor unit 32 except for the transmitting structure 60. Thus, elements having substantially the same function as those in the first embodiment will be numbered the same here and will not be described and/or illustrated again in detail here for the sake of brevity.

Figure 24:
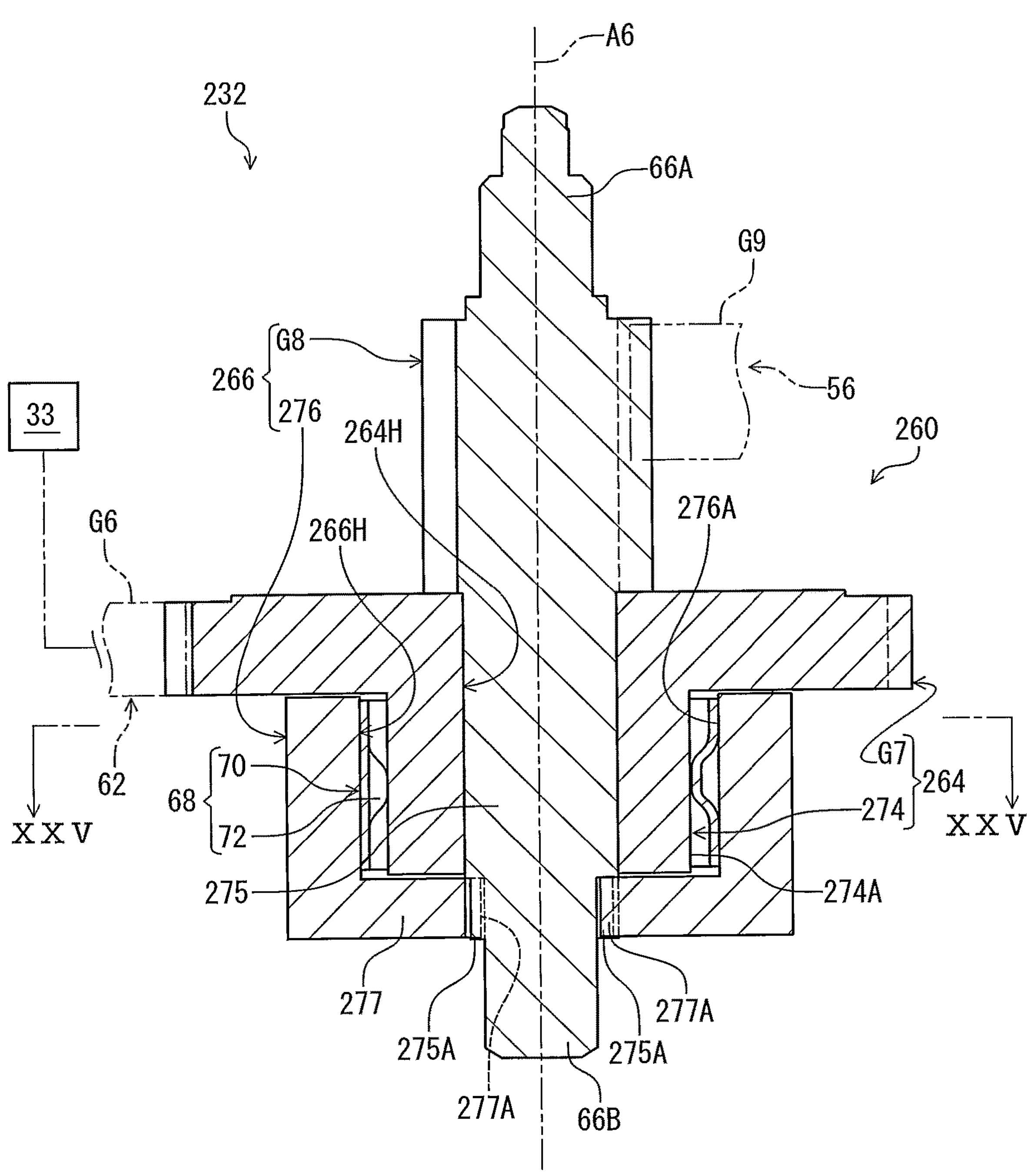
FIG. 24 is a cross-sectional view of a transmitting structure of a bicycle motor unit in accordance with a second embodiment, taken along line XXIV-XXIV of FIG. 25.

As seen in FIG. 24, the bicycle motor unit 232 comprises a transmitting structure 260. The transmitting structure 260 has substantially the same structure as the structure of the transmitting structure 60 described in the first embodiment. The transmitting structure 260 includes a first rotatable member 264, a second rotatable member 266, and the resisting structure 68. The first rotatable member 264 is rotatable about the rotational axis A6. The second rotatable member 266 is rotatable relative to the first rotatable member 264 about the rotational axis A6.

The first rotatable member 264 includes the first gear G7. The first gear G7 is configured to mesh with the first additional gear G6 to receive the driving force (e.g., the driving rotational force RF0) from the electric motor 33 via the first additional gear G6. The second rotatable member 266 includes the second gear G8. The second gear G8 is configured to mesh with the second additional gear G9 to transmit the driving force (e.g., the driving rotational force RF0) to the second additional gear G9.

The resisting structure 68 is at least partially provided radially between the first rotatable member 264 and the second rotatable member 266 with respect to the rotational axis A6 so as to resist relative rotation between the first rotatable member 264 and the second rotatable member 266.

In the present embodiment, the resisting structure 68 is entirely provided radially between the first rotatable member 264 and the second rotatable member 266 with respect to the rotational axis A6 so as to resist the relative rotation between the first rotatable member 264 and the second rotatable member 266. However, the resisting structure 68 can be partially provided radially between the first rotatable member 264 and the second rotatable member 266 with respect to the rotational axis A6 so as to resist the relative rotation between the first rotatable member 264 and the second rotatable member 266 if needed and/or desired.

The first rotatable member 264 is radially spaced apart from the second rotatable member 266 with respect to the rotational axis A6. The second rotatable member 266 is at least partially provided radially inwardly of the first rotatable member 264 with respect to the rotational axis A6. In the present embodiment, the second rotatable member 266 is partially provided radially inwardly of the first rotatable member 264 with respect to the rotational axis A6. However, the second rotatable member 266 can be entirely provided radially inwardly of the first rotatable member 264 with respect to the rotational axis A6 if needed and/or desired. The first rotatable member 264 can be at least partially provided radially inwardly of the second rotatable member 266 with respect to the rotational axis A6 if needed and/or desired.

The resisting member 70 is a separate member from at least one of the first rotatable member 264 and the second rotatable member 266. In the present embodiment, the resisting member 70 is a separate member from the first rotatable member 264 and the second rotatable member 266. However, the resisting member 70 can be integrally provided with one of the first rotatable member 264 and the second rotatable member 266 as a one-piece unitary member if needed and/or desired.

The slidable member 72 is configured to slidably contact at least one of the first rotatable member 264 and the second rotatable member 266. The slidable member 72 circumferentially extends about the rotational axis A6. The slidable member 72 is radially deformed between the first rotatable member 264 and the second rotatable member 266.

Figure 25:
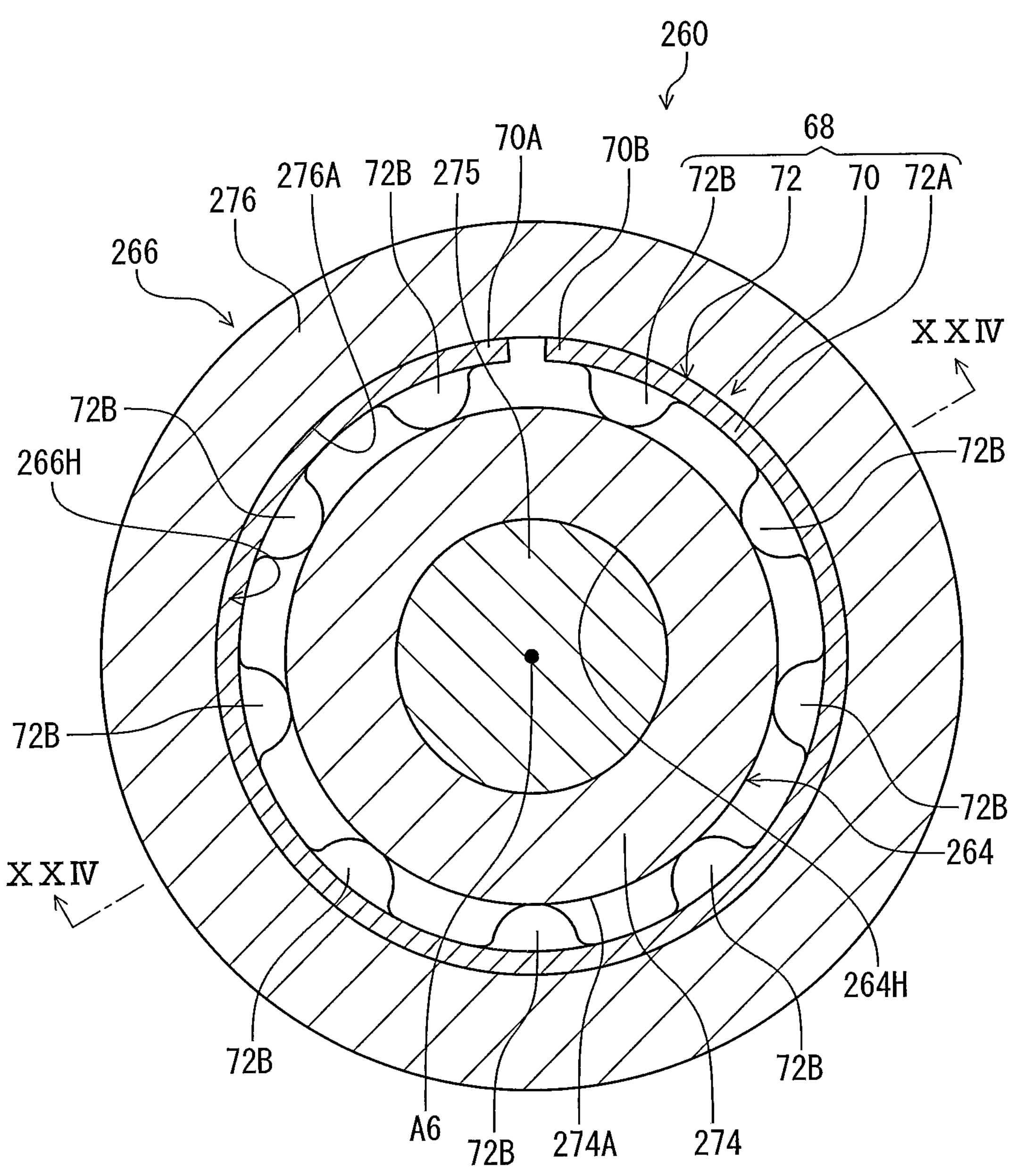
FIG. 25 is a cross-sectional view of the transmitting structure taken along line XXV-XXV of FIG. 24.

As seen in FIG. 25, the slidable member 72 is configured to slidably contact both the first rotatable member 264 and the second rotatable member 266. The base part 72A slidably contacts the second rotatable member 266. The at least two slidable parts 72B slidably contacts the first rotatable member 264. The base part 72A circumferentially extends about the rotational axis A6. The at least two slidable parts 72B protrude radially from the base part 72A toward one of the first rotatable member 264 and the second rotatable member 266. The at least two slidable parts 72B protrude radially inwardly from the base part 72A toward the first rotatable member 264. However, the at least two slidable parts 72B protrude radially from the base part 72A toward the second rotatable member 266 if needed and/or desired. The base part 72A can be configured to slidably contact the first rotatable member 264 if needed and/or desired. The at least two slidable parts 72B can be configured to slidably contact the second rotatable member 266 if needed and/or desired.

As seen in FIG. 24, the first rotatable member 264 includes a first coupling portion 274 coupled to the resisting structure 68. The second rotatable member 266 includes a second coupling portion 276 coupled to the resisting structure 68. The second coupling portion 276 is at least partially provided radially outwardly of the first coupling portion 274. The first coupling portion 274 has a tubular shape. The second coupling portion 276 has a tubular shape. The first rotatable member 264 includes a hole 264H. The hole 264H extends along the rotational axis A6. The first coupling portion 274 includes the hole 264H.

In the present embodiment, the second rotatable member 266 includes a radially inner portion 275. The radially inner portion 275 is provided radially inwardly of the second coupling portion 276 with respect to the rotational axis A6. The first coupling portion 274 is at least partially provided radially between the second coupling portion 276 and the radially inner portion 275 with respect to the rotational axis A6.

The second rotatable member 266 is at least partially provided in the hole 264H. The radially inner portion 275 extends from the second gear G8 along the rotational axis A6. The radially inner portion 275 is at least partially provided in the hole 264H. The first rotatable member 264 is slidable with the radially inner portion 275. The first coupling portion 274 is slidable with the radially inner portion 275. For example, grease can be provided between the first coupling portion 274 and the radially inner portion 275.

The second rotatable member 266 includes a second hole 266H. The second hole 266H extends along the rotational axis A6. The second coupling portion 276 includes the second hole 266H. The first coupling portion 274 is at least partially provided radially inwardly of the second coupling portion 276. The first coupling portion 274 is at least partially provided in the second hole 266H.

In the present embodiment, the first coupling portion 274 is partially provided radially inwardly of the second coupling portion 276. The first coupling portion 274 is partially provided in the second hole 266H. However, the first coupling portion 274 can be entirely provided radially inwardly of the second coupling portion 276 if needed and/or desired. The first coupling portion 274 can be entirely provided in the second hole 266H if needed and/or desired. The second coupling portion 276 can be at least partially provided radially inwardly of the first coupling portion 274 if needed and/or desired.

The second rotatable member 266 includes a second extending portion 277. The second extending portion 277 extends between the radially inner portion 275 and the second coupling portion 276 such that the second coupling portion 276 is rotatable integrally with the radially inner portion 275 about the rotational axis A6.

The second extending portion 277 extends radially from the second coupling portion 276 toward the radially inner portion 275. The second extending portion 277 extends radially inwardly from the second coupling portion 276 toward the radially inner portion 275. The second extending portion 277 is coupled to the radially inner portion 275 to rotate integrally with the radially inner portion 275 about the rotational axis A6. The second extending portion 277 is integrally provided with the second coupling portion 276. Thus, the second coupling portion 276 and the second extending portion 277 are rotatable integrally with the radially inner portion 275 and the second gear G8 about the rotational axis A6.

In the present embodiment, the second extending portion 277 is coupled to the radially inner portion 275 with a structure such as a serration or a spline. For example, the second extending portion 277 includes at least two first teeth 277A. The radially inner portion 275 includes at least two second teeth 275A. The at least two first teeth 277A mesh with the at least two second teeth 275A. However, the second extending portion 277 can be coupled to the radially inner portion 275 with structures other than a serration or a spline if needed and/or desired.

As seen in FIG. 24, the first rotatable member 264 is operatively coupled to the electric motor 33 to receive the driving force (e.g., the driving rotational force RF0) from the electric motor 33. The second rotatable member 266 is configured to receive the driving force (e.g., the driving rotational force RF0) from the electric motor 33 via the resisting structure 68 and the first rotatable member 264. However, the second rotatable member 266 can be operatively coupled to the electric motor 33 to receive the driving force (e.g., the driving rotational force RF0) from the electric motor 33 if needed and/or desired. The first rotatable member 264 is configured to receive the driving force (e.g., the driving rotational force RF0) from the electric motor 33 via the resisting structure 68 and the second rotatable member 266 if needed and/or desired.

The first gear G7 is coupled to the first coupling portion 274. The first coupling portion 274 extends from the first gear G7 along the rotational axis A6. The first gear G7 protrudes radially from the first coupling portion 274 with respect to the rotational axis A6. The first gear G7 protrudes radially outwardly from the first coupling portion 274 with respect to the rotational axis A6. In the present embodiment, the first gear G7 is integrally provided with the first coupling portion 274 as a one-piece unitary member. However, the first gear G7 can be a separate member from the first coupling portion 274 if needed and/or desired.

The second gear G8 is coupled to the second coupling portion 276. The second coupling portion 276 extends from the second gear G8 along the rotational axis A6. The second gear G8 extends from the second coupling portion 276 along the rotational axis A6. The second gear G8 is at least partially provided in the hole 264H. In the present embodiment, the second gear G8 is entirely provided outside the hole 264H. The second gear G8 is a separate member from the second coupling portion 276. However, the second gear G8 can be partially provided outside the hole 264H if needed and/or desired. The second gear G8 can be integrally provided with the second coupling portion 276 as a one-piece unitary member if needed and/or desired.

As seen in FIG. 25, the first coupling portion 274 includes a first contact surface 274A contactable with the resisting structure 68. The second coupling portion 276 includes a second contact surface 276A contactable with the resisting structure 68.

The first contact surface 274A at least partially defines the hole 264H. The first contact surface 274A circumferentially extends about the rotational axis A6. The second contact surface 276A circumferentially extends about the rotational axis A6. The first contact surface 274A radially faces toward the second contact surface 276A. The second contact surface 276A radially faces toward the first contact surface 274A.

The first contact surface 274A is radially spaced apart from the second contact surface 276A with respect to the rotational axis A6. In the present embodiment, the first contact surface 274A is provided radially inwardly of the second contact surface 276A with respect to the rotational axis A6. However, the first contact surface 274A can be provided radially outwardly of the second contact surface 276A with respect to the rotational axis A6 if needed and/or desired.

The description regarding the bicycle motor unit 32 described in the first embodiment can be utilized as the description regarding the bicycle motor unit 232. Thus, the bicycle motor unit 232 will not be described in detail here for the sake of brevity.

Figure 26:
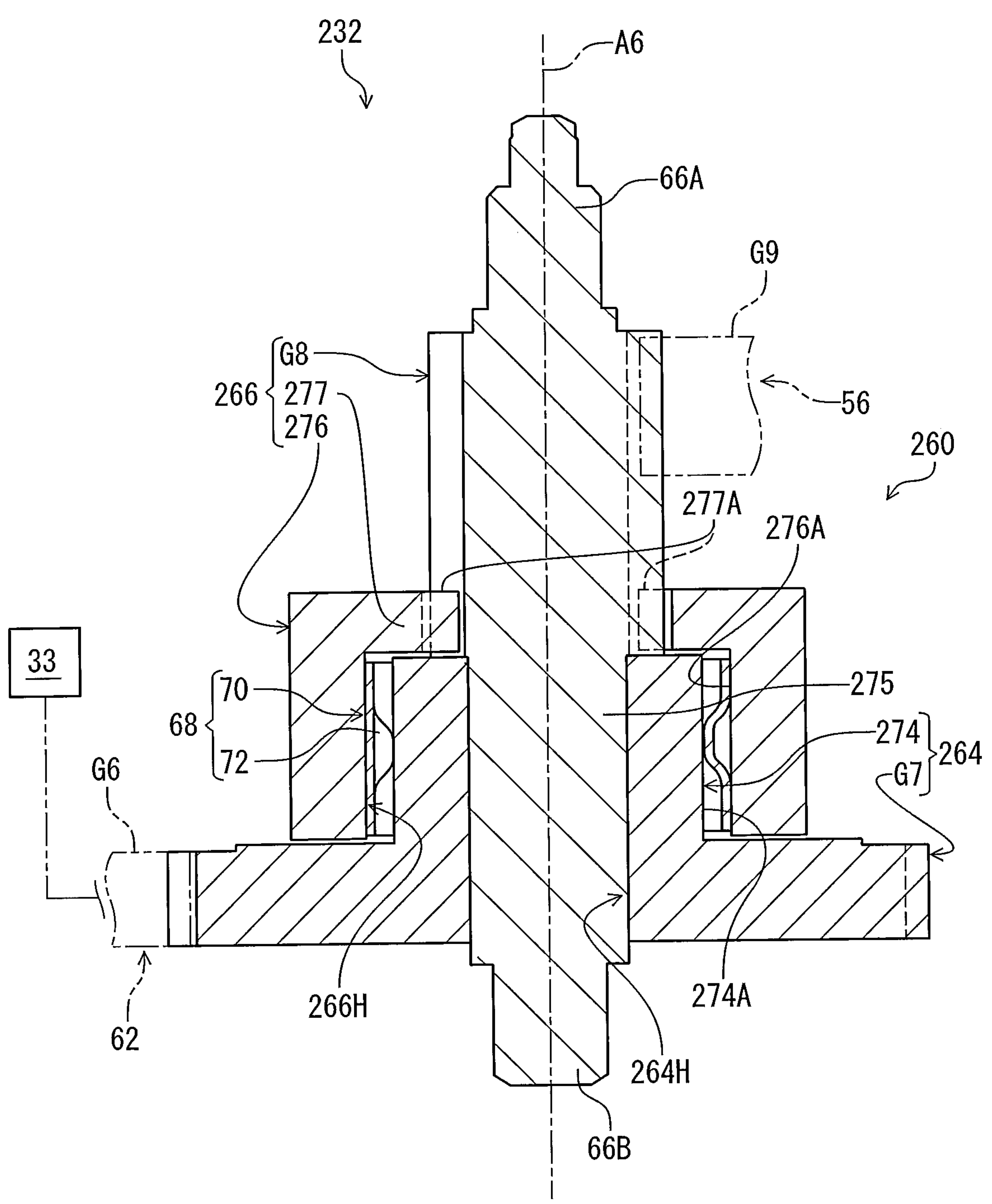
FIG. 26 is a cross-sectional view of a transmitting structure of a bicycle motor unit in accordance with a modification of the second embodiment.

The first rotatable member 264 can be provided in the position depicted in FIG. 26 if needed and/or desired. In the modification depicted in FIG. 26, the first coupling portion 274 is provided closer to the second gear G8 than the first gear G7 in an axial direction D6 parallel to the rotational axis A6. The at least two first teeth 277A mesh with teeth of the second gear G8. The at least two second teeth 275A are omitted from the second rotatable member 266.

Third Embodiment

A bicycle motor unit 332 in accordance with a second embodiment will be described below referring to FIGS. 27 and 28. The bicycle motor unit 332 has the same structure and/or configuration as those of the bicycle motor unit 32 except for the transmitting structure 60. Thus, elements having substantially the same function as those in the first or second embodiment will be numbered the same here and will not be described and/or illustrated again in detail here for the sake of brevity.

Figure 27:
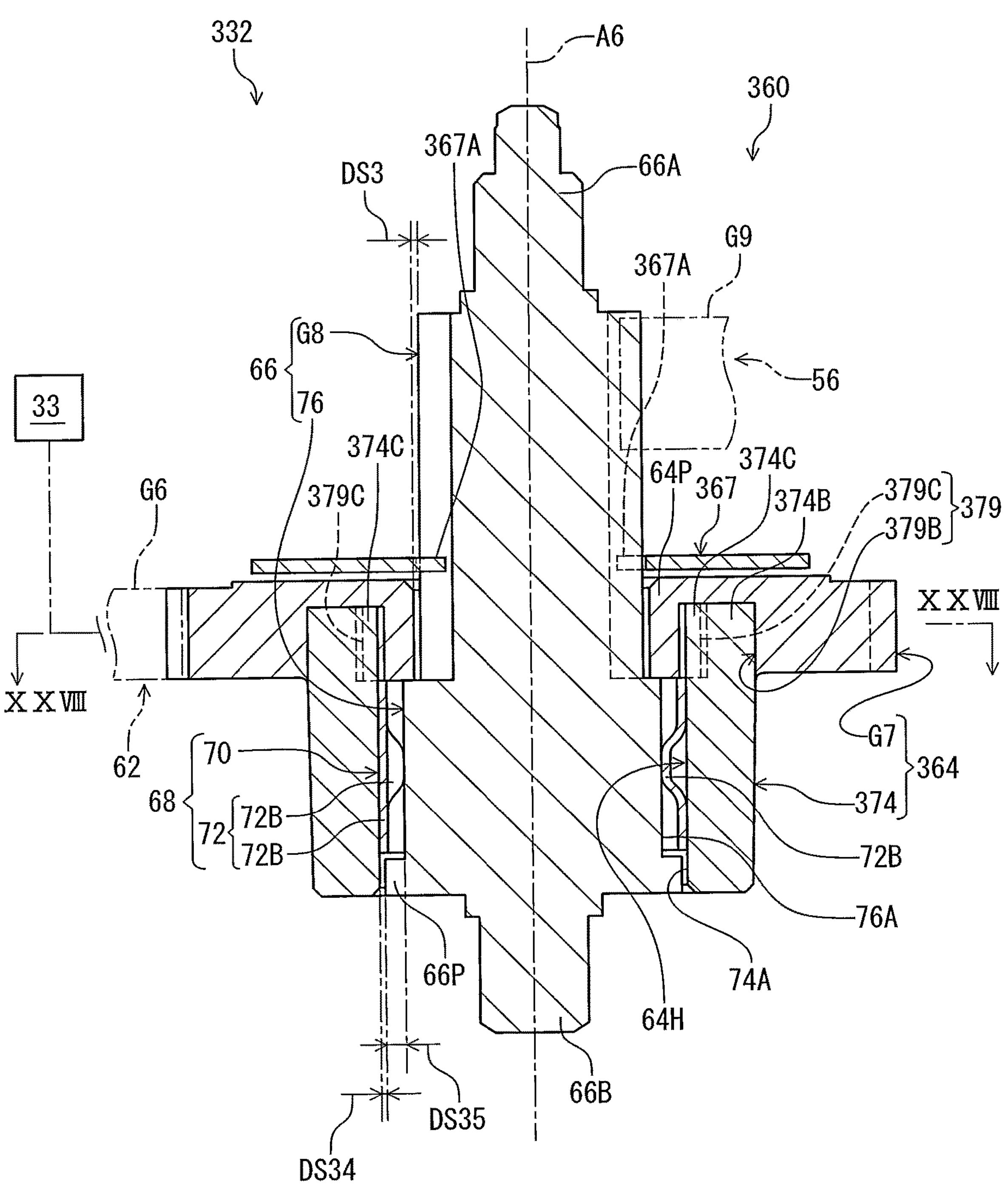
FIG. 27 is a cross-sectional view of a transmitting structure of a bicycle motor unit in accordance with a third embodiment, taken along line XXVII-XXVII of FIG. 28.

As seen in FIG. 27, the bicycle motor unit 332 comprises a transmitting structure 360. The transmitting structure 360 has substantially the same structure as the structure of the transmitting structure 60 described in the first embodiment. The transmitting structure 360 includes a first rotatable member 364, the second rotatable member 66, and the resisting structure 68. The first rotatable member 364 is rotatable about the rotational axis A6. The second rotatable member 66 is rotatable relative to the first rotatable member 364 about the rotational axis A6. The first rotatable member 364 includes the first gear G7.

The resisting structure 68 is at least partially provided radially between the first rotatable member 364 and the second rotatable member 66 with respect to the rotational axis A6 so as to resist relative rotation between the first rotatable member 364 and the second rotatable member 66.

In the present embodiment, the resisting structure 68 is entirely provided radially between the first rotatable member 364 and the second rotatable member 66 with respect to the rotational axis A6 so as to resist the relative rotation between the first rotatable member 364 and the second rotatable member 66. However, the resisting structure 68 can be partially provided radially between the first rotatable member 364 and the second rotatable member 66 with respect to the rotational axis A6 so as to resist the relative rotation between the first rotatable member 364 and the second rotatable member 66 if needed and/or desired.

The first rotatable member 364 is radially spaced apart from the second rotatable member 66 with respect to the rotational axis A6. The second rotatable member 66 is at least partially provided radially inwardly of the first rotatable member 364 with respect to the rotational axis A6. In the present embodiment, the second rotatable member 66 is partially provided radially inwardly of the first rotatable member 364 with respect to the rotational axis A6. However, the second rotatable member 66 can be entirely provided radially inwardly of the first rotatable member 364 with respect to the rotational axis A6 if needed and/or desired. The first rotatable member 364 can be at least partially provided radially inwardly of the second rotatable member 66 with respect to the rotational axis A6 if needed and/or desired.

The resisting member 70 is a separate member from at least one of the first rotatable member 364 and the second rotatable member 66. In the present embodiment, the resisting member 70 is a separate member from the first rotatable member 364 and the second rotatable member 66. However, the resisting member 70 can be integrally provided with one of the first rotatable member 364 and the second rotatable member 66 as a one-piece unitary member if needed and/or desired.

The slidable member 72 is configured to slidably contact at least one of the first rotatable member 364 and the second rotatable member 66. The slidable member 72 circumferentially extends about the rotational axis A6. The slidable member 72 is radially deformed between the first rotatable member 364 and the second rotatable member 66.

As seen in FIG. 27, the slidable member 72 is configured to slidably contact both the first rotatable member 364 and the second rotatable member 66. The base part 72A slidably contacts the first rotatable member 364. The at least two slidable parts 72B slidably contacts the second rotatable member 66. The base part 72A circumferentially extends about the rotational axis A6. The at least two slidable parts 72B protrude radially from the base part 72A toward one of the first rotatable member 364 and the second rotatable member 66. The at least two slidable parts 72B protrude radially inwardly from the base part 72A toward the second rotatable member 66. However, the at least two slidable parts 72B protrude radially outwardly from the base part 72A toward the first rotatable member 364 if needed and/or desired. The base part 72A can be configured to slidably contact the second rotatable member 66 if needed and/or desired. The at least two slidable parts 72B can be configured to slidably contact the first rotatable member 364 if needed and/or desired.

As seen in FIG. 27, the first rotatable member 364 includes a first coupling portion 374 coupled to the resisting structure 68. The second rotatable member 66 includes the second coupling portion 76 coupled to the resisting structure 68. The second coupling portion 76 is at least partially provided radially inwardly of the first coupling portion 374. The first coupling portion 374 has a tubular shape. The first rotatable member 364 includes the hole 64H. The hole 64H extends along the rotational axis A6. The first coupling portion 374 includes the hole 264H. The second coupling portion 76 is at least partially provided in the hole 64H.

In the present embodiment, the second coupling portion 76 is entirely provided radially inwardly of the first coupling portion 374. The second coupling portion 76 is entirely provided in the hole 64H. However, the second coupling portion 76 can be partially provided radially inwardly of the first coupling portion 374 if needed and/or desired. The second coupling portion 76 can be partially provided in the hole 64H if needed and/or desired. The first coupling portion 374 can be at least partially provided radially inwardly of the second coupling portion 76 if needed and/or desired.

As seen in FIG. 27, the first rotatable member 364 is operatively coupled to the electric motor 33 to receive the driving force (e.g., the driving rotational force RF0) from the electric motor 33. The second rotatable member 66 is configured to receive the driving force (e.g., the driving rotational force RF0) from the electric motor 33 via the resisting structure 68 and the first rotatable member 364. However, the second rotatable member 66 can be operatively coupled to the electric motor 33 to receive the driving force (e.g., the driving rotational force RF0) from the electric motor 33 if needed and/or desired. The first rotatable member 364 is configured to receive the driving force (e.g., the driving rotational force RF0) from the electric motor 33 via the resisting structure 68 and the second rotatable member 66 if needed and/or desired.

The first gear G7 is coupled to the first coupling portion 374. The first coupling portion 374 includes the first contact surface 74A contactable with the resisting structure 68. The first coupling portion 374 extends from the first gear G7 along the rotational axis A6. The first gear G7 protrudes radially from the first coupling portion 374 with respect to the rotational axis A6. The first gear G7 protrudes radially outwardly from the first coupling portion 374 with respect to the rotational axis A6. In the present embodiment, the first gear G7 is a separate member from the first coupling portion 374. However, the first gear G7 can be integrally provided with the first coupling portion 374 as a one-piece unitary member if needed and/or desired.

The first coupling portion 374 is a separate member from the first gear G7. The first coupling portion 374 includes a first engagement part 374B. The first gear G7 includes a second engagement part 379. The second engagement part 379 includes an engagement recess 379B. The first engagement part 374B is at least partially provided in the engagement recess 379B.

Figure 28:
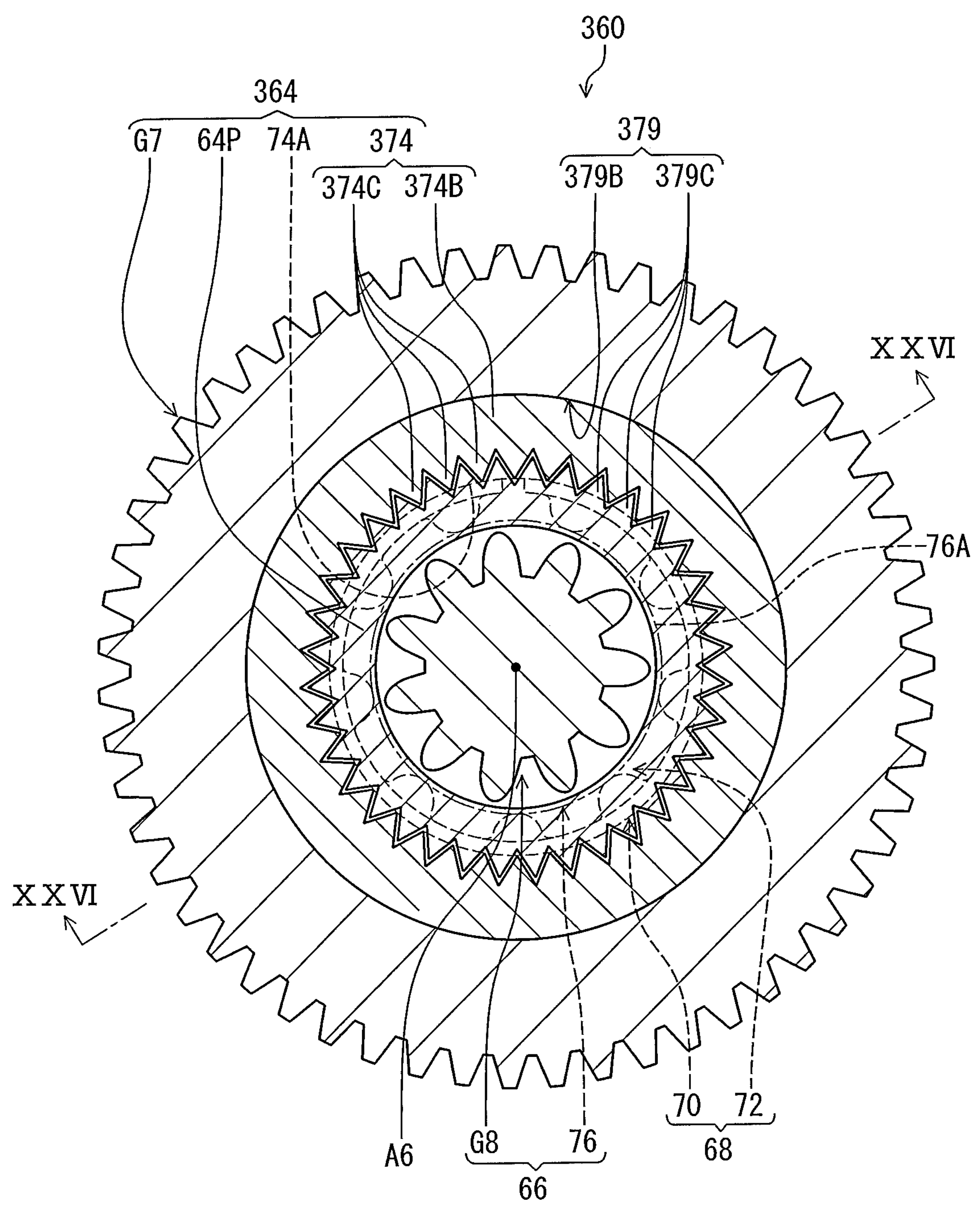
FIG. 28 is a cross-sectional view of the transmitting structure taken along line XXVIII-XXVIII of FIG. 27.

In the present embodiment, as seen in FIG. 28, the first engagement part 374B is coupled to the second engagement part 379 with a structure such as a serration or a spline. For example, the first engagement part 374B includes at least two first engagement teeth 374C. The second engagement part 379 includes at least two second engagement teeth 379C at least partially defining the engagement recess 379B. The at least two first engagement teeth 374C mesh with the at least two second engagement teeth 379C. Thus, the first coupling portion 374 rotates integrally with the first gear G7 relative to the second rotatable member 66 about the rotational axis A6. The first engagement part 374B can be coupled to the second engagement part 379 with another structure other than a serration or a spline if needed and/or desired.

As seen in FIG. 27, the first rotatable member 364 includes the first protruding portion 64P. The first protruding portion 64P is provided radially closer to the second rotatable member 66 than the first coupling portion 374 with respect to the rotational axis A6. The first protruding portion 64P protrudes radially from the first coupling portion 374 towards the second rotatable member 66 with respect to the rotational axis A6.

In the present embodiment, the first protruding portion 64P is provided radially inwardly closer to the second rotatable member 66 than the first coupling portion 374 with respect to the rotational axis A6. The first protruding portion 64P is provided radially inwardly closer to the second gear G8 than the first coupling portion 374 with respect to the rotational axis A6. The first protruding portion 64P protrudes radially inwardly from the first coupling portion 374 towards the second rotatable member 66 with respect to the rotational axis A6. The first protruding portion 64P protrudes radially inwardly from the first coupling portion 374 towards the second gear G8 with respect to the rotational axis A6. The first protruding portion 64P has an annular shape.

However, the first protruding portion 64P can have a shape other than the annular shape if needed and/or desired. The first protruding portion 64P can be omitted from the first rotatable member 364 in the third embodiment if needed and/or desired.

The second protruding portion 66P is provided radially closer to the first rotatable member 364 than the second coupling portion 76 with respect to the rotational axis A6. The second protruding portion 66P protrudes radially from the second coupling portion 76 towards the first rotatable member 364 with respect to the rotational axis A6.

In the present embodiment, the second protruding portion 66P is provided radially inwardly closer to the first rotatable member 364 than the second coupling portion 76 with respect to the rotational axis A6. The second protruding portion 66P is provided radially inwardly closer to the first coupling portion 374 than the second coupling portion 76 with respect to the rotational axis A6. The second protruding portion 66P protrudes radially outwardly from the second coupling portion 76 towards the first rotatable member 364 with respect to the rotational axis A6. The second protruding portion 66P protrudes radially outwardly from the second coupling portion 76 towards the first coupling portion 374 with respect to the rotational axis A6. The second protruding portion 66P is provided radially outwardly of the second contact surface 76A. The second protruding portion 66P has an annular shape.

However, the second protruding portion 66P can have any shape other than the annular shape if needed and/or desired. The second protruding portion 66P can be omitted from the second rotatable member 66 in the third embodiment if needed and/or desired.

A second distance DS34 is defined radially between the second protruding portion 66P and the first coupling portion 374. A third distance DS35 is defined radially between the first coupling portion 374 and the second coupling portion 76. In the present embodiment, each of the first distance DS3 and the second distance DS34 is shorter than the third distance DS35. However, at least one of the first distance DS3 and the second distance DS34 can be longer than or equal to the third distance DS35 if needed and/or desired. The first protruding portion 64P can be omitted from the first rotatable member 364 if needed and/or desired. The second protruding portion 66P can be omitted from the second rotatable member 66 if needed and/or desired.

As seen in FIG. 28, the first protruding portion 64P at least partially overlaps the resisting structure 68 as viewed along the rotational axis A6. In the present embodiment, the first protruding portion 64P entirely overlaps the resisting structure 68 as viewed along the rotational axis A6. However, the first protruding portion 64P can be arranged to partially overlap the resisting structure 68 as viewed along the rotational axis A6 if needed and/or desired.

The bicycle motor unit 32 further comprises a restricting member 367. The restricting member 367 is coupled to at least one of the first rotatable member 364 and the second rotatable member 66 to restrict a relative movement between the first rotatable member 364 and the second rotatable member 66 along the rotational axis A6.

In the present embodiment, the restricting member 367 is coupled to the second rotatable member 66 to restrict the relative movement between the first rotatable member 364 and the second rotatable member 66 along the rotational axis A6. The restricting member 367 is coupled to the second gear G8 to restrict the relative movement between the first rotatable member 364 and the second rotatable member 66 along the rotational axis A6.

For example, the restricting member 367 has an annular shape. The restricting member 367 includes at least two teeth 367A. The at least two teeth 367A mesh with the teeth of the second gear G8. The at least two teeth 367A mesh with the teeth of the second gear G8. The restricting member 367 is secured to the second gear G8 with the at least two teeth 367A and the teeth of the second gear G8. Thus, the restricting member 367 restricts the first gear G7 from moving relative to the first coupling portion 374 and the second rotatable member 66 within a specific range.

The restricting member 367 can be coupled to the first rotatable member 364 to restrict the relative movement between the first rotatable member 364 and the second rotatable member 66 along the rotational axis A6 if needed and/or desired. The restricting member 367 can be omitted from the bicycle motor unit 332 if needed and/or desired.

Fourth Embodiment

A bicycle motor unit 432 in accordance with a second embodiment will be described below referring to FIGS. 29 and 30. The bicycle motor unit 432 has the same structure and/or configuration as those of the bicycle motor unit 32 except for the transmitting structure 60. Thus, elements having substantially the same function as those in at least one of the first, second, and third embodiments will be numbered the same here and will not be described and/or illustrated again in detail here for the sake of brevity.

Figure 29:
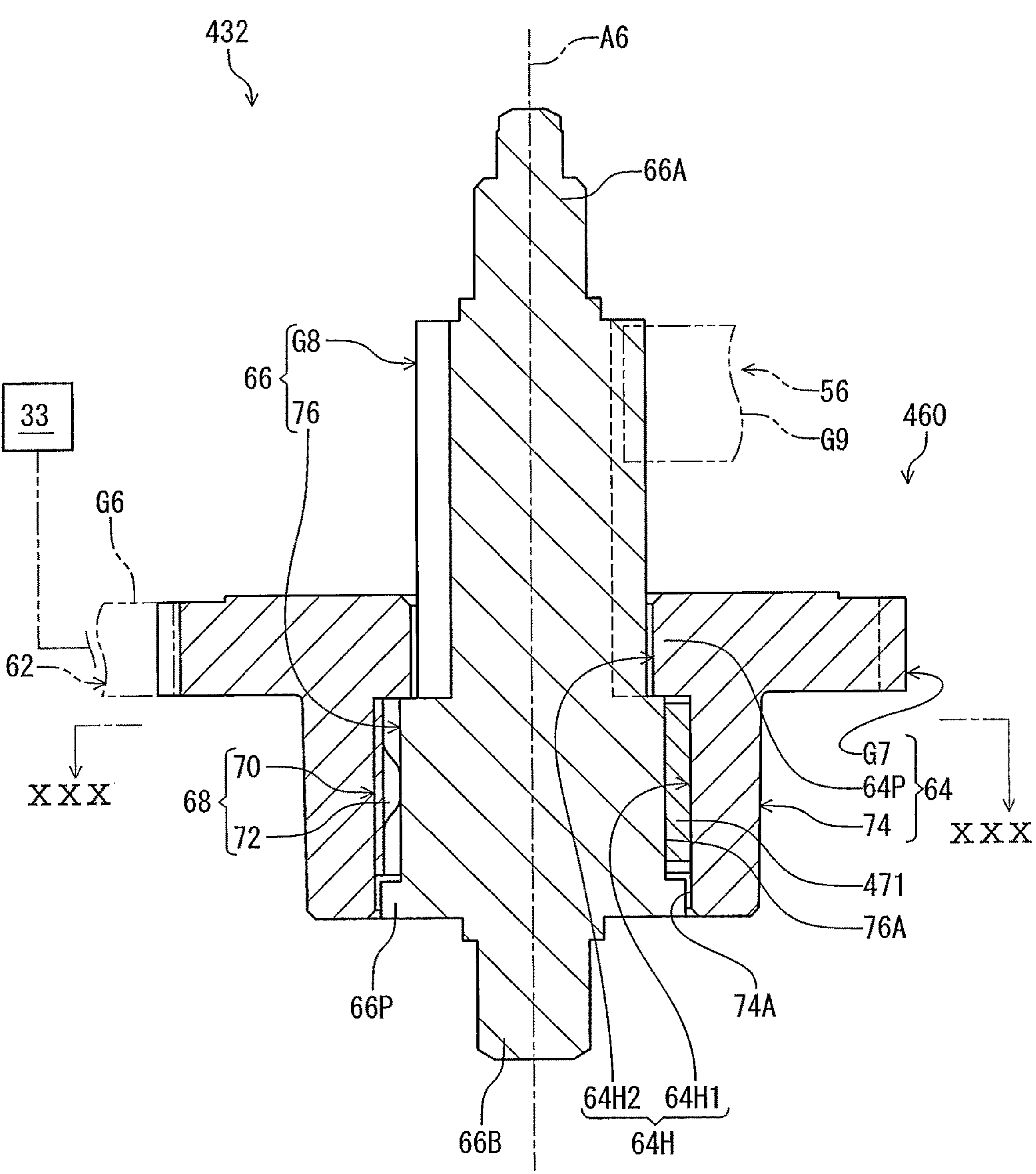
FIG. 29 is a cross-sectional view of a transmitting structure of a bicycle motor unit in accordance with a third embodiment, taken along line XXIX-XXIX of FIG. 30.

As seen in FIG. 29, the bicycle motor unit 432 comprises a transmitting structure 460. The transmitting structure 460 has substantially the same structure as the structure of the transmitting structure 60 described in the first embodiment. The transmitting structure 460 includes the first rotatable member 64, the second rotatable member 66, and the resisting structure 68. The first rotatable member 64 is rotatable about the rotational axis A6. The second rotatable member 66 is rotatable relative to the first rotatable member 64 about the rotational axis A6. The first rotatable member 64 includes the first gear G7.

The transmitting structure 460 includes a radial support 471. The radial support 471 is provided radially between the first rotatable member 64 and the second rotatable member 66 with respect to the rotational axis A6. The radial support 471 is a separate member from the first rotatable member 64 and the second rotatable member 66. The radial support 471 is a separate member from the resisting structure 68. However, the radial support 471 can be integrally provided with one of the first rotatable member 64, the second rotatable member 66, and the resisting structure 68 as a one-piece unitary member if needed and/or desired.

The radial support 471 is contactable with at least one of the first rotatable member 64 and the second rotatable member 66 to reduce a radial movement of the second rotatable member 66 relative to the first rotatable member 64. The radial support 471 is contactable with at least one of the first coupling portion 74 and the second coupling portion 76 to reduce the radial movement of the second rotatable member 66 relative to the first rotatable member 64.

In the present embodiment, the radial support 471 is contactable with the first rotatable member 64 and the second rotatable member 66 to reduce the radial movement of the second rotatable member 66 relative to the first rotatable member 64. The radial support 471 is contactable with the first coupling portion 74 and the second coupling portion 76 to reduce the radial movement of the second rotatable member 66 relative to the first rotatable member 64.

However, the radial support 471 is contactable with the first rotatable member 64 and the second rotatable member 66 to reduce the radial movement of the second rotatable member 66 relative to the first rotatable member 64. The radial support 471 is contactable with the first coupling portion 74 and the second coupling portion 76 to reduce the radial movement of the second rotatable member 66 relative to the first rotatable member 64.

Figure 30:
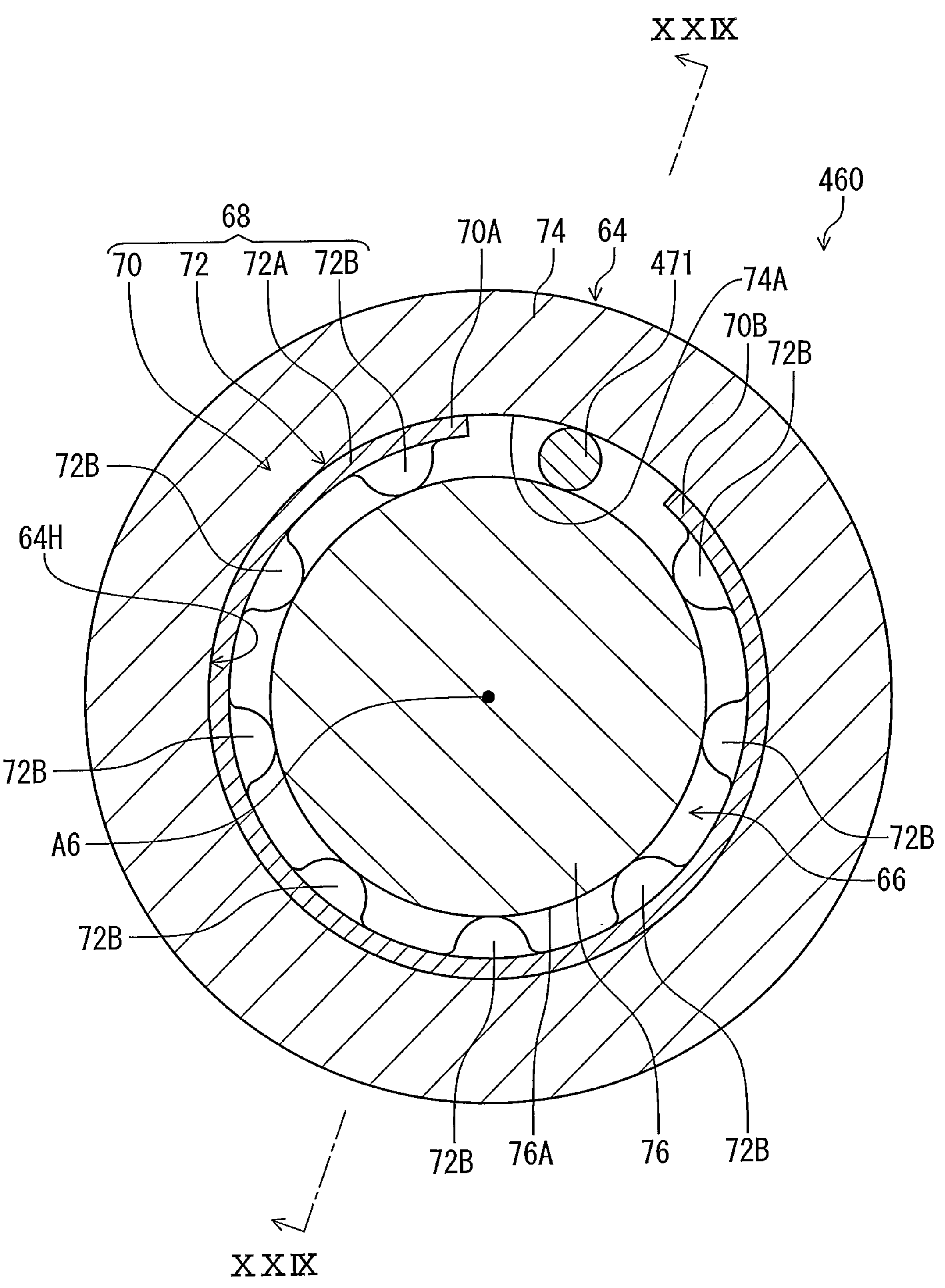
FIG. 30 is a cross-sectional view of the transmitting structure taken along line XXX-XXX of FIG. 29.

As seen in FIG. 30, the radial support 471 is at least partially provided circumferentially between the first circumferential end 70A and the second circumferential end 70B. In the present embodiment, the radial support 471 is entirely provided circumferentially between the first circumferential end 70A and the second circumferential end 70B. However, the radial support 471 can be partially provided circumferentially between the first circumferential end 70A and the second circumferential end 70B if needed and/or desired.

In the present embodiment, as seen in FIG. 29, the radial support 471 extends along the rotational axis A6. As seen in FIG. 30, for example, the radial support 471 has a columnar shape. However, the radial support 471 can have shapes other than the columnar shape if needed and/or desired. A total number of the radial support 471 is not limited to one.

In each of the first to fourth embodiments and the modifications thereof, the resisting member 70 of the resisting structure 68 includes the slidable member 72. However, the resisting structure 68 can include any structure (e.g., teeth (e.g., splines, serrations), a deformable member such as a spring (e.g., a coil spring), a surface treatment) configured to resist the relative rotation between the first rotatable member 64 and the second rotatable member 66 if needed and/or desired. In the first embodiment, for example, the resisting structure 68 can include first teeth and second teeth. The first teeth protrudes radially inwardly from the first rotatable member 64. The second teeth protrudes from the second rotatable member 66. The first teeth and the second teeth slidably mesh to resist the relative rotation between the first rotatable member 64 and the second rotatable member 66. The first teeth and the second teeth can be applied to the resisting member described in each of the second to fourth embodiments and the modifications thereof. The resisting structure 68 can be at least partially provided integrally with at least one of the first rotatable member 64 and the second rotatable member 66 if needed and/or desired. In the first embodiment, for example, the teeth can be at least partially provided integrally with at least one of the first rotatable member 64 and the second rotatable member 66. The first teeth can be at least partially provided integrally with the first rotatable member 64 if needed and/or desired. The first teeth can be at least partially provided integrally with the first coupling portion 74 if needed and/or desired. The first teeth can be applied to the resisting member described in each of the second to fourth embodiments and the modifications thereof. The second teeth can be at least partially provided integrally with the second rotatable member 66 if needed and/or desired. The second teeth can be at least partially provided integrally with the second coupling member 76 if needed and/or desired. The second teeth can be applied to the resisting member described in each of the second to fourth embodiments and the modifications thereof.

In the bicycle motor unit 32 described in the first embodiment, the first rotatable member 64 is rotatably coupled to the second rotatable member 66 via the resisting structure 68. However, the first rotatable member 64 can be rotatably coupled to the second rotatable member 66 via the resisting structure 68 and another member such as a gear if needed and/or desired. Structures other than the resisting structure 68 can be provided between the first rotatable member 64 and the second rotatable member 66 if needed and/or desired. The same modifications can be applied to the bicycle motor units 232, 332, and 432 described in the second to fourth embodiments and the modifications thereof if needed and/or desired.

Each of the bicycle motor units 32, 232, 332, and 432 and the modifications thereof is applied to the bicycle derailleur RD. However, at least one of the bicycle motor units 32, 232, 332, and 432 and the modifications thereof can be applied to other devices such as the bicycle derailleur FD, an adjustable seatpost, a suspension, and an assist driving unit if needed and/or desired.

The additional transmitting structure 62 can be omitted from each of the bicycle motor units 32, 232, 332, and 432 and the modifications thereof. The structure of the additional transmitting structure 62 is not limited to the structure described in each of the first to fourth embodiments and the modifications thereof.

In accordance with a first aspect of the embodiments, a bicycle motor unit comprises an electric motor and a transmitting structure. The electric motor is configured to generate a driving force. The transmitting structure is coupled to the electric motor to transmit the driving force from the electric motor to an actuated device of a bicycle. The transmitting structure includes a first rotatable member, a second rotatable member, and a resisting structure. The first rotatable member is rotatable about a rotational axis. The second rotatable member is rotatable relative to the first rotatable member about the rotational axis. The resisting structure is at least partially provided radially between the first rotatable member and the second rotatable member with respect to the rotational axis so as to resist relative rotation between the first rotatable member and the second rotatable member.

With the bicycle motor unit according to the first aspect, the resisting structure provides resistance to the relative rotation between the first rotatable member and the second rotatable member. Thus, the resisting structure reduces a rotational force transmitted between the first rotatable member and the second rotatable member when an external force is applied to at least one of the first rotatable member and the second rotatable member. Accordingly, it is possible to reduce an impact of the external force on the electric motor.

In accordance with a second aspect of the embodiments, the bicycle motor unit according to the first aspect is configured so that the first rotatable member is radially spaced apart from the second rotatable member with respect to the rotational axis.

With the bicycle motor unit according to the second aspect, it is possible to utilize a space between the first rotatable member and the second rotatable member.

In accordance with a third aspect of the embodiments, the bicycle motor unit according to the first or second aspect is configured so that the second rotatable member is at least partially provided radially inwardly of the first rotatable member with respect to the rotational axis.

With the bicycle motor unit according to the third aspect, it is possible to utilize a radially inner space of the first rotatable member for a space where the second rotatable member is at least partially provided. Thus, it is possible to make the transmitting structure comparatively compact.

In accordance with a fourth aspect of the embodiments, the bicycle motor unit according to any one of the first to third aspects is configured so that the resisting structure includes a resisting member. The resisting member is a separate member from at least one of the first rotatable member and the second rotatable member.

With the bicycle motor unit according to the fourth aspect, it is possible to improve design flexibility of the bicycle motor unit.

In accordance with a fifth aspect of the embodiments, the bicycle motor unit according to the fourth aspect is configured so that the resisting member includes a slidable member configured to slidably contact at least one of the first rotatable member and the second rotatable member.

With the bicycle motor unit according to the fifth aspect, it is possible to provide resistance using a frictional force generated between the slidable member and the at least one of the first rotatable member and the second rotatable member.

In accordance with a sixth aspect of the embodiments, the bicycle motor unit according to any one of the first to fifth aspects is configured so that the first rotatable member includes a first coupling portion coupled to the resisting structure. The second rotatable member includes a second coupling portion coupled to the resisting structure.

With the bicycle motor unit according to the sixth aspect, the resisting structure reliably provides the resistance to the relative rotation between the first rotatable member and the second rotatable member. Thus, the resisting structure reliably reduces the rotational force transmitted between the first rotatable member and the second rotatable member when the external force is applied to at least one of the first rotatable member and the second rotatable member. Accordingly, it is possible to reliably reduce the impact of the external force on the electric motor.

In accordance with a seventh aspect of the embodiments, the bicycle motor unit according to the sixth aspect is configured so that the second coupling portion is at least partially provided radially inwardly of the first coupling portion.

With the bicycle motor unit according to the seventh aspect, it is possible to utilize a radially inner space of the first coupling portion for a space where the second coupling portion is at least partially provided. Thus, it is possible to make the transmitting structure comparatively compact.

In accordance with an eighth aspect of the embodiments, the bicycle motor unit according to the sixth aspect is configured so that the second coupling portion is at least partially provided radially outwardly of the first coupling portion.

With the bicycle motor unit according to the eighth aspect, it is possible to utilize a radially outer space of the first coupling portion for a space where the second coupling portion is at least partially provided. Thus, it is possible to make the transmitting structure comparatively compact.

In accordance with a ninth aspect of the embodiments, the bicycle motor unit according to any one of the sixth to eighth aspects is configured so that the first coupling portion includes a first contact surface contactable with the resisting structure. The second coupling portion includes a second contact surface contactable with the resisting structure. The first contact surface is radially spaced apart from the second contact surface with respect to the rotational axis.

With the bicycle motor unit according to the ninth aspect, the resisting structure provides the resistance between the first contact surface and the resisting structure and/or between the second contact surface and the resisting structure. Thus, the resisting structure reliably reduces the rotational force transmitted between the first rotatable member and the second rotatable member when the external force is applied to at least one of the first rotatable member and the second rotatable member. Accordingly, it is possible to reliably reduce the impact of the external force on the electric motor.

In accordance with a tenth aspect of the embodiments, the bicycle motor unit according to any one of the sixth to ninth aspects is configured so that the first rotatable member includes a first protruding portion. The first protruding portion is provided radially closer to the second rotatable member than the first coupling portion with respect to the rotational axis.

With the bicycle motor unit according to the tenth aspect, the first protruding portion makes an orientation of the second rotatable member more stable relative to the first rotatable member.

In accordance with an eleventh aspect of the embodiments, the bicycle motor unit according to the tenth aspect is configured so that the first protruding portion at least partially overlaps the resisting structure as viewed along the rotational axis.

With the bicycle motor unit according to the eleventh aspect, the first protruding portion restricts the resisting structure from moving along the rotational axis.

In accordance with a twelfth aspect of the embodiments, the bicycle motor unit according to any one of the sixth to eleventh aspects is configured so that the second rotatable member includes a second protruding portion. The second protruding portion is provided radially closer to the first rotatable member than the second coupling portion with respect to the rotational axis.

With the bicycle motor unit according to the twelfth aspect, the second protruding portion makes an orientation of the first rotatable member more stable relative to the second rotatable member.

In accordance with a thirteenth aspect of the embodiments, the bicycle motor unit according to the twelfth aspect is configured so that the second protruding portion at least partially overlaps the resisting structure as viewed along the rotational axis.

With the bicycle motor unit according to the thirteenth aspect, the second protruding portion restricts the resisting structure from moving along the rotational axis.

In accordance with a fourteenth aspect of the embodiments, the bicycle motor unit according to any one of the sixth to thirteenth aspects is configured so that the second rotatable member includes a radially inner portion provided radially inwardly of the second coupling portion with respect to the rotational axis. The first coupling portion is at least partially provided radially between the second coupling portion and the radially inner portion with respect to the rotational axis.

With the bicycle motor unit according to the fourteenth aspect, it is possible to utilize a space between the second coupling portion and the radially inner portion for a space where the first coupling portion is at least partially provided. Thus, it is possible to make the transmitting structure comparatively compact.

In accordance with a fifteenth aspect of the embodiments, the bicycle motor unit according to the fourteenth aspect is configured so that the second rotatable member includes a second extending portion extending between the radially inner portion and the second coupling portion such that the second coupling portion is rotatable integrally with the radially inner portion about the rotational axis.

With the bicycle motor unit according to the fifteenth aspect, the second extending portion makes the second coupling portion and the radially inner portion integrally rotatable about the rotational axis.

In accordance with a sixteenth aspect of the embodiments, the bicycle motor unit according to any one of the first to fifteenth aspects is configured so that the first rotatable member is operatively coupled to the electric motor to receive the driving force from the electric motor. The second rotatable member is configured to receive the driving force from the electric motor via the resisting structure and the first rotatable member.

With the bicycle motor unit according to the sixteenth aspect, the resisting structure and the first rotatable member transmit the driving force from the electric motor to the second rotatable member. Thus, it is possible to output the driving force from the second rotatable member.

In accordance with a seventeenth aspect of the embodiments, the bicycle motor unit according to any one of the first to sixteenth aspects is configured so that the first rotatable member includes a first gear. The first gear is configured to mesh with a first additional gear to receive the driving force from the electric motor via the first additional gear.

With the bicycle motor unit according to the seventeenth aspect, it is possible to transmit the driving force from the electric motor to the first rotatable member via a comparatively simple structure such as the first gear and the first additional gear.

In accordance with an eighteenth aspect of the embodiments, the bicycle motor unit according to any one of the first to seventeenth aspects is configured so that the second rotatable member includes a second gear. The second gear is configured to mesh with a second additional gear to transmit the driving force to the second additional gear.

With the bicycle motor unit according to the eighteenth aspect, it is possible to output the driving force from the second rotatable member via a comparatively simple structure such as the second gear and the second additional gear.

In accordance with a nineteenth aspect of the embodiments, the bicycle motor unit according to the eighteenth aspect is configured so that the first rotatable member includes a hole extending along the rotational axis. The second gear is at least partially provided in the hole.

With the bicycle motor unit according to the nineteenth aspect, it is possible to utilize the hole for a space where the second coupling portion is at least partially provided. Thus, it is possible to make the transmitting structure comparatively compact.

In accordance with a twentieth aspect of the embodiments, the bicycle motor unit according to any one of the sixth to fifteenth aspects is configured so that the first rotatable member includes a first gear. The first gear is configured to mesh with a first additional gear to receive the driving force from the electric motor via the first additional gear. The first gear is coupled to the first coupling portion.

With the bicycle motor unit according to the twentieth aspect, it is possible to transmit the driving force from the electric motor to the first rotatable member via a comparatively simple structure such as the first gear and the first additional gear.

In accordance with a twenty-first aspect of the embodiments, the bicycle motor unit according to the twentieth aspect is configured so that the first coupling portion extends from the first gear along the rotational axis.

With the bicycle motor unit according to the twenty-first aspect, it is possible to improve design flexibility of the first coupling portion and the first gear.

In accordance with a twenty-second aspect of the embodiments, the bicycle motor unit according to the twentieth or twenty-first aspect is configured so that the second rotatable member includes a second gear. The second gear is configured to mesh with a second additional gear to transmit the driving force to the second additional gear. The second gear is coupled to the second coupling portion.

With the bicycle motor unit according to the twenty-second aspect, it is possible to transmit the driving force from the electric motor to the second rotatable member via a comparatively simple structure such as the second gear and the second additional gear.

In accordance with a twenty-third aspect of the embodiments, the bicycle motor unit according to the twenty-second aspect is configured so that the second coupling portion extends from the second gear along the rotational axis.

With the bicycle motor unit according to the twenty-third aspect, it is possible to improve design flexibility of the second coupling portion and the second gear.

In accordance with a twenty-fourth aspect of the embodiments, the bicycle motor unit according to any one of the first to twenty-third aspects is configured so that the transmitting structure includes a radial support provided radially between the first rotatable member and the second rotatable member with respect to the rotational axis.

With the bicycle motor unit according to the twenty-fourth aspect, the radial support makes the first rotatable member and the second rotatable member more stable with respect to the rotational axis.

In accordance with a twenty-fifth aspect of the embodiments, the bicycle motor unit according to the twenty-fourth aspect is configured so that the radial support is a separate member from the first rotatable member and the second rotatable member.

With the bicycle motor unit according to the twenty-fifth aspect, it is possible to improve design flexibility of at least one of the radial support, the first rotatable member, and the second rotatable member.

In accordance with a twenty-sixth aspect of the embodiments, the bicycle motor unit according to the twenty-fourth or twenty-fifth aspect is configured so that the radial support is contactable with at least one of the first rotatable member and the second rotatable member to reduce a radial movement of the second rotatable member relative to the first rotatable member.

With the bicycle motor unit according to the twenty-sixth aspect, the radial support reliably makes the first rotatable member and the second rotatable member more stable with respect to the rotational axis.

In accordance with a twenty-seventh aspect of the embodiments, the bicycle motor unit according to any one of the first to twenty-sixth aspect further comprises a restricting member. The restricting member is coupled to at least one of the first rotatable member and the second rotatable member to restrict a relative movement between the first rotatable member and the second rotatable member along the rotational axis.

With the bicycle motor unit according to the twenty-seventh aspect, the restricting member restricts the relative movement between the first rotatable member and the second rotatable member along the rotational axis. Thus, it is possible to make the relative position between the first rotatable member and the second rotatable member more stable along the rotational axis.

In accordance with a twenty-eighth aspect of the embodiments, the bicycle motor unit according to any one of the first to twenty-seventh aspects is configured so that the resisting structure allows relative rotation between the first rotatable member and the second rotatable member in response to input of a predetermined rotational force transmitted from at least one of the first rotatable member and the second rotatable member.

With the bicycle motor unit according to the twenty-eighth aspect, the first rotatable member and the second rotatable member are relatively rotated in response to the predetermined rotational force. Thus, it is possible to reduce the predetermined rotational force outputted from the transmitting structure or to restrict the predetermined rotational force from being transmitted between the first rotatable member and the second rotatable member. Thus, it is possible to reliably reduce the impact of the external force on the electric motor.

In accordance with a twenty-ninth aspect of the embodiments, the bicycle motor unit according to any one of the first to twenty-eighth aspects further comprises a housing including an internal space. The transmitting structure being at least partially provided in the internal space.

With the bicycle motor unit according to the twenty-ninth aspect, it is possible to protect the transmitting structure at least partially.

In accordance with a thirtieth aspect of the embodiments, the bicycle motor unit according to the twenty-ninth aspect is configured so that the second rotatable member includes a first axial end and a second axial end. The second rotatable member extends between the first axial end and the second axial end along the rotational axis. At least one of the first axial end and the second axial end is rotatably supported by the housing about the rotational axis.

With the bicycle motor unit according to the thirtieth aspect, it is possible to stabilize an orientation of the second rotatable member.

In accordance with a thirty-first aspect of the embodiments, a bicycle derailleur comprises a base member, a chain guide, and the bicycle motor unit according to any one of the first to thirtieth aspects. The chain guide is movably coupled to the base member. The bicycle motor unit is provided to the base member to apply the driving force to the chain guide.

With the bicycle motor unit according to the thirty-first aspect, it is possible to apply the bicycle motor unit to the bicycle derailleur.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle motor unit comprising:

an electric motor configured to generate a driving force; and a transmitting structure coupled to the electric motor to transmit the driving force from the electric motor to an actuated device of a bicycle, the transmitting structure including:

a first rotatable member rotatable about a rotational axis;

a second rotatable member rotatable relative to the first rotatable member about the rotational axis; and a resisting structure at least partially provided between the first rotatable member and the second rotatable member so as to resist relative rotation between the first rotatable member and the second rotatable member, wherein the resisting structure is provided in a space defined radially between the first rotatable member and the second rotatable member.

2. The bicycle motor unit according to claim 1, wherein the first rotatable member is radially spaced apart from the second rotatable member with respect to the rotational axis.

3. The bicycle motor unit according to claim 1, wherein the second rotatable member is at least partially provided radially inwardly of the first rotatable member with respect to the rotational axis.

4. The bicycle motor unit according to claim 1, wherein the resisting structure includes a resisting member, and the resisting member is a separate member from at least one of the first rotatable member and the second rotatable member.

5. The bicycle motor unit according to claim 4, wherein the resisting member includes a slidable member configured to slidably contact at least one of the first rotatable member and the second rotatable member.

6. The bicycle motor unit according to claim 1, wherein the first rotatable member includes a first coupling portion coupled to the resisting structure, and the second rotatable member includes a second coupling portion coupled to the resisting structure.

7. The bicycle motor unit according to claim 1, wherein the first rotatable member is operatively coupled to the electric motor to receive the driving force from the electric motor, and the second rotatable member is configured to receive the driving force from the electric motor via the resisting structure and the first rotatable member.

8. The bicycle motor unit according to claim 1, wherein the first rotatable member includes a first gear, and the first gear is configured to mesh with a first additional gear to receive the driving force from the electric motor via the first additional gear.

9. The bicycle motor unit according to claim 8, wherein the second rotatable member includes a second gear, and the second gear is configured to mesh with a second additional gear to transmit the driving force to the second additional gear.

10. The bicycle motor unit according to claim 9, wherein the first gear is provided radially outwardly of the second gear.

11. The bicycle motor unit according to claim 9, further comprising:

a housing including an internal space, the transmitting structure being at least partially provided in the internal space; and an output shaft coupled to a link member of a bicycle derailleur, the link member being provided outside of the housing, the second additional gear being provided to the output shaft.

12. The bicycle motor unit according to claim 1, further comprising:

a detection object provided to the second rotatable member to rotate along with the second rotatable member about the rotational axis; and a detector configured to detect the rotational position of the detection object.

13. The bicycle motor unit according to claim 12, wherein the second rotatable member includes a first axial end and a second axial end, the second rotatable member extends between the first axial end and the second axial end along the rotational axis, and the detection object is provided to the first axial end.

14. The bicycle motor unit according to claim 1, further comprising an additional transmitting structure having a structure different from a structure of the transmitting structure, the additional transmitting structure being configured to reduce transmission of force from the transmitting structure to the electric motor.

15. The bicycle motor unit according to claim 14, further comprising an output shaft coupled to a link member of a bicycle derailleur, wherein the transmitting structure is provided on a downstream side of the additional transmitting structure on a power transmission path in a first power-transmission direction defined from the electric motor to the output shaft.

16. The bicycle motor unit according to claim 15, further comprising:

a detection object provided to the second rotatable member to rotate along with the second rotatable member about the rotational axis; and a detector configured to detect the rotational position of the detection object, wherein the detection object is provided on a downstream side with respect to the additional transmitting structure on the power transmission path, and the detection object is provided on a downstream side with respect to the transmitting structure on the power transmission path.

17. The bicycle motor unit according to claim 1, further comprising a restricting member coupled to at least one of the first rotatable member and the second rotatable member to restrict a relative movement between the first rotatable member and the second rotatable member along the rotational axis.

18. The bicycle motor unit according to claim 1, wherein the resisting structure allows relative rotation between the first rotatable member and the second rotatable member in response to input of a predetermined rotational force transmitted from at least one of the first rotatable member and the second rotatable member.

19. A bicycle motor unit comprising:

an electric motor configured to generate a driving force; and a transmitting structure coupled to the electric motor to transmit the driving force from the electric motor to an actuated device of a bicycle, the transmitting structure including:

a first rotatable member rotatable about a rotational axis;

a second rotatable member rotatable relative to the first rotatable member about the rotational axis; and a resisting structure at least partially provided between the first rotatable member and the second rotatable member so as to resist relative rotation between the first rotatable member and the second rotatable member, wherein the first rotatable member includes a first coupling portion coupled to the resisting structure, the second rotatable member includes a second coupling portion coupled to the resisting structure, and the second coupling portion is at least partially provided radially inwardly of the first coupling portion.

20. The bicycle motor unit according to claim 6, wherein the second coupling portion is at least partially provided radially outwardly of the first coupling portion.

21. A bicycle motor unit comprising:

an electric motor configured to generate a driving force; and a transmitting structure coupled to the electric motor to transmit the driving force from the electric motor to an actuated device of a bicycle, the transmitting structure including:

a first rotatable member rotatable about a rotational axis;

a second rotatable member rotatable relative to the first rotatable member about the rotational axis; and a resisting structure at least partially provided between the first rotatable member and the second rotatable member so as to resist relative rotation between the first rotatable member and the second rotatable member, wherein the first rotatable member includes a first coupling portion coupled to the resisting structure, the second rotatable member includes a second coupling portion coupled to the resisting structure, the first coupling portion includes a first contact surface contactable with the resisting structure, the second coupling portion includes a second contact surface contactable with the resisting structure, and the first contact surface is radially spaced apart from the second contact surface with respect to the rotational axis.

22. A bicycle motor unit comprising:

an electric motor configured to generate a driving force; and a transmitting structure coupled to the electric motor to transmit the driving force from the electric motor to an actuated device of a bicycle, the transmitting structure including:

a first rotatable member rotatable about a rotational axis;

a second rotatable member rotatable relative to the first rotatable member about the rotational axis; and a resisting structure at least partially provided between the first rotatable member and the second rotatable member so as to resist relative rotation between the first rotatable member and the second rotatable member, wherein the second rotatable member includes a second gear, the first rotatable member includes a hole extending along the rotational axis, and the second gear is at least partially provided in the hole.

23. A bicycle derailleur comprising:

a base member;

a chain guide movably coupled to the base member; and the bicycle motor unit according to claim 1, the bicycle motor unit being provided to the base member to apply the driving force to the chain guide.

* * * * *